US007958063B2

(12) United States Patent
Long et al.

(10) Patent No.: US 7,958,063 B2
(45) Date of Patent: Jun. 7, 2011

(54) METHODS AND SYSTEMS FOR IDENTIFYING AND LOCALIZING OBJECTS BASED ON FEATURES OF THE OBJECTS THAT ARE MAPPED TO A VECTOR

(75) Inventors: Xi Long, Seattle, WA (US); W. Louis Cleveland, New York, NY (US); Y. Lawrence Yao, New York, NY (US)

(73) Assignee: Trustees of Columbia University in the City of New York, New York, NY (US)

( * ) Notice: Subject to any disclaimer, the term of this patent is extended or adjusted under 35 U.S.C. 154(b) by 796 days.

(21) Appl. No.: 11/789,571

(22) Filed: Apr. 25, 2007

(65) Prior Publication Data

US 2008/0082468 A1    Apr. 3, 2008

Related U.S. Application Data

(63) Continuation of application No. PCT/US2005/040905, filed on Nov. 10, 2005.

(60) Provisional application No. 60/795,210, filed on Apr. 25, 2006, provisional application No. 60/627,465, filed on Nov. 11, 2004.

(51) Int. Cl.
*G06N 5/00* (2006.01)
(52) U.S. Cl. .......................................... 706/12; 706/45
(58) Field of Classification Search .................. 706/12, 706/45
See application file for complete search history.

(56) References Cited

U.S. PATENT DOCUMENTS

| 4,349,435 | A | 9/1982 | Ochiai |
| 4,421,716 | A | 12/1983 | Hench et al. |
| 6,253,607 | B1 | 7/2001 | Dau |
| 2002/0165837 | A1 | 11/2002 | Zhang et al. |

FOREIGN PATENT DOCUMENTS

WO    WO-99/08091 A1    2/1999

OTHER PUBLICATIONS

Long, et al, Effective Automatic Recognition of Cultured Cells in Bright Field Images Using Fisher's Linear Discriminant Preprocessing, Image and Vision Computing 23 (2005), pp. 1203-1213.*

(Continued)

*Primary Examiner* — Wilbert L Starks, Jr.
(74) *Attorney, Agent, or Firm* — Wilmer Cutler Pickering Hale and Dorr LLP

(57) ABSTRACT

A method of identifying and localizing objects belonging to one of three or more classes, includes deriving vectors, each being mapped to one of the objects, where each of the vectors is an element of an N-dimensional space. The method includes training an ensemble of binary classifiers with a CISS technique, using an ECOC technique. For each object corresponding to a class, the method includes calculating a probability that the associated vector belongs to a particular class, using an ECOC probability estimation technique. In another embodiment, increased detection accuracy is achieved by using images obtained with different contrast methods. A nonlinear dimensional reduction technique, Kernel PCA, was employed to extract features from the multi-contrast composite image. The Kernel PCA preprocessing shows improvements over traditional linear PCA preprocessing possibly due to its ability to capture high-order, nonlinear correlations in the high dimensional image space.

40 Claims, 37 Drawing Sheets

OTHER PUBLICATIONS

Long, et al, Automatic detection of unstained viable cells in bright field images using a support vector machine with an improved training procedure, Computers in Biology and Medicine 36 (2006), pp. 339-362.*

Mika, et al, Kernel PCA and De-noising in Feature Spaces, Advances in Neural Information Processing Systems 11, 1999, pp. 1-7.*

Long et al, A new preprocessing approach for cell recognition, IEEE Trans Inf Technol Biomed., Sep. 2005, pp. 407-412.*

A. Ashkin, "Optical trapping and manipulation of neutral particles using lasers", Proc. Natl. Acad. Sci., 94, 1997, pp. 4853-4860.

A. Berger, Error-Correcting Output Coding for Text Classification, IJCAI'99: Workshop on machine learning for information filtering, Stockholm, Sweden, 1999.

A. Hultgren and M. Tanase, "Cell manipulation using magnetic nanowires", Journal of Applied Physics, 93 (10), 2003, pp. 7554-7556.

A. Shashua, "On the relationship between the support vector machine for classification and sparsified Fisher's Linear Discriminant", Neural Processing Letters, 9, 1999, pp. 129-139.

B. Boser, I. Guvlon and V. Vapnik, "A training Algorithm for Optimal Margin Classifiers", Proceedings of the Fifth Conference on Computational learning Theory, New York: Association of Computing Machinery, 1992, pp. 144-152.

B. Schölkopf, "Statistical learning and kernel methods", MSR-TR 2000-23, Microsoft Research, 2000.

B. Schölkopf, et al., "Nonlinear component analysis as a kernel eigenvalue problem", Neural Computation, 10, 1998, pp. 1299-1319.

B. Stuhrmann, et al., "Automated tracking and laser micromanipulation of motile cells", Review of Scientific Instruments, 76, 2005, 035105.

C. Burges, A tutorial on Support Vector Machines for pattern recognition, Data Mining and Knowledge Discovery, vol. 2, 1998, 122-167.

C. Campbell and N. Cristianini, "Simple training algorithms for support vector machines", Technical Report CIG-TR-KA, University of Bristol, Engineering Mathematics, Computational Intelligence Group, 1999.

C. Loukas, et al., "An Image Analysis-based Approach for Automated Counting of Cancer Cell Nuclei in Tissue Sections", Cytometry Part A, 55, 2003, pp. 30-42.

C. Moler and G. Stewart, "An algorithm for generalized matrix eigenvalue problems", SIAM J. Numer. Anal., 10, 1973, pp. 99-130.

Chih-Chung Chang and Chih-Jen Lin, LIBSVM—A Library for Support Vector Machines, <http://www.csie.ntu.edu.tw/~cjlin/libsvm/>, Copyright 2000-2010.

International Search Report and Written Opinion mailed on Sep. 20, 2006 for corresponding International Patent Application No. PCT/US2005/040905.

Invitation to Pay Additional Fees mailed by International Searching Authority/European Patent Office on Jun. 21, 2006 for corresponding International Patent Application No. PCT/US2005/040905.

D. Aha and R. Bankert, Cloud classification using error-correcting output codes, Artificial Intelligence Applications: Natural Resources, Agriculture, and Environmental Science, vol. 11, No. 1, 1997, 13-28.

D. Gray, et al., "Dielectrophoretic registration of living cells to a microelectrode array", Biosensors and Bioelectronics, 19, 2004, pp. 1765-1774.

D. Haliyo, S. Regnier and J.-C. Guinot, "MAD, the adhesion based dynamic micro-manipulator", European Journal of Mechanics A/Solids 22, 2003, pp. 903-916.

D.J.M. Tax and R.P.W. Duin, Using Two-Class Classifiers for Multiclass Classification, ICPR16: Proc. 16th Int. Conf. on Pattern Recognition, Quebec City, Canada, 2002, 124-127.

D.P. Chakraborty, Maximum likelihood analysis of free-response receiver operating characteristic (FROC) data, Medical Physics, vol. 16, 1989, 561-568.

E. Allwein, R. Schapire, and Y. Singer, Reducing multiclass to binary: A unifying approach for margin classifiers, Journal of Machine Learning Research, vol. 1, 2000, 113-141.

E. Kong and T. Dietterich, Error-correcting output coding corrects bias and variance, Proceedings of the 12th International Conference on Machine Learning, 1995, 313-321.

E. Osuna, R. Freund, and F. Girosi. "Support Vector Machines: Training and Applications", A.I. Memo 1602, MIT A.I. Lab., 1997.

F. Arai, et al, "Minimally Invasive Micromanipulation of Microbe by Laser Trapped Micro Tools", Proceedings of the 2002 IEEE International Conference on Robotics & Automation, Washington, DC, 2002, pp. 1937-1942.

F. Rosenblatt, "The Perceptron: A Probabilistic Model for Information Storage and Organization in the Brain", Cornell Aeronautical Laboratory, Psychological Review, 65(6), 1958, pp. 386-408.

F. Schnorrenberg, C. Pattichis, K. Kyriacou, and C. Schizas, "Computer-aided detection of breast cancer nuclei", IEEE Trans. on Inf. Techn. in Biomedicine 1(2), 1997, pp. 128-140.

G. Bakiri and T. Dietterich, Achieving high-accuracy text-to-speech with machine learning, Data mining in speech synthesis, Kluwer Academic Publishers, Boston, MA, 1999.

G. James and T. Hastie, The error coding method and PiCTs, Journal of Computational and Graphical Statistics, vol. 7, No. 3, 1997, 377-387.

G. Valentini and F. Masulli, Ensembles of Learning Machines, Neural Nets WIRN Vietri-02, Series Lecture Notes in Computer Sciences, Springer-Verlag, Heidelberg, Germany, 2002.

H. Lee, T. Hunt, and R. Westervelt, "Magnetic and Electric Manipulation of a Single Cell in Fluid", Materials Research Society Symposium Proceeding, 820, 2004.

H. Murase and S. Nayar, "Visual learning and recognition of 3D objects from appearance", Intl. J. Computer Vision, 14, 1995, pp. 5-24.

J. Drish, "Obtaining Calibrated Probability Estimates from Support Vector Machines", technique report, Dept. of Computer Science and Engineering, University of California, San Diego, CA, 2001.

J. Kittler, et al., Face Verification Using Error Correcting Output Codes, Proceedings of IEEE Computer Society Conference on Computer Vision and Pattern Recognition (CVPR01), 2001, 755-760.

J. Meltzer, et al., "Multiple view feature descriptors from image sequences via kernel principal component analysis", Computer Vision—ECCV 2004, Pt 1. 3021, 2004, pp. 215-227.

J. Mendes, et al., "Algorithms for pattern recognition in images of cell cultures", Proceedings of SPIE, 4425, 2001, pp. 282-290.

J. Platt, "Fast Training of Support Vector Machines using Sequential Minimal Optimization", in B. Schölkopf, C. Burges, and A. Smola (eds): Advances in Kernel Methods—Support Vector Learning, MIT Press, 1998.

J. Platt, "Sequential Minimal Optimization: A Fast Algorithm for Training Support Vector Machines", Microsoft Research Technical Report MSR-TR-98-14, 1998.

J. Price and D. Gough, "Nuclear recognition in images of fluorescent stained cell monolayers", Proceedings of SPIE, Applications of Digital Image Processing XIII, 1349, 1990, pp. 294-300.

J.M. Keller et al., "The principle of least commitment in the analysis of chromosome images," vol. 2493, 1995, pp. 178-186—Proceedings of the SPIE, The International Society for Optical Engineering USA.

K. Huang et al., Boosting accuracy of automated classification of fluorescence microscope images for location proteomics, BMC Bioinformatics 2004, 5:78.

K. Huang, M. Velliste, and R. F. Murphy, "Feature reduction for improved recognition of subcellular location patterns in fluorescence microscope images", Proc. SPIE 4962, 2003, pp. 307-318.

K. Jonsson, et al., "Support vector machines for face authentication", Image and Vision Computing, 20, 2002, pp. 369-375.

K. Morik, P. Brockhausen, and T. Joachims, "Combining statistical learning with a knowledge-based approach, a case study in intensive care monitoring", Proc. 16th International Conference on Machine Learning, Bled, Slovenia, 1999.

K. Müller, et al., "An introduction to kernel-based learning algorithms", IEEE Neural Networks, 12(2), 2001, pp. 181-201.

K. Rajpoot and N. Rajpoot "SVM Optimization for Hyperspectral Colon Tissue Cell Classification", Proceedings of 7th Medical Image Computing & Computer Assisted Intervention (MICCAI), 2004, pp. 829-837.

K. Takahashi, et al., "Voltage required to detach an adhered object particle by coulomb interaction for micromanipulation", J. Appl. Phys. 90 (1), 2001, pp. 432-437.

L. Breiman, Bagging predictors, Machine Learning, vol. 26, No. 2, 1996, 123-140.

L. Hibbard, et al., "Automated recognition and mapping of immunolabelled neurons in the developing brain", Journal of Microscopy, 183(3), 1996, pp. 241-256.

L. Sirovich and M. Kirby, "Low dimensional procedure for the characterization of human faces", J. Optical Society of America, 4(3), 1987, pp. 519-524.

M. Boes, et al., "T-cell engagement of dendritic cells rapidly rearranges MHC class II transport", Science, 418(6901), 2002, pp. 983-988.

M. Boland and R. Murphy, "A neural network classifier capable of recognizing the patterns of all major subcellular structures in fluorescence microscope images of hela cells", Bioinformatics, 17, 2001, pp. 1213-1223.

M. Kelz, et al., "Single- cell antisense RNA amplification and microarray analysis as a tool for studying neurological degeneration and restoration", Sci Aging Knowledge Environ 2002(1):rel.

M. Turk and A. Pentland, "Face recognition without features", Proc. IAPR Workshop on Machine Vision Applications, Tokyo, 1990, pp. 267-270.

M. Turk and A.P. Pentland, "Eigenfaces for recognition", J. Cognitive Neuroscience, 3(1), 1991, pp. 71-96.

M. Turk, "Eigenfaces and Beyond", In W. Zhao and R. Chellappa (eds): Face Processing: Advanced Modeling and Methods, Academic Press, 2005.

N. Bonnet, "Multivariate statistical methods for the analysis of microscope image series: applications in materials science", Journal of Microscopy, 190 (1-2), 1998 pp. 2-18.

N. Bonnet, et al., "Dimensionality reduction, segmentation and quantification of multidimensional images: application to fluorescence microscopy", In Spectral Imaging: Instrumentation, Applications, and Analysis, Gregory H. Bearman, Dario Cabib, Richard M. Levenson, Editors, Proceedings of SPIE vol. 3920, 2000.

N. Cristianini and B. Schölkopf, "Support Vector Machines and Kernel Methods, The New Generation of Learning Machines", Artificial Intelligence Magazine, 23(3), 2002, pp. 31-41.

P. Adiga and B. Chaudhuri, "An efficient method based on watershed and rule-based merging for segmentation of 3-D histopathological images", Pattern recognition, 34, 2001, pp. 1449-1458.

P. Belhumeur, J. Hespanha, and D. Kriegman, "Eigenfaces vs. Fisherfaces: Recognition using class specific linear projection", IEEE Transactions on PAMI, 19(7), 1997, pp. 711-720.

P. Sajda, C. Spence and L. Parra, "A multi-scale probabilistic network model for detection, synthesis and compression in mammographic image analysis", Medical image analysis, 7, 2003, pp. 187-204.

P. Sjöström, B. Frydel, and L. Wahlberg, "Artificial Neural Network-Aided Image Analysis System for Cell Counting", Cytometry, 36, 1999, pp. 18-26.

R. Bernard, M. Kanduser and F. Pernus, "Model-based automated detection of mammalian cell colonies", Physics in Medicine and Biology, 46, 2001, pp. 3061-3072.

R. F. Murphy, "Automated Interpretation of Subcellular Location Patterns", Proc 2004 IEEE Intl Symp Biomed Imaging (ISBI 2004), pp. 53-56.

R. F. Murphy, "Cytomics and Location Proteomics: Automated Interpretation of Subcellular Patterns in Fluorescence Microscope Images", Cytometry, 67A, 2005, pp. 1-3.

R. Ghani, Using Error-Correcting Codes for Text Classification, Proceedings of ICML-00, 17th International Conference on Machine Learning, 2000, 303-310.

R. Rifkin and A. Klautau, "In Defense of One-Vs-All Classification", Journal of Machine Learning Research, 5, 2004, pp. 101-141.

R. Xiao et al., "An approach to Incremental SVM Learning Algorithm," Tools with Artificial Intelligence, 2000, ICTA 2000, Proceedings. 12th IEEE International Conference on Nov. 13-15, 2000, pp. 268-273.

S. Baker and S. Nayar, "Pattern rejection", Proc. IEEE conf. Computer vision and pattern recognition, 1996, pp. 544-549.

S. Sanei and T. Lee, "Cell recognition based on PCA and bayesian classification", 4th International Symposium on Independent Component Analysis and Blind Signal Separation (ICA2003), Nara, Japan, 2003, pp. 239-243.

S. Shiotani, et al., "Cell recognition by image processing. (Recognition of dead or living plant cells by neural network)", JSME International Journal, Series C: Dynamics, Control, Robotics, Design and Manufacturing, 37(1), 1994, pp. 202-208.

T. Friess, N. Cristianini, and C. Campbell. "The kernel-Adaton: a fast and simple training procedure for support vector machines", In J. Shavlik (eds): Machine Learning: Proceedings of the fifteenth International Conference, Morgan Kaufmann, 1998.

T. G. Dietterich and G. Bakiri, Solving Multiclass Learning Problems via Error- Correcting Output Codes, Journal of Artificial Intelligence Research, vol. 2, 1995, 263-286.

T. Hastie and R. Tibshirani, classification by pairwise coupling, Advances in Neural Information Processing Systems, vol. 10, MIT Press, 1998.

T. Joachims, "Making large-Scale SVM Learning Practical", in B. Schölkopf, C. Burges and A. Smola (eds): Advances in Kernel Methods—Support Vector Learning, MIT Press, 1999.

T. Kämpfe, T. Nattkemper and H. Ritter, "Combining independent component analysis and self-organizing maps for cell image classification", Proc. DAGM, Lecture Notes in Computer Science, 2191, 2001, pp. 262-268.

T. Nattkemper, "A Neural Network-Based System for High-Throughput Fluorescence Micrograph Evaluation", University of Bielefeld, Faculty of Technology, Feb. 2001.

T. Nattkemper, "Automatic segmentation of digital micrographs: A survey", Proceeding of 11th World Congress on Medical Informatics (MEDINFO), San Francisco, USA, 2004, pp. 847-854.

T. Nattkemper, "Multivariate image analysis in biomedicine: a methodological review", Journal of Biomedical Informatics, 37(5), 2004, pp. 380-391.

T. Nattkemper, A. Saalbach and T. Twellmann, "Evaluation of Multiparameter Micrograph Analysis with Synthetical Benchmark Images", Proc. of EMBC2003 (25th Annual Int. Conf. of the IEEE Engineering in Med. and Biol. Soc.), Cancun, Mexico, Sep. 2003.

T. Nattkemper, et al., "A hybrid system for cell detection in digital micrographs", Proceedings of the IASTED International Conference on Biomedical Engineering, Innsbruck, Austria, 2004, pp. 197-200.

T. Nattkemper, H. Ritter and W. Schubert, "A neural classifier enabling high-throughput topological analysis of lymphocytes in tissue sections", IEEE trans Info. Tech. Biomedicine, 5(2), 2001, pp. 138-149.

T. Nattkemper, H. Wersing, W. Schubert and H. Ritter, "A neural network architecture for automatic segmentation of fluorescence micrographs", in Proc. of ESANN 2000, Brugge, pp. 177-182.

T. Nattkemper, T. Twellmann, H. Ritter and W. Schubert, "Human vs. machine: evaluation of fluorescence micrographs", Computers in biology and medicine, 33, 2003, pp. 31-43.

T. Twellmann, et al., "Cell Detection in Micrographs of Tissue Sections Using Support Vector Machines", Proceeding of ICANN 2001 Workshop on Kernel and Subspace Methods for Computer Vision, 2001.

T. Wuringer, et al., "Robust automatic coregistration, segmentation, and classification of cell nuclei in multimodal cytopathological microscopic images", Comput Med Imaging Graph, 28 (1-2), 2004, pp. 87-98.

T.-K. Huang, R. C. Weng <http://www3.nccu.edu.tw/~chweng>, and C.-J. Lin, A Generalized Bradley-Terry Model: From Group Competition to Individual Skill, <http://www.csie.ntu.edu.tw/~cjlin/papers/generalBT.pdf>, 2004.

T.W. Nattkemper, H. Ritter and W. Schubert, A neural classifier enabling high-throughput topological analysis of lymphocytes in tissue sections, IEEE trans Info. Tech. Biomedicine, vol. 5, No. 2, 2001, 138-149.

V. Guruswami and Amit Sahai, Multiclass learning, boosting, and error-correcting codes, Proceedings of the twelfth annual conference on Computational learning theory, Santa Cruz, CA, USA, 1999, 145-155.

V. Kovalev, et al., "Segmentation Technique of Complex Image Scene for an Automatic Blood Cell Counting System", Proceedings of SPIE, 2710, 1996, pp. 805-810.

W. L. Cleveland, I. Wood and B.F. Erlanger, Routine large-scale production of monoclonal antibodies in a protein-free culture medium, Journal of Immunological Methods, vol. 56, 1983, 221-234.

X. Chen and C. Yu, "Application of some valid methods in cell segmentation", Image extraction, segmentation, and recognition, in T. Zhang, B. Bhanu and N. Shu, (eds): Proceedings of SPIE, 4550, 2001, pp. 340-344.

X. Long, W. L. Cleveland, and Y. L. Yao, "Multiclass Detection of Cell Mixture in Bright Field Images with Multiclass ECOC Probability Estimation," Image and Vision Computing, 2005.

Y. Cui, D. Swets, and J. Weng, "Learning-based hand sign recognition using SHOSLIF-M", Int'l conf. on computer vision, 1995, pp. 631-636.

Y. Freund and R. Schapire, A decision-theoretic generalization of on-line learning and an application to boosting, Journal of Computer and System Sciences, vol. 55, No. 1, 1997,119-139.

Y. Sun and B. Nelson, "Biological Cell Injection Using an Autonomous MicroRobotic System", International Journal of Robotic Research, 21 (10-11), 2002, pp. 861-868.

Z. Kam, E. Zamir and B. Geiger, "Probing molecular processes in live cells by quantitative multidimensional microscopy", Trends in cell biology, 11(8), 2001, pp. 329-334.

* cited by examiner

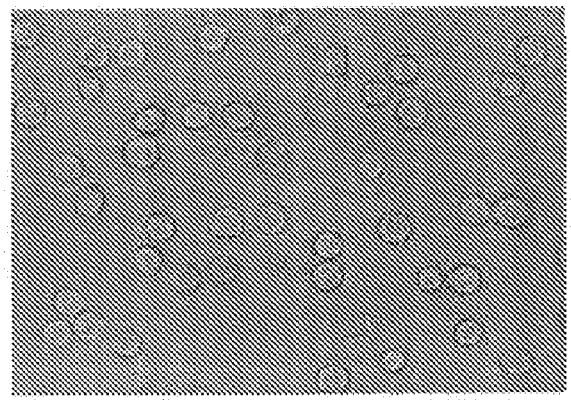 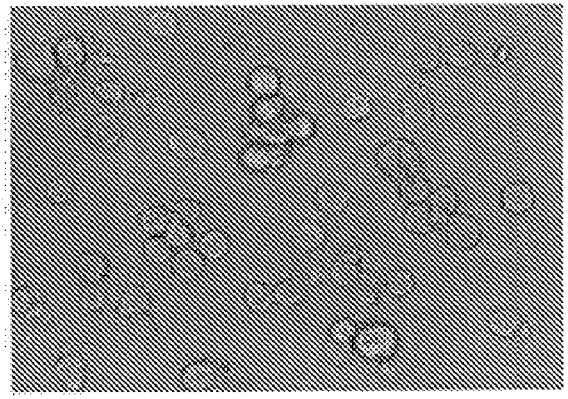
Fig. 13a    Fig. 13b
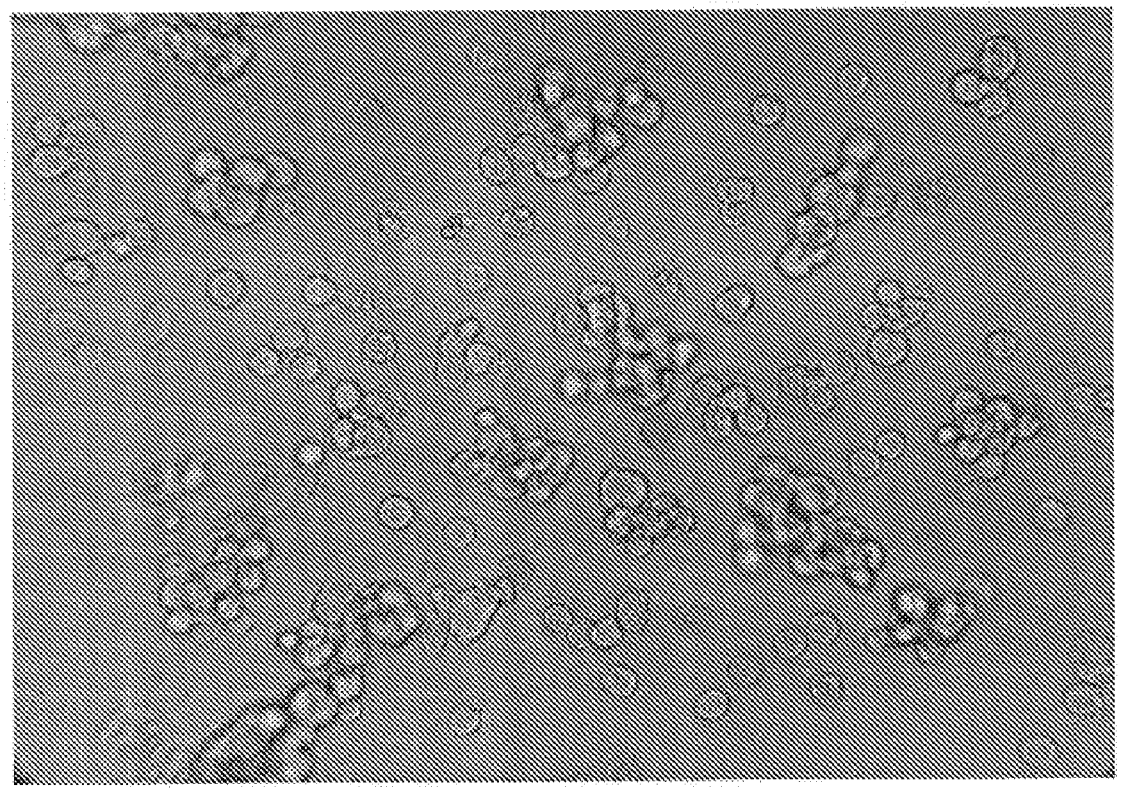
Fig. 13c

Control Experiments

METHODS AND SYSTEMS FOR IDENTIFYING AND LOCALIZING OBJECTS BASED ON FEATURES OF THE OBJECTS THAT ARE MAPPED TO A VECTOR

CROSS REFERENCE TO RELATED APPLICATIONS

This application is a continuation of PCT Application Serial No. PCT/US2005/040905 filed Nov. 10, 2005, entitled "Methods and Systems for Identifying and Localizing Objects Based on Features of the Objects that are Mapped to a Vector," which claims priority under 35 U.S.C. § 119(e) to U.S. Provisional Patent Application Ser. No. 60/627,465, filed Nov. 11, 2004. This application also claims priority under 35 U.S.C. § 119(e) to U.S. Provisional Patent Application Ser. No. 60/795,210 filed Apr. 25, 2006, entitled "Methods and Systems for Detection of Objects Using Composite Images." All of these prior applications are hereby incorporated by reference herein in their entireties.

STATEMENT REGARDING FEDERALLY SPONSORED RESEARCH OR DEVELOPMENT

The present invention was made with United States government support under Grant No. R21 CA89841 awarded by the National Institute of Health. The United States government may have certain rights in this invention.

BACKGROUND OF THE INVENTION

The present invention relates to pattern recognition systems. Particularly, the invention relates to systems for analyzing vector data to identify and/or localize objects that are represented by the vector data.

While the invention is applicable to many different fields, it will be described particularly with regard to cell detection and classification. However, the invention is also applicable to many other research fields wherein vectors can be used to describe or otherwise characterize a plurality of objects and the objects can represent other entities than cells.

Considering cell detection, however, cell detection in bright field microscopy is an inherently difficult task due to the immense variability of cell appearance. Even more difficult is the recognition of the subtle differences in appearance that distinguish unstained viable from non-viable cells in bright field images. Although an experienced observer can sometimes recognize these differences, viability stains are commonly used for reliable determination of viability. The requirement of a human observer represents a severe impediment to the development of high throughput systems that require recognition of viable cells. Therefore, there is a great need for effective algorithms that automatically recognize viable cells.

Currently, a typical approach for cell detection is to use fluorescent probes that have a chemical specificity for cell organelles. However, this approach can consume one or more of a very limited number of available fluorescence channels just for the purpose of cell identification. Currently for commercially available microscopes there are typically only four channels for simultaneous monitoring and eight channels for sequential observation, while there are many cellular characteristics for which the fluorescence channels can be used to detect. It is therefore highly desirable to identify cells with a method that uses transmitted light illumination, thereby permitting all available fluorescence channels to be used to obtain cellular and subcellular information for further cell analysis.

Classical image analysis approaches require end-users to have programming skills and require independent optimizations for different cell types. An alternative is to use machine-learning techniques, which avoid end-user programming since classifiers only need to be trained. For example, Artificial Neural Networks (ANNs) have been successfully used to identify cells in bright field images. These algorithms are able to capture complex, nonlinear, relationships in high dimensional feature spaces. However, ANNs are based on the Empirical Risk Minimization (ERM) principle. Therefore, they are prone to false optimizations due to local minima in the optimization function and are susceptible to training problems such as "overfitting." This makes ANN-training a complex procedure that can be daunting for biologists and others who are not immersed in the complexities of ANNs.

In recent years, Support Vector Machines (SVMs) have been found to be remarkably effective in many real-world applications.

Unlike ANNs, SVMs follow the Structural Risk Minimization (SRM) principle, which aims at minimizing an upper bound of the generalization error. As a result, an SVM tends to perform well when applied to data outside the training set. SVMs also have many desirable properties such as flexibility in choice of kernel function and implicit mapping into high dimensional feature spaces. But what makes SVMs most attractive is that they avoid several major problems associated with ANNs. For example, SVMs control overfitting by restricting the capacity of the classifier. They also depend on the solution of a convex Quadratic Programming (QP) problem which has no local extrema. The unique optimal solution can therefore be efficiently obtained.

SUMMARY OF THE INVENTION

In general, in some embodiments, the invention identifies and/or localizes one or more objects in a sample, where the objects include a physical material or substance. Alternatively, the object can include an "informational" object, such as a DNA sequence or a textual data packet. In other embodiments of the invention, a machine vision component is provided which is capable of identifying the at least one object in a sample, based on features of the object that are mapped to a vector. The machine vision component can use various types of illumination for identifying the at least one substance, such as light illumination. In certain embodiments, the machine vision component includes machine learning software that, when executed, identifies the object in the sample based on features of the object that are mapped to a vector. The machine vision component can also include software for preprocessing the image of the sample to reduce the size of the image data used by the machine learning software to identify the at least one substance in the sample. In some embodiments, the preprocessing software preprocesses can use techniques such as Principle Component Analysis, Independent Component Analysis, Self-Organization Maps, Fisher's Linear Discriminant, and kernel PCA.

In one aspect of the invention, object identification is done using at least two images of an item. For example, at least one image can be taken using different contrasts (e.g. bright field imaging, phase contrast, and the like), different wavelengths (e.g. visible and infrared wavelengths), different angles (e.g., perpendicular, 45°, and the like), and the like. Software can be used for preprocessing each of the images. Use of multiple images can allow the removal of redundant information, while allowing relevant information to be maintained. This can improve the accuracy of identification, and the classification of objects into different classes. Multiple images can also improve detection, because although cells make look similar in one image take with a particular contrast type (optical or chemical), the cells may look different in an image take with a different contrast type.

In one aspect, the invention is a method of identifying one or more objects, wherein each of the objects belongs to a first class or a second class. The first class is heterogeneous and has C subclasses, and the second class is less heterogenous than the first class. The method includes deriving a plurality of vectors each being mapped to one of the one or more objects, wherein each of the plurality of vectors is an element of an N-dimensional space. The method further includes preprocessing each of the plurality of vectors using a Fisher Linear Discriminant, wherein the preprocessing reduces the dimensionality of each of the plurality of vectors to M dimensions, wherein M is less than or equal to C. The method also includes classifying the preprocessed vectors by (i) grouping the preprocessed vectors belonging to any of the C subclasses of the first class into a first set of vectors, and (ii) grouping the preprocessed vectors belonging to the second class into a second set of vectors.

In one embodiment, each of the plurality of vectors includes information mapped from a digital image. In another embodiment, the information mapped from a digital image includes a pixel patch. In one embodiment, the preprocessed vectors are classified with an artificial neural network. In another embodiment, the preprocessed vectors are classified with a support vector machine. Another embodiment includes training the support vector machine with training sets generated with a compensatory iterative sample selection technique.

In one embodiment, the compensatory iterative sample selection technique includes (a) selecting a first working set of pre-classified objects from a set of training data, (b) training the support vector machine with the first working set, (c) testing the support vector machine with pre-classified objects from the set of training objects not included in the first working set so as to produce a set of correctly classified objects and a set of incorrectly classified objects, (d) selecting a replacement set of pre-classified objects from the set of incorrectly classified objects, and replacing a subset of the working set with the replacement set, and (e) repeating steps (b), (c) and (d) until the set of incorrectly classified objects does not decrease in size for subsequent iterations of steps (b), (c) and (d).

In another aspect, the invention is a method of identifying and localizing one or more objects, where each of the objects belongs to either a first class or a second class. The method includes deriving a plurality of vectors each being mapped to one of the one or more objects, where each of the plurality of vectors is an element of an N-dimensional space. The method further includes training a support vector machine with a compensatory iterative sample selection technique, and processing the plurality of vectors with the support vector machine, so as to classify each of the plurality of vectors into either the first class or the second class.

In one embodiment, each of the plurality of vectors includes information mapped from a digital image. In another embodiment, the information mapped from a digital image includes a pixel patch.

In another aspect, the invention is a method of identifying and localizing one or more objects in a digital image, where each of the one or more objects belongs to either a first class or a second class. The method includes deriving a plurality of pixel patches from the digital image, each of the plurality of pixel patches being mapped to one of the one or more objects. Each of the plurality of pixel patches is an element of an N-dimensional space. The method also includes training a support vector machine with a compensatory iterative sample selection technique, and processing the plurality of pixel patches with the support vector machine, so as to classify each of the plurality of pixel patches into either the first class or the second class.

In another aspect, the invention is a method of identifying one or more cells in a digital image, where each of the one or more cells belongs to one of two or more classes. The method includes deriving a plurality of pixel patches from the digital image, each of the plurality of pixel patches being mapped to one of the one or more objects. Each of the plurality of pixel patches is an element of an N-dimensional space. The method also includes training an ensemble of binary classifiers using the Error Correcting Output Coding technique, and processing the plurality of pixel patches with the ensemble of binary classifiers, so as to classify each of the plurality of pixel patches into one of the two or more classes.

In one embodiment, each of the ensemble of binary classifiers is a support vector machine. In another embodiment, the method further includes, for each pixel patch, calculating a probability that the pixel patch belongs to a particular one of the two or more classes, using an Error Correcting Output Coding probability estimation technique. In another embodiment, the method further includes localizing a cell in the digital image by identifying a pixel patch having a cell that is centered within the pixel patch.

In another aspect, the invention is a method of identifying one or more objects, where each of the one or more objects belongs to one of three or more classes. The method includes deriving a plurality of vectors, each being mapped to one of the one or more objects. Each of the plurality of vectors is an element of an N-dimensional space. The method further includes training an ensemble of binary classifiers with a compensatory iterative sample selection technique, using an Error Correcting Output Coding technique. The method also includes processing the plurality of vectors with the ensemble of binary classifiers, so as to classify each of the plurality of vectors into one of the three or more classes.

In another aspect, the invention is a method of identifying one or more objects in a digital image, where each of the one or more objects belongs to one of three or more classes. The method includes deriving a plurality of pixel patches from the digital image, each of the plurality of pixel patches being mapped to one of the one or more objects, where each of the plurality of pixel patches is an element of an N-dimensional space. The method also includes training an ensemble of binary classifiers with a compensatory iterative sample selection technique, using an Error Correcting Output Coding technique. The method also includes processing the plurality of pixel patches with the ensemble of binary classifiers, so as to classify each of the plurality of pixel patches into one of the three or more classes. One embodiment further includes localizing an object in the digital image by identifying a pixel patch having an object that is centered within the pixel patch.

In another aspect, the invention is a method of identifying and localizing one or more objects, where each of the one or more objects belongs to one of three or more classes. The method includes deriving a plurality of vectors, each being mapped to one of the one or more objects, where each of the plurality of vectors is an element of an N-dimensional space. The method further includes training an ensemble of binary classifiers with a compensatory iterative sample selection technique, using an Error Correcting Output Coding technique. For each object, the method includes calculating a probability that the associated vector belongs to a particular one of the three or more classes, using the Error Correcting Output Coding probability estimation technique. The method also includes generating a confidence map for each object type using the probability calculated for the vector as a confidence value within the confidence map, comparing peaks in the confidence map for the object type with corresponding peaks in confidence maps for other classes, and using a highest peak to assign class membership. The method also includes determining localization of the object corresponding to the highest peak by determining pixel coordinates of the highest peak.

In another aspect, the invention is a method of identifying and localizing one or more objects in a digital image, where each of the one or more objects belongs to one of three or more classes. The method includes deriving a plurality of pixel patches from the digital image, each of the plurality of pixel patches being mapped to one of the one or more objects, where each of the plurality of pixel patches is an element of an N-dimensional space. The method also includes training an ensemble of binary classifiers with a compensatory iterative sample selection technique, using an Error Correcting Output Coding technique. For each object, the method includes calculating a probability that the associated pixel patch belongs to a particular one of the three or more classes, using the Error Correcting Output Coding probability estimation technique. The method also includes generating a confidence map for each class using the probability calculated for the pixel patch as a confidence value within the confidence map, comparing peaks in the confidence map for the class with corresponding peaks in confidence maps for other classes, and using a highest peak to assign class membership. The method further includes determining localization of the cell corresponding to the highest peak by determining pixel coordinates of the highest peak.

In another aspect, the invention is a method of identifying and localizing one or more objects, where each of the one or more objects belongs to one of three or more classes. The method includes deriving a plurality of vectors, being mapped to one of the one or more objects, where each of the plurality of vectors is an element of an N-dimensional space. The method also includes training an ensemble of binary classifiers using an Error Correcting Output Coding technique. For each object, the method includes calculating a probability that the associated vector belongs to a particular one of the three or more classes, using the Error Correcting Output Coding probability estimation technique. The method further includes generating a confidence map for each object type using the probability calculated for the vector as a confidence value within the confidence map, comparing peaks in the confidence map for the object type with corresponding peaks in confidence maps for other classes, and using a highest peak to assign class membership. The method also includes determining localization of the object corresponding to the highest peak by determining pixel coordinates of the highest peak.

In another aspect, the invention is a method of identifying and localizing one or more objects in a digital image, where each of the one or more objects belongs to one of three or more classes. The method includes deriving a plurality of pixel patches from the digital image, each of the plurality of pixel patches being mapped to one of the one or more objects, where each of the plurality of pixel patches is an element of an N-dimensional space. The method also includes training an ensemble of binary classifiers using an Error Correcting Output Coding technique. For each object, the method includes calculating a probability that the pixel patch belongs to a particular one of the three or more classes, using the Error Correcting Output Coding probability estimation technique. The method also includes generating a confidence map for each class using the probability calculated for the pixel patch as a confidence value within the confidence map, comparing peaks in the confidence map for the class with corresponding peaks in confidence maps for other class, and using a highest peak to assign class membership. The method also includes determining localization of the object corresponding to the highest peak by determining pixel coordinates of the highest peak.

In another aspect, the invention is a method of generating a training set of pre-classified objects for training a classifier. The method includes applying one or more fluorescent markers to a sample containing objects to be classified, generating one or more fluorescence images of the sample containing objects to be classified, and generating a transmitted light illumination image of the sample containing objects to be classified. For each of the one or more fluorescence images, the method includes superimposing at least a portion of the fluorescence image with a corresponding portion of the transmitted light illumination image. The method also includes using information from the one or more fluorescence images to identify characteristics of corresponding objects in the transmitted light illumination image, thereby producing a transmitted light illumination image having one or more pre-classified objects. One embodiment further includes using information from the transmitted light illumination image having one or more pre-classified objects to identify characteristics of corresponding elements in one or more subsequently generated fluorescent images.

In another aspect, the invention is a computer readable medium including stored instructions adapted for execution on a processor. The computer readable medium includes instructions for deriving a plurality of vectors each being mapped to one of the one or more objects, where each of the plurality of vectors is an element of an N-dimensional space. The computer readable medium also includes instructions for preprocessing each of the plurality of vectors using a Fisher Linear Discriminant, wherein the preprocessing reduces the dimensionality of each of the plurality of vectors to M dimensions, wherein M is less than or equal to C. The computer readable medium further includes instructions for classifying the preprocessed vectors by (i) grouping the preprocessed vectors belonging to any of the C subclasses of the first class into a first set of vectors, and (ii) grouping the preprocessed vectors belonging to the second class into a second set of vectors.

In another aspect, the invention is a computer readable medium including stored instructions adapted for execution on a processor. The computer readable medium includes instructions for deriving a plurality of pixel patches from the digital image, each being mapped to one of the one or more objects, wherein each of the plurality of pixel patches is an element of an N-dimensional space. The computer readable medium also includes instructions for preprocessing each of the plurality of pixel patches using a Fisher Linear Discriminant, where the preprocessing reduces the dimensionality of each of the pixel patches to M dimensions, wherein M is less than or equal to C. The computer readable medium also includes instructions for classifying the preprocessed pixel patches by (i) grouping the preprocessed pixel patches belonging to any of the C subclasses of the first class into a first set of pixel patches, and (ii) grouping the preprocessed pixel patches belonging to the second class into a second set of pixel patches.

In another aspect, the invention is a computer readable medium including stored instructions adapted for execution on a processor. The computer readable medium includes instructions for deriving a plurality of vectors each being mapped to one of the one or more objects, where each of the plurality of vectors is an element of an N-dimensional space. The computer readable medium also includes instructions for training a support vector machine with a compensatory iterative sample selection technique. The computer readable medium also includes instructions for processing the plurality of vectors with the support vector machine, so as to classify each of the plurality of vectors into either the first class or the second class.

In another aspect, the invention is a computer readable medium including stored instructions adapted for execution on a processor. The computer readable medium includes instructions for deriving a plurality of pixel patches from the digital image, each of the plurality of pixel patches being mapped to one of the one or more objects, where each of the plurality of pixel patches is an element of an N-dimensional space. The computer readable medium also includes instructions for training a support vector machine with a compensatory iterative sample selection technique. The computer readable medium also includes instructions for processing the plurality of pixel patches with the support vector machine, so as to classify each of the plurality of pixel patches into either the first class or the second class.

In another aspect, the invention is a computer readable medium including stored instructions adapted for execution on a processor. The computer readable medium includes instructions for deriving a plurality of pixel patches from the digital image, each of the plurality of pixel patches being mapped to one of the one or more objects, where each of the plurality of pixel patches is an element of an N-dimensional space. The computer readable medium also includes instructions for training an ensemble of binary classifiers using an Error Correcting Output Coding decomposition technique. The computer readable medium also includes instructions for processing the plurality of pixel patches with the ensemble of binary classifiers, so as to classify each of the plurality of pixel patches into one of the two or more classes.

In another aspect, the invention is a computer readable medium including stored instructions adapted for execution on a processor. The computer readable medium includes instructions for deriving a plurality of vectors, each being mapped to one of the one or more objects, where each of the plurality of vectors is an element of an N-dimensional space. The computer readable medium also includes instructions for training an ensemble of binary classifiers with a compensatory iterative sample selection technique, using an Error Correcting Output Coding technique. The computer readable medium also includes instructions for processing the plurality of vectors with the ensemble of binary classifiers, so as to classify each of the plurality of vectors into one of the three or more classes.

In another aspect, the invention is a computer readable medium including stored instructions adapted for execution on a processor. The computer readable medium includes instructions for deriving a plurality of pixel patches from the digital image, each of the plurality of pixel patches being mapped to one of the one or more objects, where each of the plurality of pixel patches is an element of an N-dimensional space. The computer readable medium also includes instructions for training an ensemble of binary classifiers with a compensatory iterative sample selection technique, using an Error Correcting Output Coding technique. The computer readable medium also includes instructions for processing the plurality of pixel patches with the ensemble of binary classifiers, so as to classify each of the plurality of pixel patches into one of the three or more classes.

In another aspect, the invention is a computer readable medium including stored instructions adapted for execution on a processor. The computer readable medium includes instructions for deriving a plurality of vectors, each being mapped to one of the one or more objects, where each of the plurality of vectors is an element of an N-dimensional space. The computer readable medium also includes instructions for training using an ensemble of binary classifiers with a compensatory iterative sample selection technique, an Error Correcting Output Coding technique. The computer readable medium also includes instructions for calculating, for each object, a probability that the associated vector belongs to a particular one of the three or more classes, using the Error Correcting Output Coding probability estimation technique. The computer readable medium also includes instructions for generating a confidence map for each object type using the probability calculated for the vector as a confidence value within the confidence map. The computer readable medium also includes instructions for comparing peaks in the confidence map for the object type with corresponding peaks in confidence maps for other classes, and using a highest peak to assign class membership. The computer readable medium also includes instructions for determining localization of the object corresponding to the highest peak by determining pixel coordinates of the highest peak.

In another aspect, the invention is a computer readable medium including stored instructions adapted for execution on a processor. The computer readable medium includes instructions for deriving a plurality of pixel patches from the digital image, each of the plurality of pixel patches being mapped to one of the one or more objects, wherein each of the plurality of pixel patches is an element of an N-dimensional space. The computer readable medium also includes instructions for training an ensemble of binary classifiers with a compensatory iterative sample selection technique, using an Error Correcting Output Coding technique. The computer readable medium also includes instructions for calculating, for each object, a probability that the pixel patch belongs to a particular one of the three or more classes, using the Error Correcting Output Coding probability estimation technique. The computer readable medium also includes instructions for generating a confidence map for each class using the probability calculated for the pixel patch as a confidence value within the confidence map. The computer readable medium also includes instructions for comparing peaks in the confidence map for the class with corresponding peaks in confidence maps for other class, and using a highest peak to assign class membership. The computer readable medium also includes instructions for determining localization of the object corresponding to the highest peak by determining pixel coordinates of the highest peak.

In another aspect, the invention is a computer readable medium including stored instructions adapted for execution on a processor. The computer readable medium includes instructions for deriving a plurality of vectors, being mapped to one of the one or more objects, wherein each of the plurality of vectors is an element of an N-dimensional space. The computer readable medium also includes instructions for training an ensemble of binary classifiers using training sets generated with an Error Correcting Output Coding technique. The computer readable medium also includes instructions for each object corresponding to a class, calculating a probability that the associated vector belongs to a particular one of the three or more classes, using the Error Correcting Output Coding probability estimation technique. The computer readable medium also includes instructions for generating a confidence map for each object type using the probability calculated for the vector as a confidence value within the confidence map. The computer readable medium also includes instructions for comparing peaks in the confidence map for the object type with corresponding peaks in confidence maps for other classes, and using a highest peak to assign class membership. The computer readable medium also includes instructions for determining localization of the object corresponding to the highest peak by determining pixel coordinates of the highest peak.

In another aspect, the invention is a computer readable medium including stored instructions adapted for execution on a processor, comprising. The computer readable medium includes instructions for deriving a plurality of pixel patches from the digital image, each of the plurality of pixel patches being mapped to one of the one or more objects, where each of the plurality of pixel patches is an element of an N-dimensional space. The computer readable medium also includes instructions for training an ensemble of binary classifiers using an Error Correcting Output Coding technique. The computer readable medium also includes instructions for calculating, for each cell, a probability that the pixel patch belongs to a particular one of the three or more classes, using the Error Correcting Output Coding probability estimation technique. The computer readable medium also includes instructions for generating a confidence map for each class using the probability calculated for the pixel patch as a confidence value within the confidence map. The computer readable medium also includes instructions for comparing peaks in the confidence map for the class with corresponding peaks in confidence maps for other classes, and using a highest peak to assign class membership. The computer readable medium also includes instructions for determining localization of the object corresponding to the highest peak by determining pixel coordinates of the highest peak.

In another aspect, the invention is a computer readable medium including stored instructions adapted for execution on a processor. The computer readable medium includes instructions for applying one or more fluorescent markers to a sample containing objects to be classified. The computer readable medium also includes instructions for generating one or more fluorescence images of the sample containing objects to be classified. The computer readable medium also includes generating a transmitted light illumination image of the sample containing objects to be classified. The computer readable medium also includes instructions for superimposing, for each of the one or more fluorescence images, at least a portion of the fluorescence image with a corresponding portion of the transmitted light illumination image. The computer readable medium also includes instructions for using information from the one or more fluorescence images to identify characteristics of corresponding objects in the transmitted light illumination image, thereby producing a transmitted light illumination image having one or more pre-classified objects. In one embodiment, the computer readable medium further includes instructions for using information from the transmitted light illumination image having one or more pre-classified objects to identify characteristics of corresponding elements in one or more subsequently generated fluorescent images.

In another aspect, the invention is a method of classifying one or more cells in a specimen, wherein each of the one or more cells belongs to one of two or more classes. The method comprises deriving a plurality of vectors from a plurality of pixel patches, including at least pixel patches from a digital image of the specimen that is of a first contrast type, and pixel patches from a digital image of the specimen that is of a second contrast type distinct from the first contrast type. The method also includes preprocessing the plurality of vectors using a non-linear feature extraction method, wherein the preprocessing reduces the dimensionality of the vectors. The method also includes generating a plurality of confidence maps, based on the plurality of vectors, wherein each of the plurality of confidence maps corresponds to a particular one of the two or more classes, and wherein each confidence value in that confidence map corresponds to a probability that a vector belongs to that class. This method also includes identifying a cell at a location of a peak in a confidence map; and assigning the cell to the particular one of the two or more classes corresponding to the highest peak among the plurality of confidence maps at the location.

In another aspect, the invention is a computer readable medium including stored instructions adapted for execution on a processor. The computer readable medium includes instructions for deriving a plurality of vectors from a plurality of pixel patches, including at least pixel patches from a digital image of the specimen that is of a first contrast type, and pixel patches from a digital image of the specimen that is of a second contrast type distinct from the first contrast type. The computer readable medium also includes instructions for preprocessing the plurality of vectors using a non-linear feature extraction method, wherein the preprocessing reduces the dimensionality of the vectors. The computer readable medium also includes instructions for generating a plurality of confidence maps, based on the plurality of vectors, wherein each of the plurality of confidence maps corresponds to a particular one of the two or more classes, and wherein each confidence value in that confidence map corresponds to a probability that a vector belongs to that class. The computer readable medium also includes instructions for identifying a cell at a location of a peak in a confidence map; and instructions for assigning the cell to the particular one of the two or more classes corresponding to the highest peak among the plurality of confidence maps at the location.

BRIEF DESCRIPTION OF DRAWINGS

The foregoing and other objects of this invention, the various features thereof, as well as the invention itself, can be more fully understood from the following description, when read together with the accompanying drawings in which:

FIGS. 11a-e depict sample images for a noise variation experiment where the zero-mean Gaussian noise varied between standard deviations: (a) STD=0, (b) STD=15, (c) STD=30, (d) STD=45, (e) STD=60.

FIGS. 13a-c depict sample images for a living cell experiment where in (a) cells are almost completely separate and the background is clean, (b) most cells are attached to each other and there are trash and debris in the background, and (c) most cells are clumped together and the background is full of trash and debris.

FIG. 21b depicts a fluorescence image of the same specimen as FIG. 21a

FIG. 22 shows the detection of cells in the specimen of FIG. 21a.

DESCRIPTION OF THE PREFERRED EMBODIMENTS

Figure 1A:
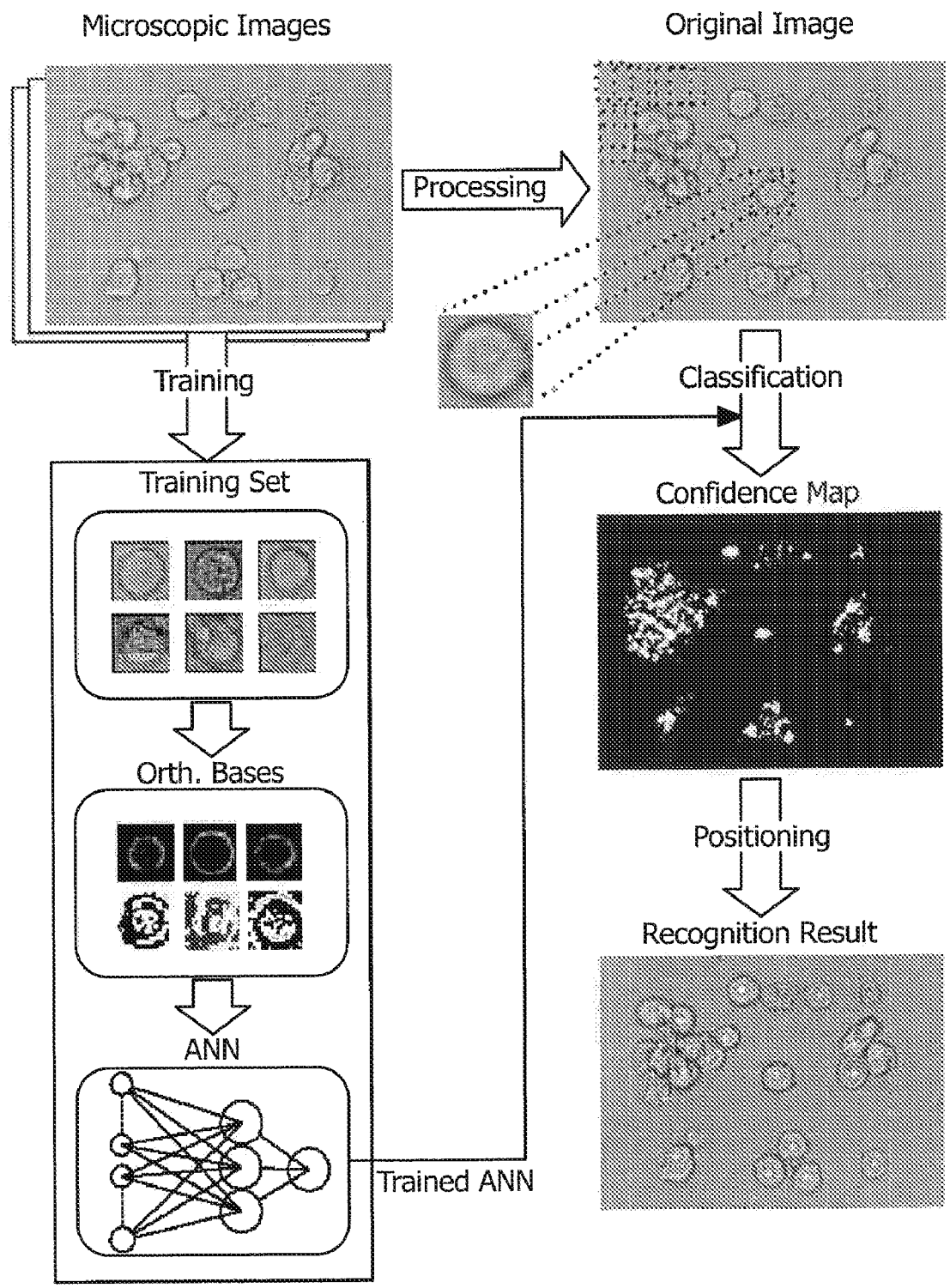
FIGS. 1a and 1b is a flow diagram of a method for identifying at least one cell or other identifiable substance in a sample according to one embodiment of the invention.

The present invention generally provides methods and systems for identifying and/or localizing one or more identifiable objects within a sample. The objects can include physical objects or substances, such as a living cell or cells, or portions thereof, in a digitized image of a sample. Alternatively, the objects can include informational objects such as data blocks or a DNA code sequence stored in a suitable storage medium.

The objects that can be identified are generally all items that can be represented by feature vectors. In general, the invention identifies objects by analyzing such vectors. In some embodiments, the vectors are derived from images. The term "substance" is used herein to denote items that have a mass and occupy space, including solid as well as liquid and gaseous materials. Although the described embodiments are set forth herein by way of example with respect to certain types of substances, such as cells, and certain analytical techniques, it is understood that the present invention is generally applicable to various other types of living or non-living materials and techniques, and with or without all of the components or subcomponents described herein, and is thus not limited thereto.

Machine Vision Component

At least one embodiment includes a machine vision component, which reduces or eliminates the need for intensive microscopic observation by a human operator. The machine vision component is generally a computing device with associated software that, when executed, identifies and/or recognizes objects (e.g., individual cells or portions thereof, or other identifiable substances) within an image. The machine vision component also generates information related to the objects, such as the position of the object (e.g., coordinates with respect to a reference position) or particular characteristics of the object (e.g., whether the cells are viable or non-viable). The machine vision component operates on image data produced by a microscopy component. In one embodiment, the machine vision component is capable of identifying cells or portions thereof in a culture having a plurality of cells that vary or are non-uniform with respect to their features, and/or are partially aggregated.

Automatic cell recognition or identification can be facilitated with fluorescent probes that have a chemical specificity for cell organelles. For example, DNA intercalators can be used to stain nuclear DNA for cell identification. Fluorescent probes used in this respect, however, can consume one or more fluorescence channels. In one embodiment of the invention, the machine vision component is capable of identifying cells based on their feature set using transmitted light illumination, thereby permitting all of the available fluorescence channels to be used for other purposes, such as to provide additional cellular and sub-cellular information that can greatly enhance the value of the information obtained by molecular genetic analysis.

In one embodiment, pixel patches are used as the primary input data elements. The described embodiment uses a square pixel patch, but other embodiments can use pixel patches having different shapes, such as rectangular, circular, elliptical, or a shape matched to the objects to be detected. In a typical pixel patch of 25×25 pixels (which is enough to enclose a complete cell), there are 625 pixels, each of which is characterized by a grayscale intensity. In the described embodiment, the value of the grayscale intensity can range from 0 to 255, inclusive, although other grayscale ranges can be used. The ordered set of these 625 grayscale intensities generates a 625-dimensional input vector for the software. Essentially, the software is taught to sort pixel patches into two or more classes. Some classes contain desired objects (such as cells or viable cells). Other classes contain all undesired objects (e.g., non-cells or non-viable-cells, fragments of cells, trash). Classes of desired objects are usually much smaller (regarding the number of elements of the class) than the class of undesired objects. This embodiment scans the overall image by moving a pixel box one pixel per step, until the image has been covered. This technique of scanning the images neglects a band of cells at the periphery of the image that is one half of the width of the pixel box, although other scanning techniques can be used instead of or in addition to the described technique to address the neglected band of cells.

Figure 1B:
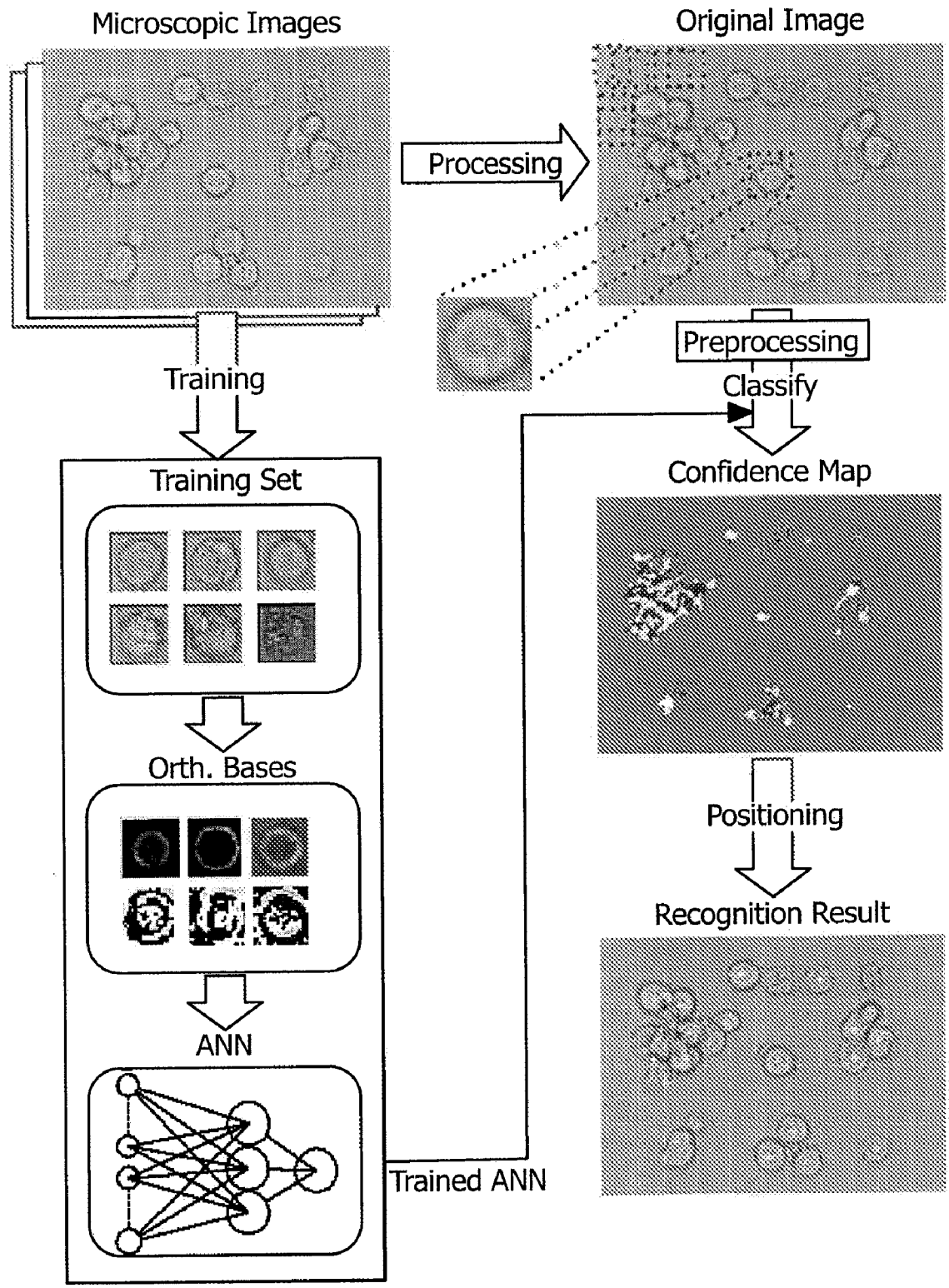

Referring to FIG. 1a, in one embodiment, the machine vision component identifies cells in a culture using algorithms derived based on machine learning techniques, such as Artificial Neural Networks ("ANN") or Support Vector Machines (SVM). ANNs are able to capture complex, even nonlinear, relationships in high dimensional feature spaces that are not easily handled by algorithms based on heuristic rules. The ANN-based algorithms can use pixel values directly from primary grayscale images (bright field) for cell recognition; however, the image data processed by these types of algorithms is very large, which results in networks that can be very complex and exhibit slow performance. Accordingly, in one embodiment of the invention, the image data is preprocessed, as shown in FIG. 1b, using statistical data processing techniques, such as Principle Component Analysis ("PCA"), Independent Component Analysis ("ICA"), Self-Organization Maps ("SOM"), or preferably Fisher's Linear Discriminant ("FLD") techniques. Such preprocessing generates abstract representations of cells from the image data that are dimensionally smaller, which makes subsequent classification computationally effective. One embodiment achieves computational effectiveness by processing image data to provide a cell classifier, e.g., the ANN or the SVM, with only the information that is essential for cell recognition.

PCA can be used for dimensionality reduction by using a set of orthogonal vectors, referred to as principal components, that point in the directions of maximum covariance in the image data as the basis of the new subspace. If the dimension of the subspace is given, PCA minimizes the mean square reconstruction (projection) error, and provides a measure of importance for each axis. More formally, suppose the learning set x is composed of n sample images ($x=\{x_1, x_2, \ldots x_n\}$), where each image is represented by a vector $x_i$ in an N-dimensional image space. The goal is to find a linear transformation that maps the input set to an M-dimensional subspace, where M<N. After defining $x'=\{x'_1, x'_2, \ldots x'_n\}=\{(x_1-\mu), (x_2-\mu), \ldots (x_n-\mu)\}$, where $\mu$ is the sample mean, the new feature vector set $y=\{y_i\}$ can be defined by the linear transformation:

$$y = W^T x', \quad y_i = W^T x'_i \qquad (1)$$

and $$\tilde{x} = Wy = WW^T x', \qquad (2)$$
$$\tilde{x}_i = Wy_i = WW^T x'_i, \quad i = 1, 2, \ldots, n,$$

where W is an N×M matrix whose columns form a orthonormal basis of the subspace and $\tilde{x}$ is the reconstruction from y. PCA seeks to minimize the mean square reconstruction error:

$$J_e = E\{\|x' - \tilde{x}\|\} \qquad (3)$$
$$= E\{tr[(x' - \tilde{x})(x' - \tilde{x})^T]\}$$
$$= tr(S_r) - tr(W^T S_T W)$$

where $$S_T = x' x'^T = \sum^n (x_i - \mu)(x_i - \mu)^T$$

is an N×N matrix called total scatter. Note that the last term of (3) is equal to the variance of y:

$$tr(W^T S_T W) = tr(W^T x' x'^T W) = E\{tr(yy^T)\} \quad (4)$$

Therefore, minimizing the mean square reconstruction error is equivalent to maximizing the projection variance. The optimal transformation matrix $W_{opt}$ in PCA then can be defined as:

$$W_{opt} = \arg\max_W |W^T S_T W| \quad (5)$$

A larger eigenvalue means more variance in the data captured by the corresponding eigenvector. Therefore, by eliminating all eigenvectors except those corresponding to the highest M eigenvalues, the feature space for recognition is reduced from the original N-dimensional image space to the subspace spanned by the top M eigenvectors. The eigenvectors have the same dimension as the original vectors.

Note that although the PCA projection is optimal for reconstruction from a low dimensional basis, it is not optimal from a classification point of view, for it only considers the total scatter of the whole sample set and makes no discrimination within the sample points. In PCA, the total scatter is maximized. Therefore, there is not only maximization of the between-class scatter, which is useful for classification, but there is also maximization of the within-class scatter, which should be minimized. Consequently, PCA can retain or even exaggerate unwanted information. Points from individual classes in the low dimensional feature space can therefore not be well clustered, and points from different classes could be mixed together.

As described above, the PCA method treats the learning set as a whole. Since the learning set is labeled in different classes, it should be possible to use this information to build a more reliable representation for classification in the lower dimensional feature space. The key to achieving this goal is to use class specific linear methods, such as the FLD technique, which considers not only between-class variation but also within-class variation, and optimizes the solution by maximizing the ratio of between-class scatter to within-class scatter. This can be expressed in mathematical terms as follows. Assume that each image in the learning set belongs to one of c classes $\{C_1, C_2, \ldots, C_c\}$. The between-class scatter matrix $S_B$ and within-class scatter matrix $S_W$ can be defined as:

$$S_B = \sum_{i=1}^{c} m_i (\mu_i - \mu)(\mu_i - \mu)^T \quad (6)$$

and $$S_W = \sum_{i=1}^{c} \sum_{x_k \in C_i} (x_k - \mu_i)(x_k - \mu_i)^T \quad (7)$$

where $\mu$ is the grand mean, $\mu_i$ is the mean of class $C_i$ and $m_i$ denotes the number of images in class $C_i$. The objective of FLD is to find the $W_{opt}$ maximizing the ratio of the determinants of the above scatter matrices:

$$W_{opt} = \arg\max_W \frac{|W^T S_B W|}{|W^T S_W W|} \quad (8)$$

$W_{opt}$ is known to be the solution of the following generalized eigenvalue problem:

$$S_B W - S_W W \Lambda = 0 \quad (9)$$

where $\Lambda$ is a diagonal matrix whose elements are the eigenvalues. The column vectors $w_i$ (i=1, ..., m) of matrix W are eigenvectors corresponding to the eigenvalues in $\Lambda$.

Figure 3A:
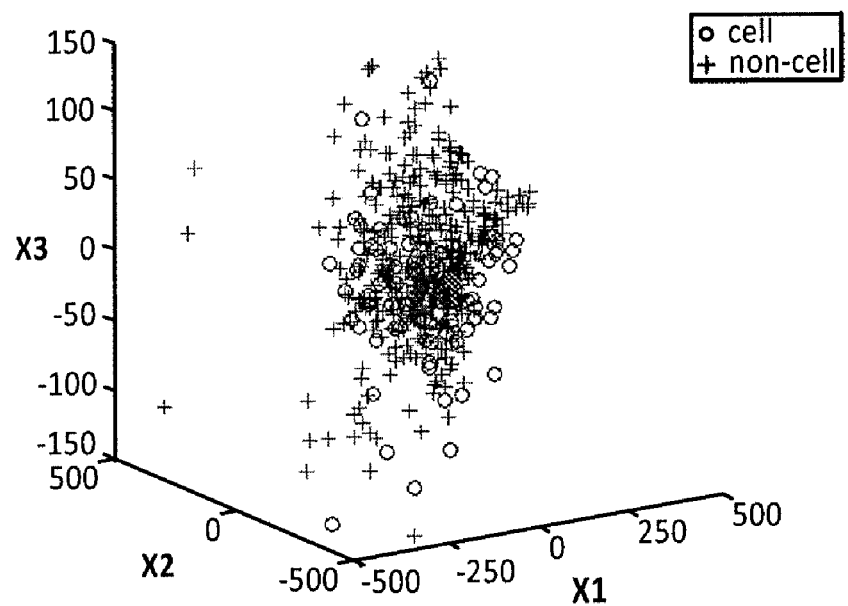
FIGS. 3a-3b are graphical representations comparing PCA and FLD where (a) is projected with PCA and (b) is projected with FLD.
Figure 3B:
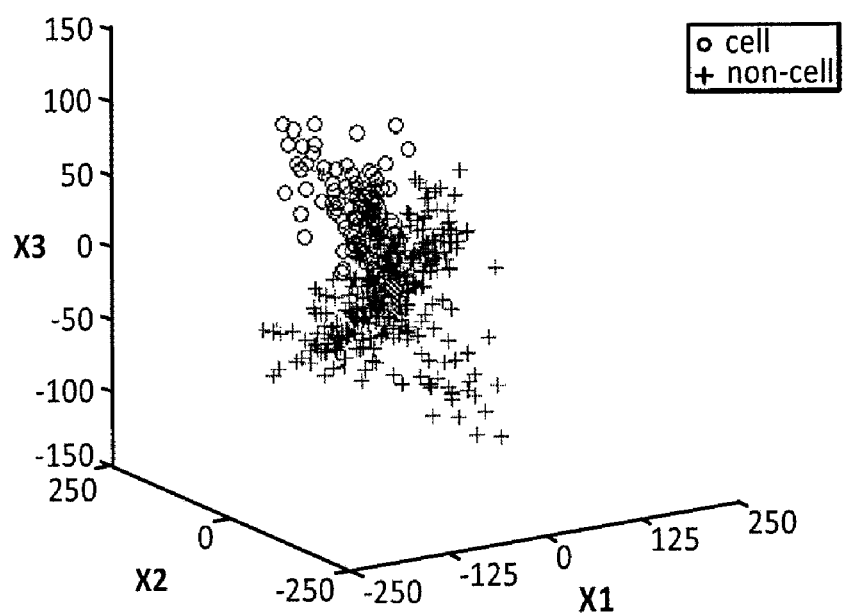

Compared to the PCA method, the representation yielded by FLD tries to reshape the scatter instead of conserving its original details. FLD emphasizes the discriminatory content of the image. To illustrate the benefit of FLD projection, the learning set described above was projected to a three-dimensional subspace using PCA and FLD, results of which are shown in FIGS. 3a and 3b, respectively. One can see that although the point distribution range of PCA projection is greater in all three directions, (i.e., the total scatter is larger), the points from different classes are somewhat mixed together. On the other hand, the points from different classes in FLD projection are better separated and, therefore, more suitable for classification.

Figure 2:
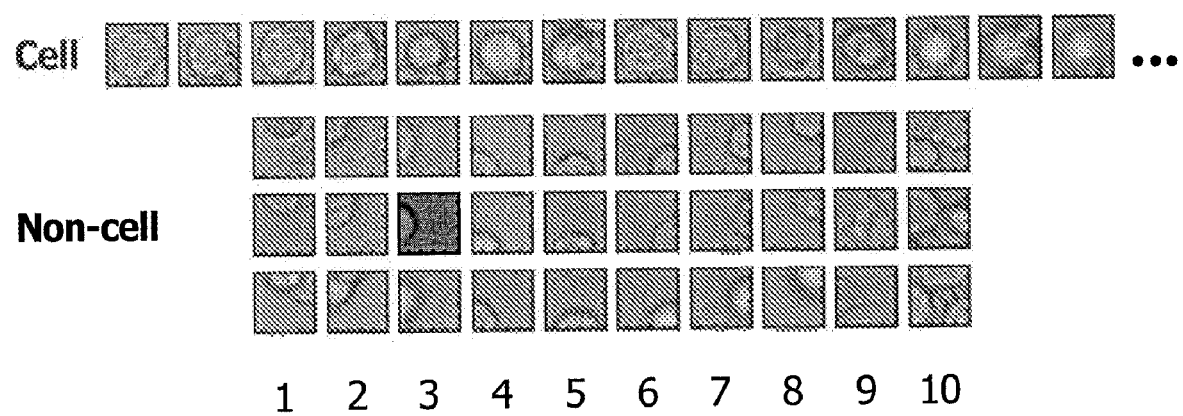
FIG. 2 depicts images of a sample set of cell patches for use in a learning set according to one embodiment of the invention.

When FLD is used, the dimension of the resulting subspace must be reduced to no more than n−1, where n is the number of recognition classes. Instances for which there are only two recognized classes (e.g., cell and non-cell) result in a one-dimensional subspace, which can be inadequate for cell representation. In one embodiment, the non-cell classes are divided into two or more subclasses. For example, as shown in FIG. 2, the non-cell classes can be divided into 10 subclasses, which result in a total class number of 11, making FLD use practical. Thus, the difficulty with FLD can be overcome by treating the cell detection as a multi-class problem in the preprocessing stage, and as a binary classification problem in subsequent stages. The division of the "non-cell" class into multiple subclasses allows one to generate processed input vectors with sufficient dimensionality for effective cell recognition. This maneuver is possible because the "non-cell" class is highly heterogeneous in relation to the "cell" class.

In one embodiment, the ANN is trained to recognize whether an image patch contains a centered cell body or a viable/non-viable cell, as the case can be. This is generally accomplished with image patches represented by feature vectors derived in preprocessing. The ANN uses the input-output mapping learned from a set of training samples to generalize to data not "seen" before. FIG. 2 shows a learning set of cell image patches used to train the ANN, which is manually selected from microscopic images for testing. A similar set is also used to train the ANN to detect microspheres in a sample. The learning set $\Omega$ is composed of two subsets ($\Omega = \Omega^{pos} + \Omega^{neg}$). $\Omega^{pos}$ contains patches of centered cells and is labeled "cell". All images in $\Omega^{pos}$ belong to a single class. $\Omega^{neg}$ is labeled "non-cell" and is divided into 10 sub-classes according to the similarity of the images. For example, subclasses 1-8 contain a specific fraction of a cell. Images in subclass 9 are almost blank and subclass 10 includes images with multiple fragments of different cells.

The training of an ANN involves gradually modifying the synaptic weights according to the back-propagated output error for each sample, until the desired average responses are obtained on the entire set. In one embodiment, the network structure is designed to be flexible by allowing the size of the network to be adjusted as a result of easily changing only a few parameters. In one embodiment, three layers in addition to the input layer are used: two hidden layers, and one output layer. The size of the neural network can be adjusted according to the size of training set and dimension of input vectors. In order to be able to establish all possible representations, a bias weight in addition to the inputs is included in each neuron. The hyperbolical tangent sigmoid function, TANSIG (x), can be used as the transfer function throughout the network.

After a network is trained with examples, the most important issue is how well the network generalizes to new data. The capacity for generalization greatly depends on the structure of the neural network. Generally, more neurons in the hidden layers give the system more capacity to partition the data. However, if the network has too many neurons, it will learn insignificant aspects of the training set and lose its generalization ability, a phenomenon termed "overfitting." Although there is no universal simple rule to determine how many hidden units are required for a given task, one rule of thumb is to obtain a network with the fewest possible neurons in the hidden layer. Using the smallest possible size not only helps improve generalization, it also increases the computational speed of the system, for there is roughly a linear relationship between network size and speed.

One method to train an ANN with good generalization ability is to start with a small initial network and gradually add new hidden units in each layer until efficient learning is achieved. To avoid drawbacks associated with this training method, such as slow learning and difficult-to-avoid local minima, a pruning strategy can be used, which starts with a large network and excises unnecessary weights and units. The training results of the ANNs are discussed below in the examples section in connection with FIGS. 5-15.

As an alternative classifier to Artificial Neural Networks (ANN), Support Vector Machines (SVM) for cell recognition can also be used. SVMs like ANNs, are statistical learning machines that use supervised learning techniques and therefore eliminate the need for end user programming. SVMs have been successfully applied to distinguish between unstained viable and non-viable cells in bright field images, as discussed in X. Long, W. L. Cleveland and Y. L. Yao, *Automatic Detection of Unstained Viable cells in Bright Field Images Using a Support Vector Machine with an Improved Training Procedure*, Computers in Biology and Medicine, 2004, which poses different obstacles in comparison to cell and non-cell determinations.

In cell recognition, the training sample set is extremely large and highly unbalanced, in comparison since the number of pixel patches in the "viable-cell" (VC) class is much smaller than the number in the "not-a-viable-cell" (NAVC) class. The nature of a SVM is such that it requires a memory space that grows quadratically with the training sample number. Therefore, in practice, an SVM is typically trained with a small subset of the pixel patches available for training, raising the possibility that the chosen subset is not representative. The above problem has been solved where the two classes are balanced, i.e., where both are represented by comparable numbers of class elements, however, the problem has not been solved when classes are unbalanced and the number of samples is large relative to the available computational resources.

To handle instances where there is relatively high degree of imbalance, iterative SVM training, e.g., a "compensatory iterative sample selection" (CISS) technique, can be applied, which involves selecting a working set of pre-classified objects from the set of possible training objects. In one embodiment, the initial working set contains approximately equal numbers of samples from both classes, such as cell and non-cell, even though the classes are unbalanced. The SVM can then be trained with the initial working set and tested on the remainder of the pre-classified objects. From the set of incorrectly classified objects, a replacement set of a fixed size can then be selected, randomly or otherwise, and used to replace an equal number of objects in the working set. In one embodiment, the relative contributions of the classes are constrained to the replacement set. That is, in cases where there is an imbalance in the classes, the replacement set contains a larger proportion of the misclassified objects of the larger class. The contribution of the smaller class can also be negated or replaced with samples from the larger class. The replacement set is not therefore randomly chosen from the misclassified objects of the combined classes; rather, the replacement set is derived only from misclassified objects of the much larger class, which compensates for the imbalance. The SVM can then be trained with the new working set and retested. This procedure can be repeated until satisfactory accuracy is achieved, or until no further improvement occurs.

In many cases with highly imbalanced classes, a useful SVM can also be trained with a working set that includes most or all of the smaller class. However, in other cases, the size of the smaller class can be too large for this to be done. In these instances, the SVM can be trained with a working set with less extreme weighting. For example, a 10%-90% weighting might be better than the 0%-100% weighting used. The same solution can be applied to the selection of the replacement set. The weighting used can generally be optimized empirically to provide the best results.

SVMs represent an approximate implementation of the SRM principle and were first introduced to solve pattern recognition and regression estimation problems. In what follows, we denote the training data as $(x_i, y_i = f(x_i))$: $i = 1, 2, \ldots l$, $y_i \in \{-1, +1\}$, $x_i \in \mathbb{R}^n$.

In a linearly separable case, the SVM classifier follows the intuitive choice and selects the hyperplane (among many that can separate the two classes) that maximizes the margin, where the margin is defined as the sum of the distances of the hyperplane to the closest points of the two classes.

If the two classes are non-separable, positive slack variables are introduced to allow some training samples to fall on the wrong side of the separating hyperplane. The SVM then finds the hyperplane that maximizes the margin and, at the same time, minimizes a quantity proportional to the number of classification errors. The trade-off between maximizing the margin and minimizing the error is controlled by a user-adjusted regularization parameter $Q>0$. A large Q corresponds to a high penalty for classification errors.

In many practical cases, however, nonlinear decision surfaces are needed. Nonlinear SVMs can be generalized from linear SVMs by using a nonlinear operator $\Phi(\cdot)$ to map the input pattern x into a higher (even infinite) dimensional Euclidean space H. It has the form:

$$f(x) = w^T \Phi(x) + b$$

Mathematically, it can be shown that the solution of the nonlinear case is:

$$f(x) = \sum_{i=1}^{l} \alpha_i y_i \Phi^T(x_i) \Phi(x) + b = \sum_{i=1}^{l} \alpha_i y_i K(x_i, x) + b,$$

where the coefficients $\alpha_i$ are the solution of the following convex QP problem:

$$\max L_D(\alpha_i) = \sum_{i=1}^{l} \alpha_i - \frac{1}{2} \sum_{i=1}^{l} \sum_{j=1}^{l} \alpha_i \alpha_j y_i y_j K(x_i, x_j),$$

subject to $0 \leq \alpha_i \leq C$, and $$\sum_{i=1}^{l} \alpha_i y_i = 0,$$

where the function $K(\cdot, \cdot)$ is called kernel function and defined as $$K(x,z) \equiv \Phi^T(x)\Phi(z)$$

It turns out that, in a typical problem, only the coefficients $\alpha_i$ of a few training samples will be nonzero. These samples are called "Support Vectors" (SVs). Let $s_j$, $\alpha^*_j$, $j=1, 2, \ldots, m$, (m<1) denote these SVs and their corresponding nonzero coefficients. The decision function in (2) can be rewritten in the "sparse" form of the support vectors as:

$$f(x) = \sum_{j=1}^{m} \alpha^*_j y_j \Phi^T(s_i) \Phi(x) + b = \sum_{j=1}^{m} \alpha^*_j y_j K(s_j, x) + b$$

This form shows that the decision functions are determined only by the SVs, which typically represent a very small fraction of the whole training set.

The impractically large size of the "NAVC" class and the extremely unbalanced size ratio of "NAVC" to "VC" class make this application a very difficult case. In many applications, random selections of training sets with a controllable size will typically be made. However, since only a very small portion of the total set is used, the randomly selected training sets may not be representative.

Researchers have proposed a "decomposition" algorithm to make use of all the available training samples. The algorithm exploits the sparseness of SVM solution and iteratively selects the "most representative" examples for the classes. In the context of SVMs, "most representative" refers to samples that are close to the boundary and are difficult to classify. Osuna's algorithm has been modified to produce an algorithm referred to herein as "Compensatory Iterative Sample Selection" (CISS) to handle the extremely unbalanced training sample set. The new algorithm includes four steps:

1) Construct an initial working set S (with a user-selected size 1) from the whole training set $S_T$, such that S consists of all samples from the "VC" class $S_V$, and a comparable number of samples randomly selected from the very large "NAVC" sample set $S_N$.
2) Train a SVM classifier f(x) with S and use f(x) to classify the remainder of the preclassified training set $S_T$. Put misclassified "NAVC" samples into a set $S_M$.
3) From $S_M$, a "replacement set" of size n is randomly selected and is used to replace an equal number of "NAVC" samples in the working set which were correctly classified in step 2.
4) Repeat steps 2)-3) until no further improvement occurs.

This algorithm differs from that of an earlier approach in the following ways:

1) In Step 1, when generating the initial working set, the earlier approach arbitrarily chose samples from the whole training set. Since only balanced classes were used in their case, the resulting working set was also approximately balanced. In our algorithm, since the training set is extremely unbalanced, arbitrary choices of samples from the whole training set would result in a working set that is likewise extremely unbalanced. To solve this problem, we constrained the initial working set to contain all the samples from the "VC" class and a comparable number of samples randomly selected from the very large "NAVC" class.
2) In the strategy of the earlier approach, there is no deliberate control of the relative contributions of the two classes to the replacement set. This has been shown to work well for balanced cases. We have tested this approach with highly unbalanced classes and found it to be unusable (data not shown). In our algorithm, we deliberately constrain the relative contributions of the two classes to the replacement set. In the detailed studies described below, we make the contribution of the "VC" class zero and replace only samples from the much larger "NAVC" class.

CISS leads to a reduced classification error that converges to a stable value. Essentially, we show that substitution of correctly classified "NAVC" samples in the working set S with misclassified "NAVC" samples from $S_N$, an improvement of the function for max $L_D(\alpha_i)$ above can be achieved.

Let $S=\{(x_1,y_1), (x_2,y_2), \ldots, (x_l,y_l)\}$ be the working set used to train the SVM classifier, and let $S_N=\{(x_{l+1},y_{l+1}), (x_{l+2},y_{l+2}), \ldots, (x_L,y_L)\}$ be the remainder of the training samples, where $y_i=-1$ i=l+1, l+2, \ldots, L, i.e. total training set $S_T = S \cup S_N$.

Let $\Lambda_1 = \{\alpha_1, \alpha_2, \ldots, \alpha_l\}$ be an optimal solution to (3) when training with the working set S. We can extend it to the entire training set as $\Lambda = \{\alpha_1, \alpha_2, \ldots, \alpha_i, \alpha_{i+1}, \alpha_{i+2}, \ldots, \alpha_L\}$ with $\alpha_i=0$, i=l+1, l+2, \ldots, L. Note that although the solution of $\Lambda$ is optimal over working set S, it can not be optimal over $S_T$. Since the SVM guarantees to find the optimal solution, what we need to prove here is that the solution $\Lambda$ is not necessarily optimal when we replace a correctly classified sample in S with one that is misclassified in $S_N$.

We now replace a correctly classified (randomly chosen) sample $\alpha_i=0$, $i \in [1, l]$ (note that for SVMs, points which are correctly classified during the training will have a coefficient of $\alpha=0$) with $\alpha_m=0$, $m \in [l+1, L]$, $y_m f(x_m)<1$. After replacement, the new subproblem is optimal if and only if $y_m f(x_m) \geq 1$.

Assume that there exists a margin support vector $\alpha_p$, with corresponding label $y_p=-1$. We have $0 < \alpha_p < C$ since it is a support vector. (We can also pick out an error support vector; the proof is analogous). Then there exists a positive constant $\delta$ such that $0 < \alpha_p - \delta < C$. Consider a vector $\Lambda'=\{\alpha'_1, \alpha'_2, \ldots, \alpha'_l, \alpha'_{l+1}, \alpha'_{l+2}, \ldots, \alpha'_L\}$ which has the elements: $\alpha'_m = \delta$, $\alpha'_p = \alpha_p - \delta$, and $\alpha'_i = \alpha_i$ for all other elements. Then we have:

$$L_D(\Lambda') = \sum_{i=1}^{L} \alpha'_i - \frac{1}{2}\sum_{i=1}^{L}\sum_{j=1}^{L} \alpha'_i \alpha'_j y_i y_j \times K(x_i, x_j)$$

Note that:

$$\sum_{i=1}^{L} \alpha_i = \sum_{i=1}^{L} \alpha'_i, \alpha'_m = \delta = \delta + \alpha_m \text{ and } \alpha'_p = \alpha_p - \delta.$$

It can be shown that:

$$L_D(\Lambda') = L_D(\Lambda) - \delta[(y_m f(x_m) - 1] - \frac{\delta^2}{2}[K(x_p, x_p) - 2y_p y_m \times K(x_p, x_m) + K(x_m, x_m)]$$

If the δ is chosen small enough, the third term of above can be neglected. Then, above become:

$$L_D(\Lambda')=L_D(\Lambda)-\delta[(y_m f(x_m)-1]$$

Since $y_m f(x_m)<1$, it can be easily shown from the equation above that $L_D(\Lambda')>L_D(\Lambda)$.

An extension of the CISS algorithm is to combine it with multiclass classification techniques as discussed above. For example, in a cell recognition context, the multiclass classification problem arises when there is more than one type of cell in the image. Currently, a popular strategy to handle a multiclass classification problem is to decompose it into a series of binary classifications. An example of one implementation of this strategy is "Error Correcting Output Coding" (ECOC). A binary classifier is trained on each binary problem. Binary classification results are then combined together to give the overall classification. Appendix A of this application (X. Long, W. L. Cleveland, and Y. L. Yao, *Multiclass Cell Detection in Bright Field Images of Cell Mixtures with ECOC Probability Estimation*) provides an ECOC-based probability estimation algorithm to enable the pixel patch decomposition technique described herein to be used in multiclass classification, in particular as applied to bright field images of living cells.

In many cases, the resulting binary classification problems will be also unbalanced, especially in cell detection and localization applications. Specifically, the "non-cell" class will be much larger than the class for any one cell type and often much larger than all of the "cell" classes combined. In these cases, the CISS algorithm is very useful in dealing with the multiclass classification problem since the classification accuracy of a multiclass classifier depends largely on the classification accuracy of each binary classifier and CISS can improve the accuracy of the individual binary classifiers.

Figure 31:
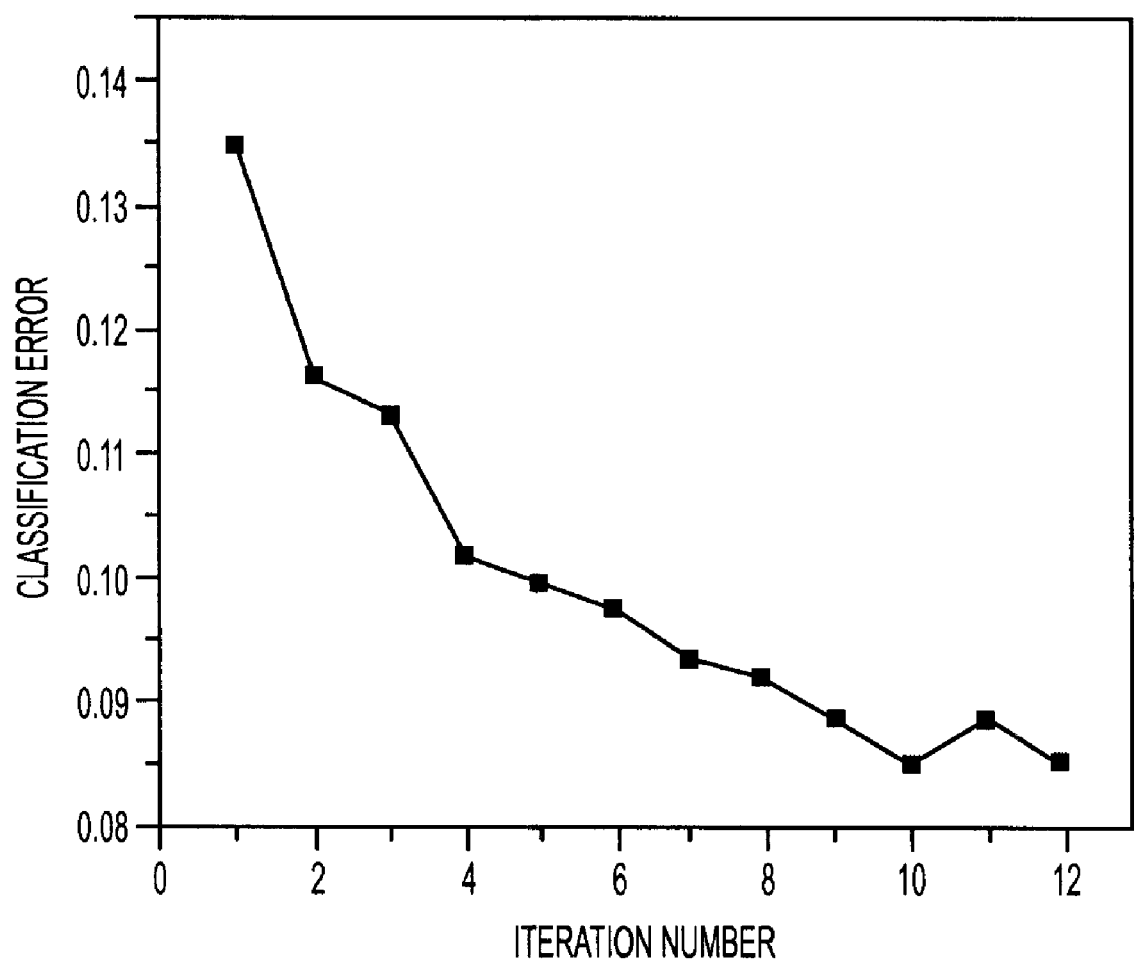
FIG. 31 is a graphical representation of the results obtained with the CISS algorithm in combination with the ECOC decomposition strategy.

FIG. 31 is a graphical representation of the results obtained with the CISS algorithm in combination with the ECOC decomposition strategy. The test set is a randomly generated artificial 2D data set that includes four classes. One class is much larger than the other three. As the graph indicates, the CISS algorithm clearly shows a trend of convergence, and the overall classification error is lowered. The fact that the CISS algorithm converges with randomly generated data emphasizes the generality of this approach, i.e., the application to cell recognition is only one of many possible applications of this method.

Figure 3C:
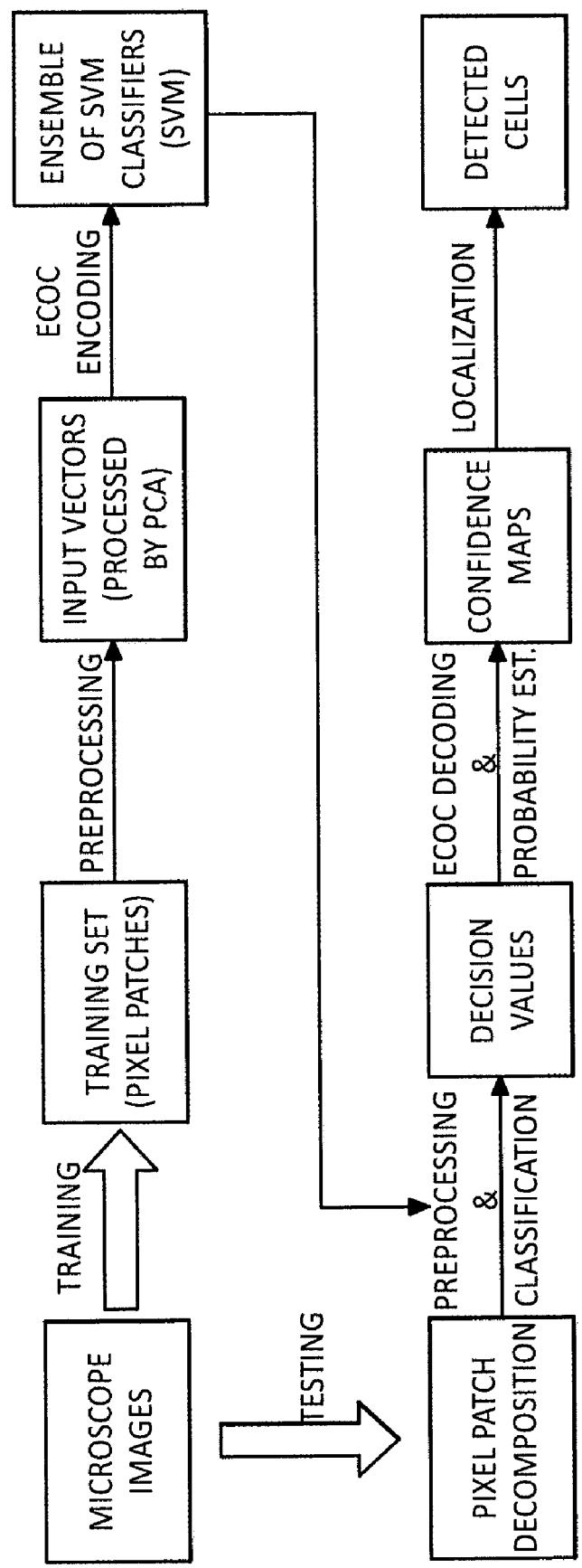
FIG. 3c is flow diagram showing a cell detection framework for bright field images of cultured cells.

An ECOC-based cell detection framework for bright field images of cultured cells is presented in FIG. 3c. The framework employs the multiclass classification and probability estimation ability of our proposed algorithm to analyze bright field images of cell mixtures. It permits not only the identification of the desired cells but also gives their locations relative to the pixel coordinates of the primary image. It also uses pixel patches as the primary input data elements. Essentially, the software is taught to classify pixel patches into different classes. Each class corresponds to a single cell type, except for the larger class containing all undesired objects (e.g. background, fragments of cells, trash), denoted as "non-cell."

Initially, ECOC is used to train an ensemble of SVM classifiers. This is done with input vectors that are derived from manually extracted training patches and are represented as linear combinations of feature vectors derived in Principal Component Analysis (PCA) preprocessing.

For each pixel p in the testing image (excluding pixels in the margin around the edges), a pixel patch centered at that pixel is extracted and represented in the same way as that in training process. The probability that this extracted patch belongs to each class is calculated by ECOC probability estimation. For each class corresponding to a cell type, this probability is then used as a "confidence value" $V[p] \in [0,1]$ in a "confidence map" for that cell type. Pixels in each confidence map are the confidence values of their corresponding patches in the original image and form "mountains" with large peaks representing a high probability of presence of the corresponding cell type. A given peak in a confidence map is compared with the corresponding peaks in the other confidence maps. The confidence map with the highest peak at that location gives the assignment of class membership. The pixel coordinates of the highest peak provide localization. It should be pointed out that generating a confidence map for the "non-cell" class is unnecessary in this case, since localization of the non-cell objects is not important.

Figure 3D:
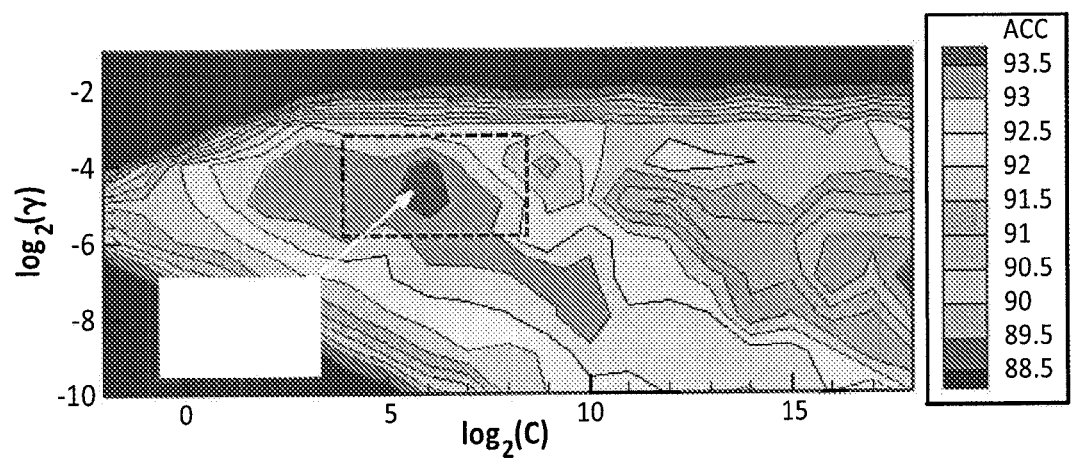
FIG. 3d is a course grid search illustration of a region of interest containing optimal values for a particular embodiment.
Figure 3E:
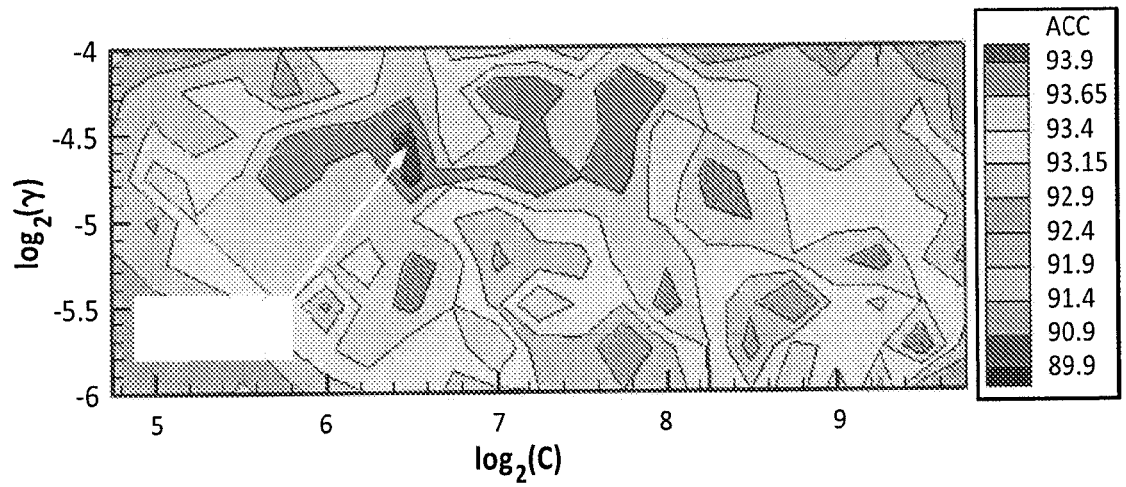
FIG. 3e is a fine grid search illustration of a region of interest.

For the ECOC approach, binary classifiers have to be trained as the base classifiers. The choice of base classifier can be arbitrary. In one embodiment, Support Vector Machines (SVMs) are used with the RBF kernel $K(x,y)=e^{-\gamma\|x-y\|^2}$. The SVM classifier in this embodiment is implemented by modifying LibSVM (see http://www.csie.ntu.edu.tw/~cjlin/libsvm/). The regularization parameter Q and the kernel parameter γ are optimized using a two-step "grid-search" method for each classifier. In the first step, a coarse grid-search with a grid size of 1 was used to localize a Region of Interest (ROI) containing the optimal values (shown in FIG. 3d). In the second step, a fine grid-search over the ROI with a grid size of 0.25 is used to give more precise values for Q and γ. The result is shown in FIG. 3e.

In one embodiment, the standard ECOC method is modified to enable probability estimation. Our new algorithm is an extension of the pairwise coupling method introduced by Hastie and Tibshirani.

The Hastie and Tibshirani's pairwise coupling method can be briefly described as follows. Assume that after training a classifier using the samples from class i (labeled +1) and samples from class j (labeled −1), the pairwise probability estimation for every class i and j (i≠j) is $r_{ij}(x)$. According to the Bradley-Terry (BT) model, $r_{ij}(x)$ is related to the class posterior probabilities $p_i=P(class=i|X=x)$ (i=1, 2, ... k):

$$r_{ij}(x)=P(class=i|class=i\cup class=j, X=x)=p_i(x)/(p_i(x)+p_j(x))$$

Note that $p_i$ is also constrained by $$\sum_{i=1}^{k} p_i(x) = 1.$$

There are k−1 variables but k(k−1)/2 constraints. Further, when k>2, k(k−1)/2>k−1. This means that there may not exist $p_i$ exactly satisfying all constraints. In this case, one must use the estimation $$\hat{r}_{ij}(x)=\hat{p}_i(x)/(\hat{p}_i(x)+\hat{p}_j(x))$$

In order to get a good estimation, Hasti and Tibshirani use the average Kullback-Leibler distance between $r_{ij}(x)$ and $\hat{r}_{ij}(x)$ as the closeness criterion, and find the P that maximizes the criterion.

$$l(P) = \sum_{i<j} n_{ij}\left[r_{ij}\log\frac{r_{ij}}{\hat{r}_{ij}} + (1-r_{ij})\log\frac{1-r_{ij}}{1-\hat{r}_{ij}}\right]$$

this is equivalent to minimizing the negative log-likelihood:

$$l(\hat{P}) = -\sum_{i<j} n_{ij} \left[ r_{ij} \log \frac{\hat{p}_i}{\hat{p}_i + \hat{p}_j} + (1 - r_{ij}) \log \frac{\hat{p}_j}{\hat{p}_i + \hat{p}_j} \right]$$

where $n_{ij}$ is the number of training samples used to train the binary classifier that predicts $r_{ij}$. This can be solved by a simple iterative algorithm:
1. Initialize $P=[p_1, p_2, \ldots p_k]$ with random $p_i(x) > 0$, $i=1, 2, \ldots k$.
2. Repeat $(j=1, 2, \ldots, k, 1, 2, \ldots)$ until convergence:
(a) Calculate corresponding $\hat{r}_{ij}(x) = p_i(x)/(p_i(x)+p_j(x))$.
(b) Calculate $$\hat{P} = \left[ p_1, \ldots, p_{j-1}, \frac{\sum_{i:i\neq j} n_{ji} r_{ji}}{\sum_{i:i\neq j} n_{ji} \hat{r}_{ji}} p_j, p_{j+1}, \ldots, p_k \right]^T.$$

(c) Update $P=\hat{P}/\Sigma \hat{p}_i$.

Pairwise coupling is a special case of ECOC. With some generalization, Hastie and Tibshirani's pairwise strategy can be extended to ECOC with any arbitrary code matrix C. A close look at the ECOC code matrix reveals that it actually divides the samples from different classes into two groups for each binary classifier: the ones labeled "+1" and the ones labeled "−1". In this sense, ECOC with any arbitrary code matrix is equivalent to pairwise group coupling. Therefore Hastie and Tibshirani's results can be generalized to cases where each binary problem involves data in two "teams" (two disjoint subsets of samples), i.e., instead of comparing two individuals, we can compare two groups that are generated by ECOC and estimate the individual probabilities through the group comparisons.

Assuming an arbitrary code matrix T, for each column i of T results in:

$$r_i(x) = P(\text{class} \in I_i^+ \mid \text{class} \in I_i^+ \cup I_i^-, X = x)$$

$$= \frac{\sum_{\text{class} \in I^+} p_{\text{class}}(x)}{\sum_{\text{class} \in I^+ \cup I^-} p_{\text{class}}(x)}$$

where $I_i^+$ and $I_i^-$ are the set of classes for which the entries in the code matrix $T(*, i)=+1$ and $T(*, i)=-1$. If we define:

$$q_i = \sum_{j \in I_i^+ \cup I_i^-} p_j \quad q_i^+ = \sum_{j \in I_i^+} p_j \quad q_i^- = \sum_{j \in I_i^-} p_j$$

Similar to pairwise comparison, the negative log-likelihood must be minimized:

$$\min_P l(P) = -\sum_{i=1}^{l} n_i \left[ r_i \log \frac{q_i^+}{q_i} + (1 - r_i) \log \frac{q_i^-}{q_i} \right]$$

where $n_i$ is the number of training samples of the binary classifier that corresponds to the ith column of the code matrix. The above equation may be solved by a slightly more complex iterative algorithm listed below. This algorithm is equivalent to a special case on probability estimation of Huang et al.'s Generalized Bradley-Terry Model. Since the convergence of Generalized Bradley-Terry Model has been proven, the algorithm is also guaranteed to converge.
1. Initialize $P=[p_1, p_2, \ldots p_k]$ with random $p_i(x) > 0$, $i=1, 2, \ldots k$.
2. Repeat $(j=1, 2, \ldots, k, 1, 2, \ldots)$ until $\partial l(P)/\partial p_i = 0$, $i=1, \ldots, k$ are satisfied.
a) Calculate corresponding $q_i^+, q_i^-, q_i, i=1, 2, \ldots l$.
b) Calculate $$\hat{P} = \left[ p_1, \ldots, p_{j-1}, \frac{\sum_{i: j \in I_i^+} \frac{n_i r_i}{q_i^+} + \sum_{i: j \in I_i^-} \frac{n_i(1-r_i)}{q_i^-}}{\sum_{i: j \in I_i^+ \cup I_i^-} \frac{n_i}{q_i}} p_j, p_{j+1}, \ldots, p_k \right]^T.$$

c) Update $P=\hat{P}/\Sigma \hat{p}_i$.

To get effective cell recognition with an ANNs it can be necessary to use an improved preprocessing strategy (FLD, multiple "non-cell" subclasses). Although effective, this procedure requires human effort in the selection of "non-cell" subclasses. With SVMs, the above strategy is not necessary. After only PCA preprocessing (which is completely automatic), the SVM has sufficient discrimination without the FLD strategy. A feature of SVMs is that the input vectors are implicitly (and automatically) projected into a high (approaching infinite) dimensional hyperspace, which substantially increases the separability of the classes. This has an effect that is equivalent to FLD preprocessing, making the latter redundant and therefore unnecessary. SVMs and ANNs are highly complicated tools that have diverse requirements. In some circumstances, SVMs will be the tool of choice; in others, ANNs will be optimal.

In one embodiment, cells in a digitized microscopic image are detected or classified by extracting, for each pixel p in the microscopic image, a sub-image, which consists of the pixel's m×m neighborhood. The size of m can be adjusted to accommodate cell size. The sub-image is then mapped to a confidence value $V[p]\epsilon[-1,1]$ by the classifier. After all the pixels are processed, a new image (referred to herein as a "confidence map") is created. Pixels in the confidence map are the confidence values of their corresponding sub-images in the original microscope image and form "mountains" with large peaks that represent cell positions. The cell positions/coordinates can then be found by identifying local maxima in mountains. To increase speed, only patches with average pixel intensities above a user-defined value are analyzed further.

EXAMPLES

In one embodiment the ANN is optimized using an empirical method to determine an upper bound for each layer of the network. Then the optimal number of neurons in the two hidden layers are estimated by independently decreasing the number of hidden neurons in each layer from the upper bound to 1, and evaluating the generalization properties of the ANN on the test set at each step. To avoid entrapment in a local error minimum, every training session is repeated five times and the best weights were used for each number of hidden neurons.

Figure 4:
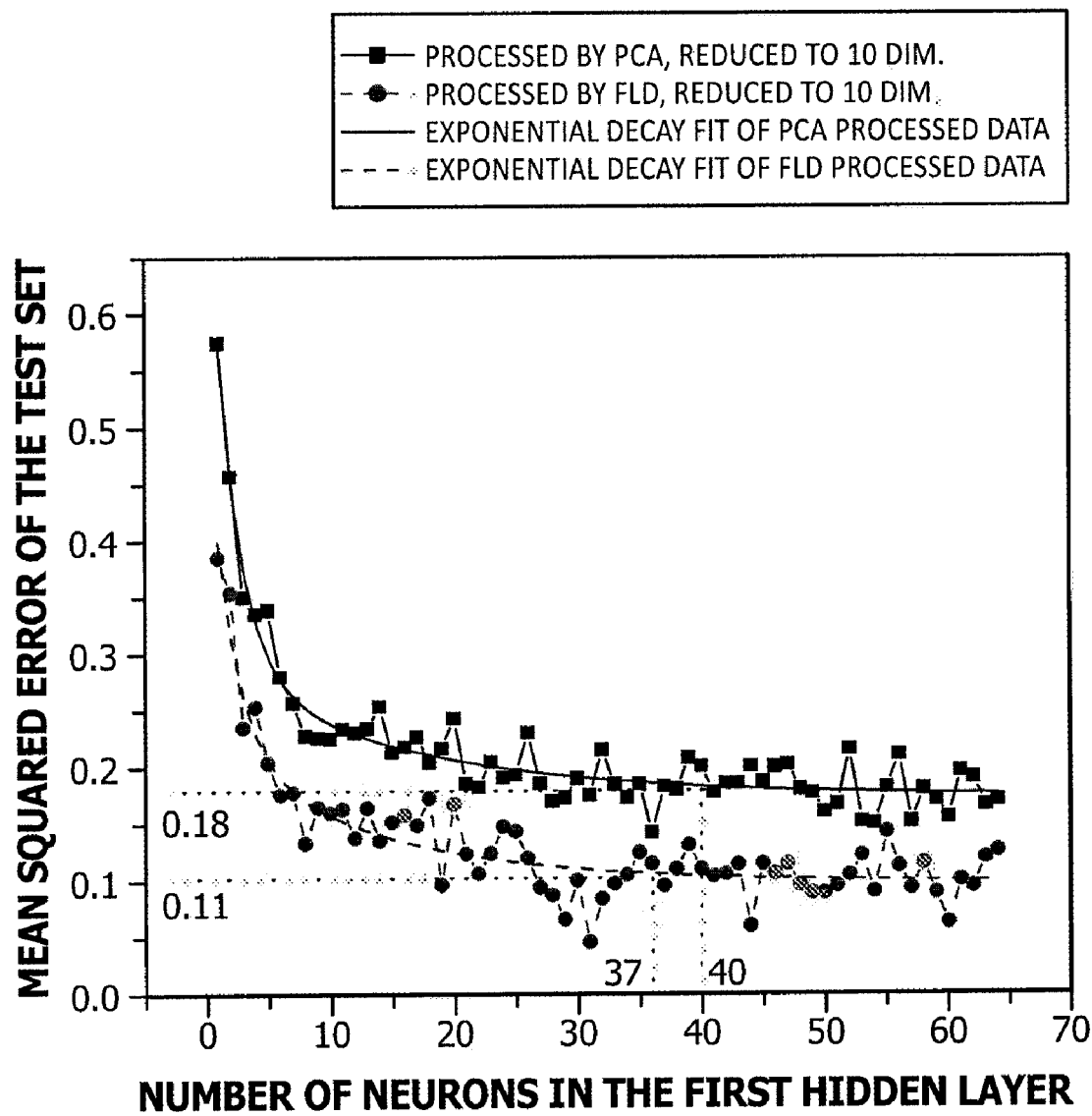
FIG. 4 is a graphical representation showing the effect of neuron number in the first hidden layer on the generalization properties of the ANN.
Figure 5A:
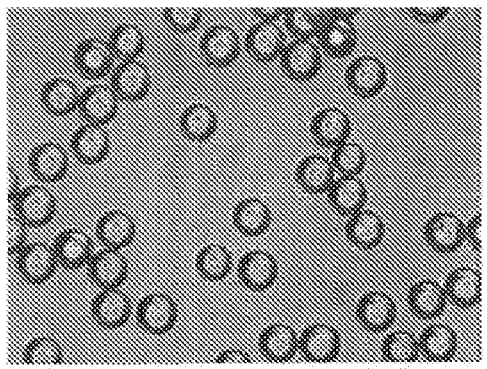
FIGS. 5a-d depict sample images for focus variation experiments where (a) the focal plane is at the equator of the microsphere, (b) the focal plane is at the supporting surface, (c) the focal plane is 2 µm below the equator, and (d) the focal plane is 37.5 um below the equator.
Figure 5B:
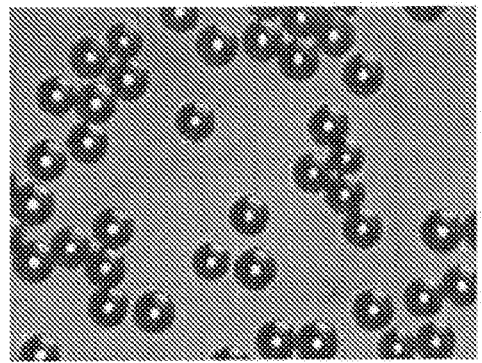
Figure 5C:
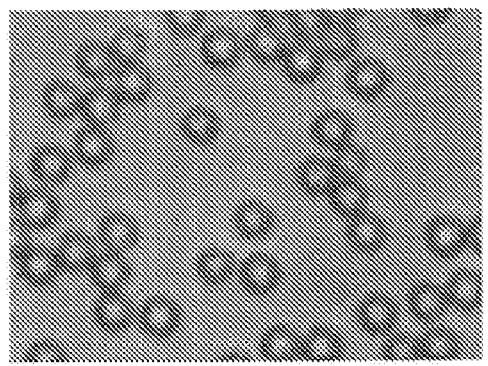
Figure 5D:
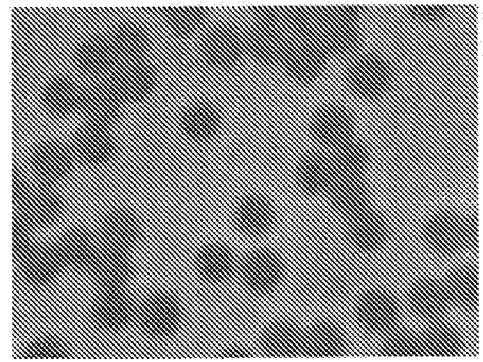

FIG. 4 illustrates the generalization properties of the ANN for different numbers of neurons in the first layer, while keeping the size of the second hidden layer constant at five neurons. The mean squared error (the difference between the actual output and the desired output for the samples in the test set) is plotted versus the number of neurons. The error rate improved as the number of hidden neurons was increased, but leveled out at around 40 neurons when preprocessed by PCA; and 37 neurons by FLD. This experiment was repeated with the number of neurons in the second layer changed from 1 to 10 and similar but worse results were obtained (not shown). Based on above results, one embodiment uses 40 neurons for PCA preprocessing and 37 for FLD preprocessing in the first hidden layer and 5 neurons in the second hidden layer.

Microsphere Experiments

In order to study systematically the factors that affect recognition accuracy and to compare the relative efficiencies of PCA and FLD preprocessing, microspheres were used as model cells. The microspheres are very uniform in size, shape and color and are stable over time. This facilitates experimental reproducibility and makes it possible to create ideal scenes in which critical factors can be individually isolated and well controlled. Furthermore, the ability to create scenes with very small within-class variation by using microspheres permits a test of the hypothesis that FLD gives better performance because it controls within-class variation.

Many experimental factors can affect bright field images of living cells. Among these are variations in focus, illumination, and image noise. These factors could in turn affect cell recognition accuracy. For example, variation in focus is especially important, since it is often the case that there is no single focal plane that is optimal for all the cells in a microscope field. Another factor that could affect the recognition efficiency is the variation in size. The effects of these factors on recognition accuracy were systematically studied. For all microsphere experiments, recognition was performed as described above. For FLD preprocessing, the dimensionality was reduced to 10. For PCA preprocessing, results are shown when both 10 and 20 principal components were used to improve performance.

Figure 6A:
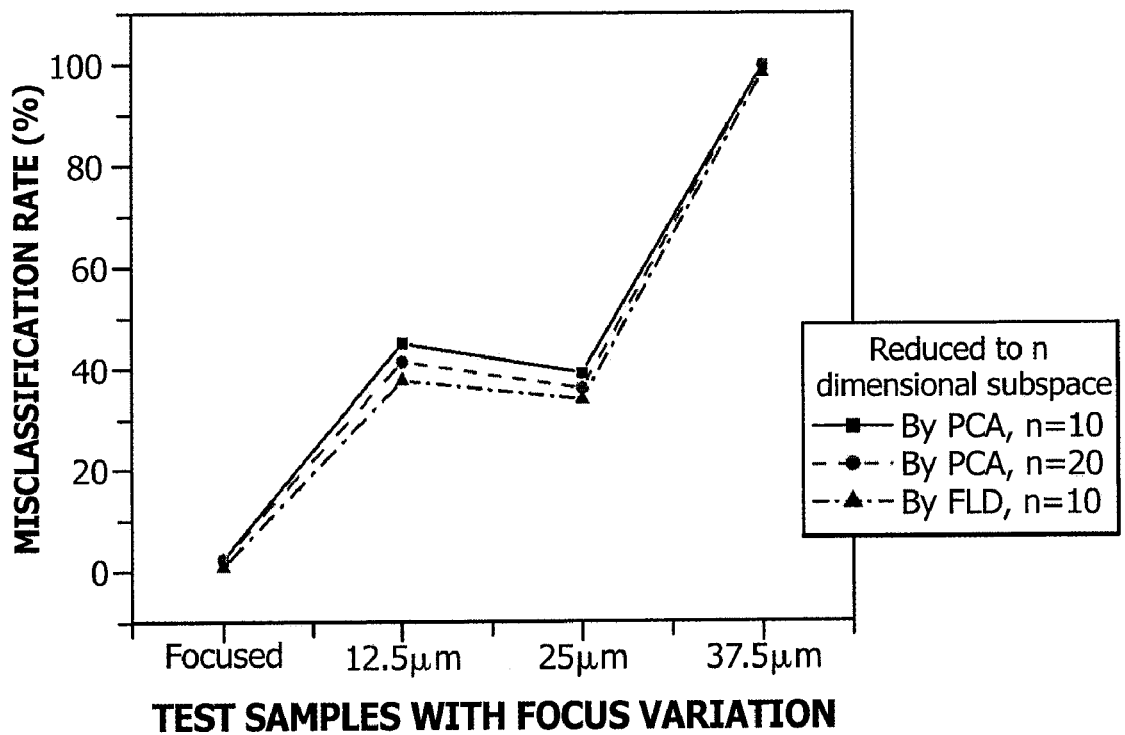
FIGS. 6a-6b are graphical representations showing misclassification rates with different focus conditions and preprocessing methods where the ANN in (a) was trained with only focused samples and applied to all samples, and in (b) was trained with focused and 25 µm focus variation samples and applied to all samples.
Figure 6B:
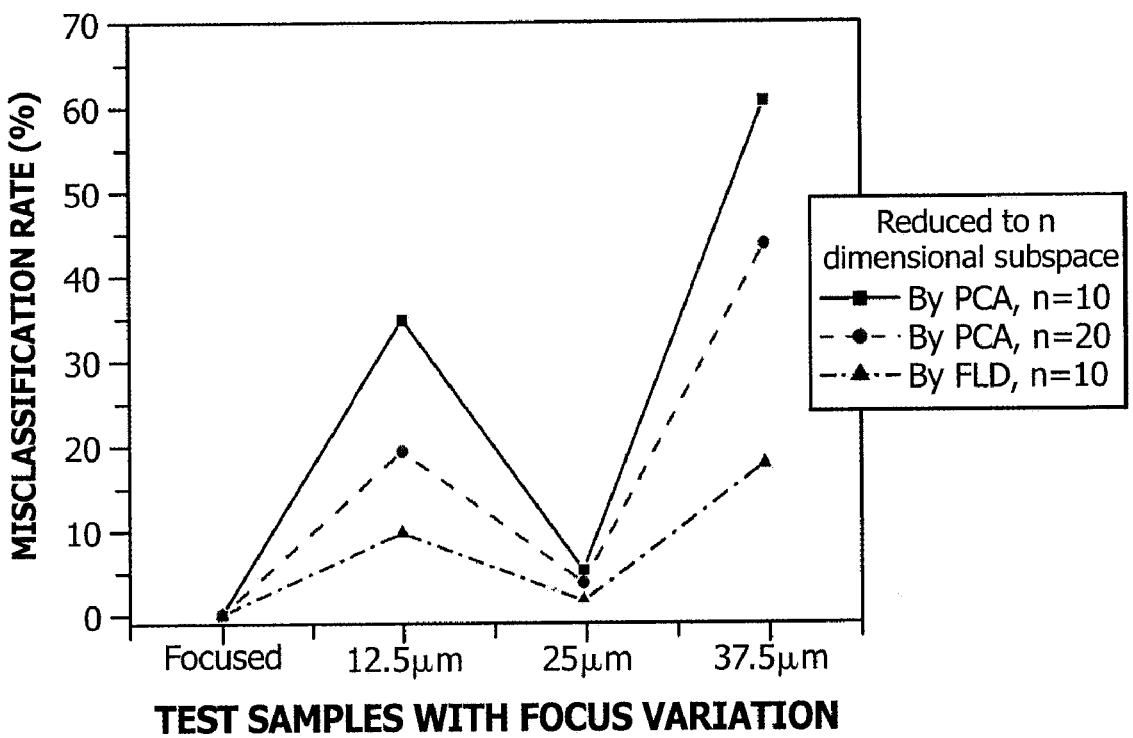
Figure 7A:
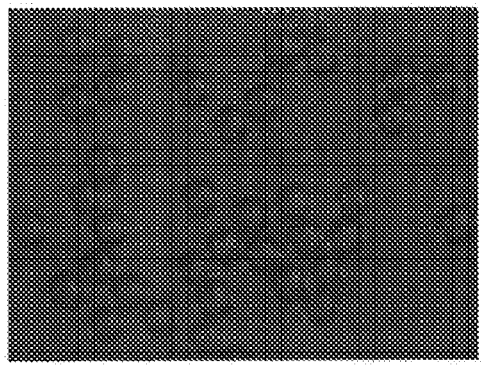
FIGS. 7a-e depict sample images for an illumination variation experiment varying between extremely week extremely strong illumination: (a) Intensity level 3: representing extremely weak illumination; (b) Intensity level 4: representing weak illumination; (c) Intensity level 5: representing normal illumination; (d) Intensity level 6: representing strong illumination and (e) Intensity level 7: representing extremely strong illumination.
Figure 7B:
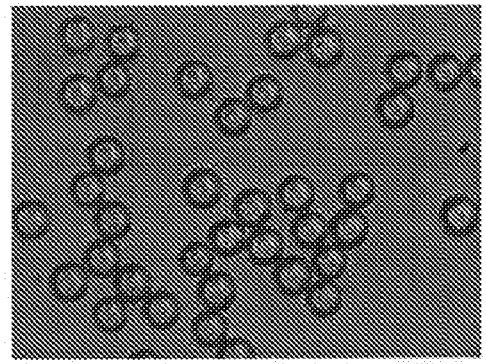
Figure 7C:
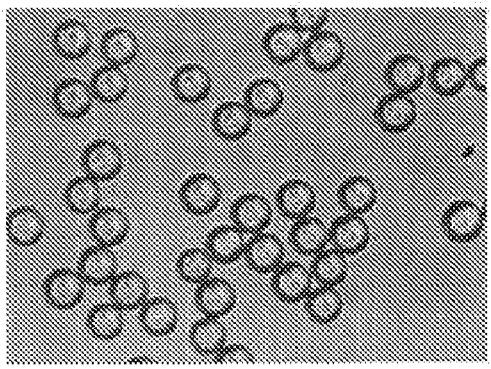
Figure 7D:
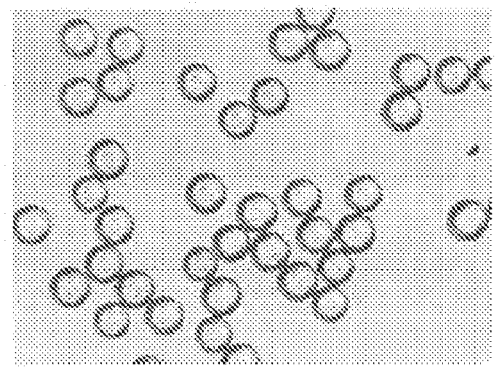
Figure 7E:
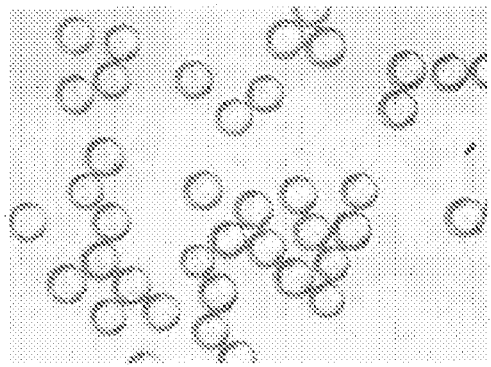

Referring to FIGS. 5a-d, four image groups were created at different focal planes relative to the microsphere equatorial plane to quantify the effects of focus variation, with all other conditions unchanged: (a) focused: the focal plane is at the equator of the microsphere (i.e. 12.5 µm above the supporting surface); (b) 12.5 µm: the focal plane is at the supporting surface; (c) 25 µm: the focal plane is 25 µm below the equator and is within the plastic bottom of the microplate well and (d) 37.5 µm: the focal plane is 37.5 µm below the equator. Two experimental schemes were performed on these images, which are shown in FIGS. 6a-b. In Scheme 1, each method was trained on the first group and then tested on all groups. In Scheme 2, each method was trained on the first and third group and then tested again on all groups, in which the test on the second group was an interpolation test and on the fourth group was an extrapolation test.

Figure 8A:
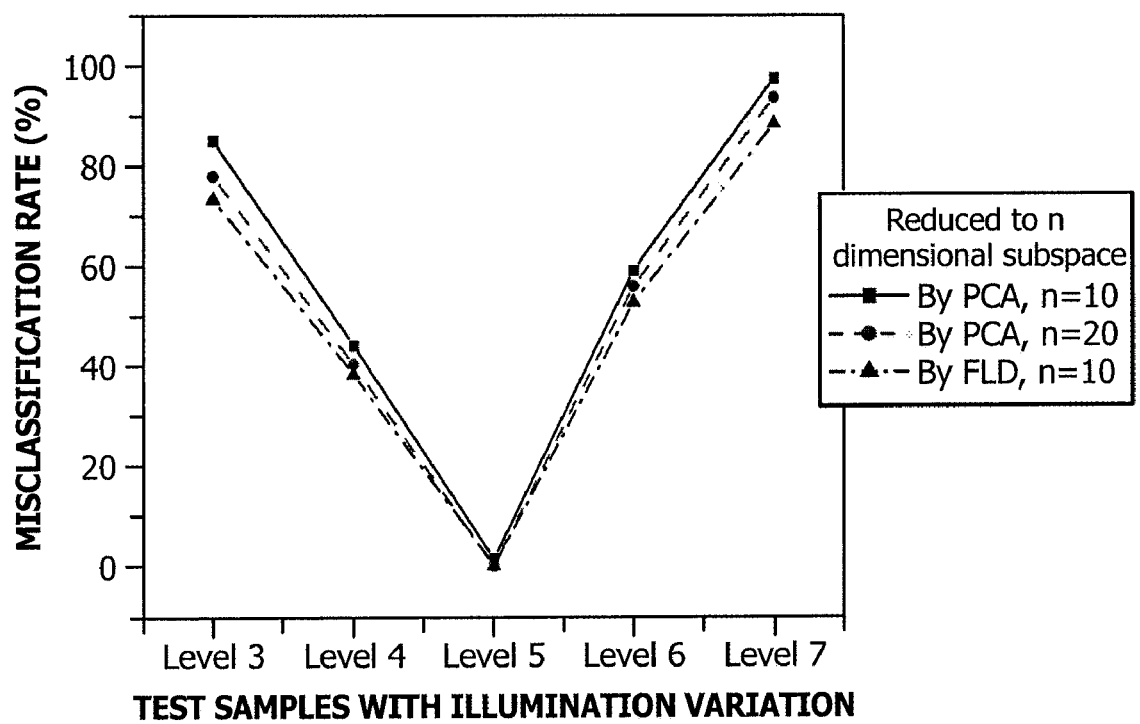
FIGS. 8a-b are graphical representations showing misclassification rates with different illumination conditions and preprocessing methods where the ANN in (a) was trained with only level 5 illumination and applied to all levels, and in (b) was trained with level 4, 5 and 6 and applied to all levels.
Figure 8B:
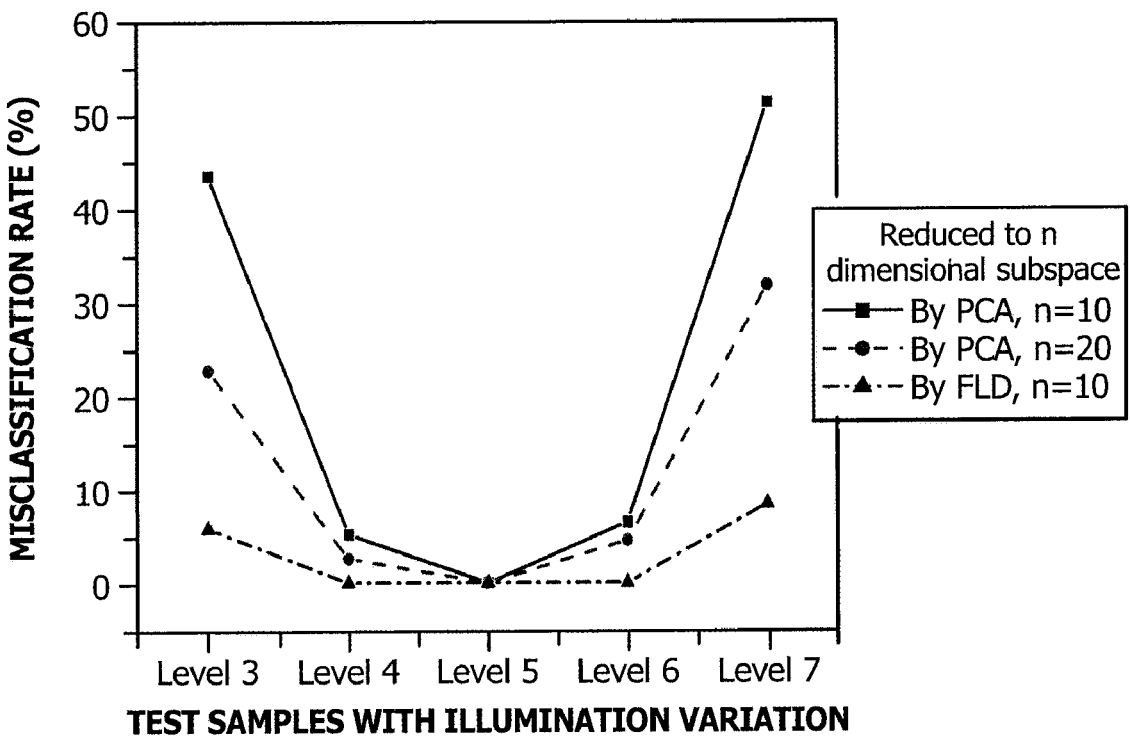

Referring to FIGS. 7a-e, images were taken under five light intensity levels of the microscope: (a) Intensity level 3: representing extremely weak illumination; (b) Intensity level 4: representing weak illumination; (c) Intensity level 5: representing normal illumination; (d) Intensity level 6: representing strong illumination and (e) Intensity level 7: representing extremely strong illumination. Two experimental schemes were performed using these images the results of which as shown in FIGS. 8a-b. To create the situation of small within-class variation, ANNs based on both PCA and FLD were trained with images only in Intensity level 3 and then tested with all levels in Scheme 1. In Scheme 2, within-class variation was purposely introduced by training the neural network with Intensity levels 4, 5, and 6 together and then tested again with all levels.

Figure 9A:
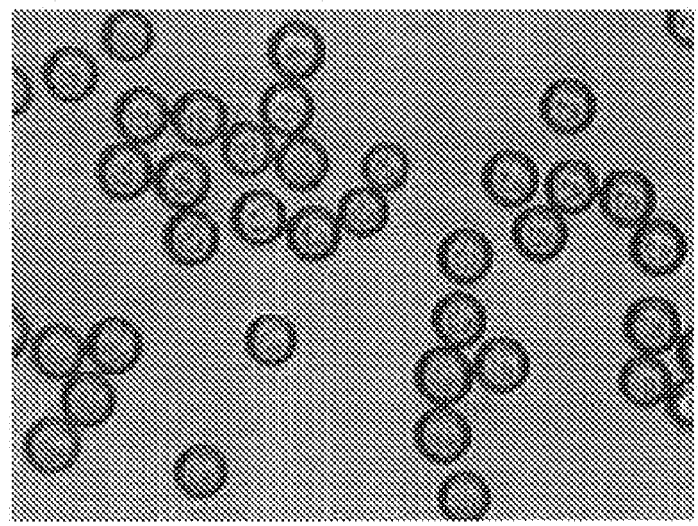
FIGS. 9a-b depict sample images for a size variation experiment where in (a) the microspheres had no size variation and in (b) the microspheres varied between 0% and 20% in size.
Figure 9B:
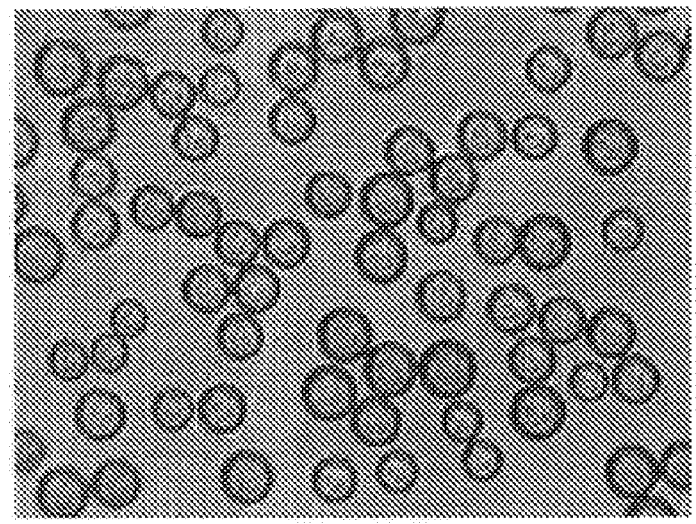
Figure 10A:
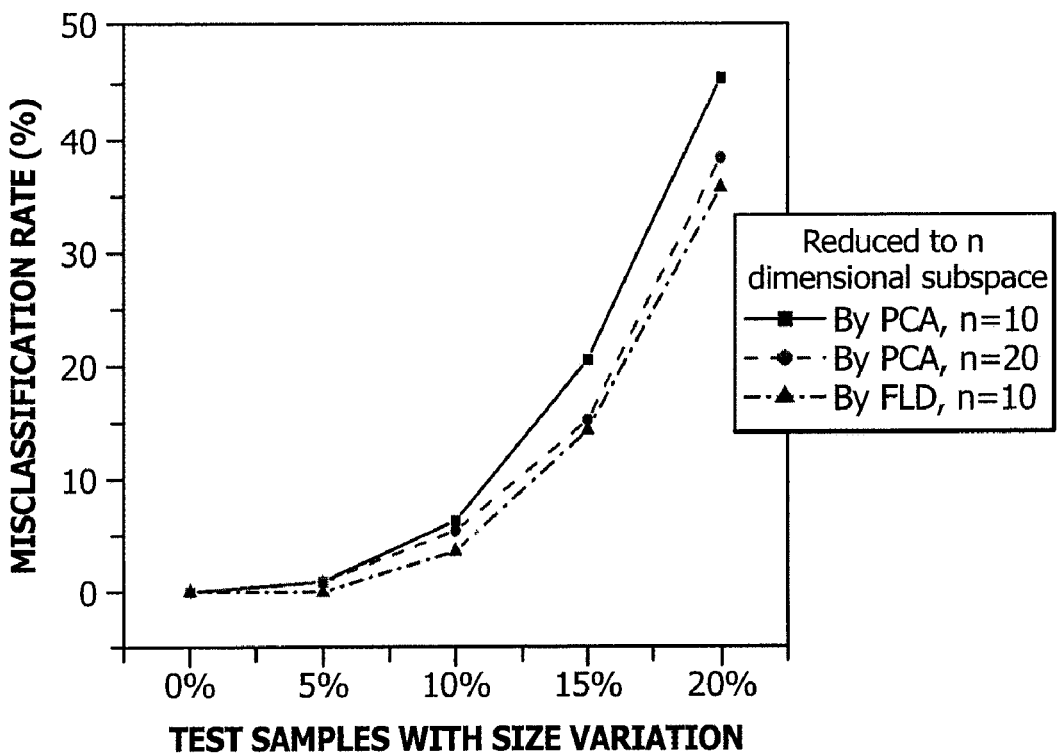
FIGS. 10a-b are graphical representations showing misclassification rates with different size variations and preprocessing methods where the ANN in (a) was trained with only 0% variation samples and applied to all samples, and in (b) was trained with 0% and 15% variation samples and applied to all samples.
Figure 10B:
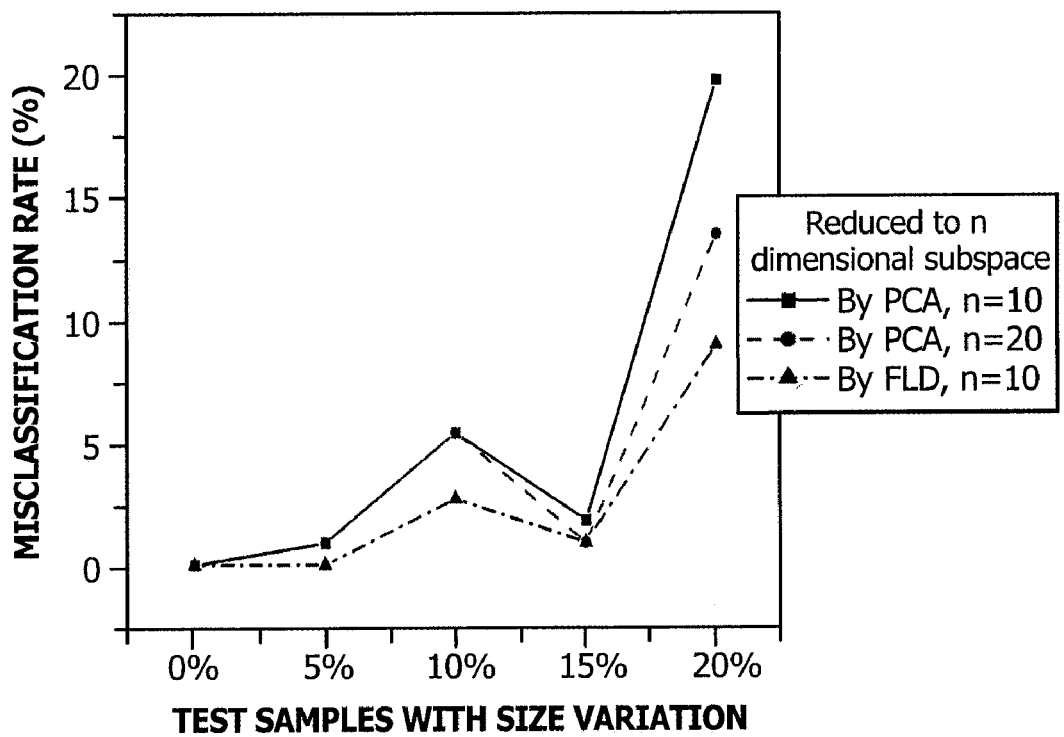
Figure 11E:
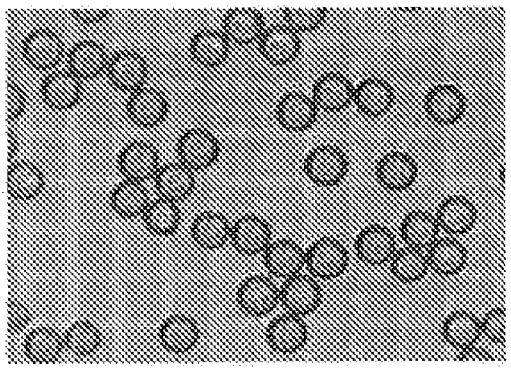
Figure 11E:
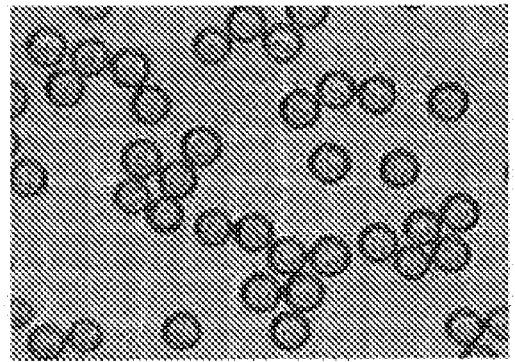
Figure 11E:
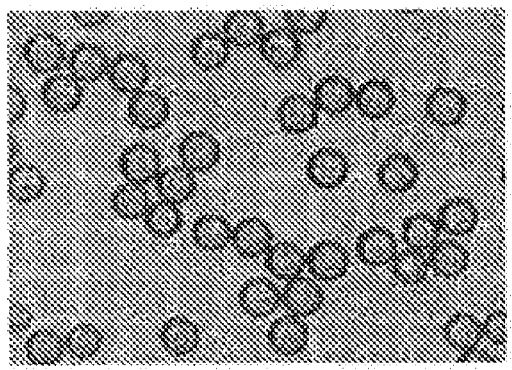
Figure 11E:
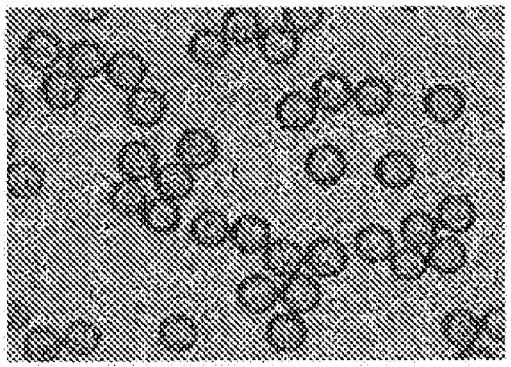
Figure 11E:
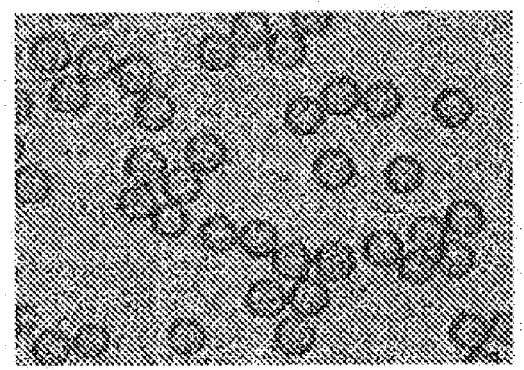

Referring to FIGS. 9a-b, in the size variation experiment, computer generated images of microspheres with 0%, 5%, 10%, 15% and 20% variations in size were used. Again, two schemes were used to examine the effect of size variation on both PCA and FLD methods, results of which are shown in FIGS. 10a-b. In Scheme 1, ANNs were trained with only microspheres having 0% size variation and tested to all sizes. In Scheme 2, they were trained using images with both 0% and 15% variation. The patch size used in both schemes was fixed to a value that was big enough to contain the biggest microspheres.

Figure 12A:
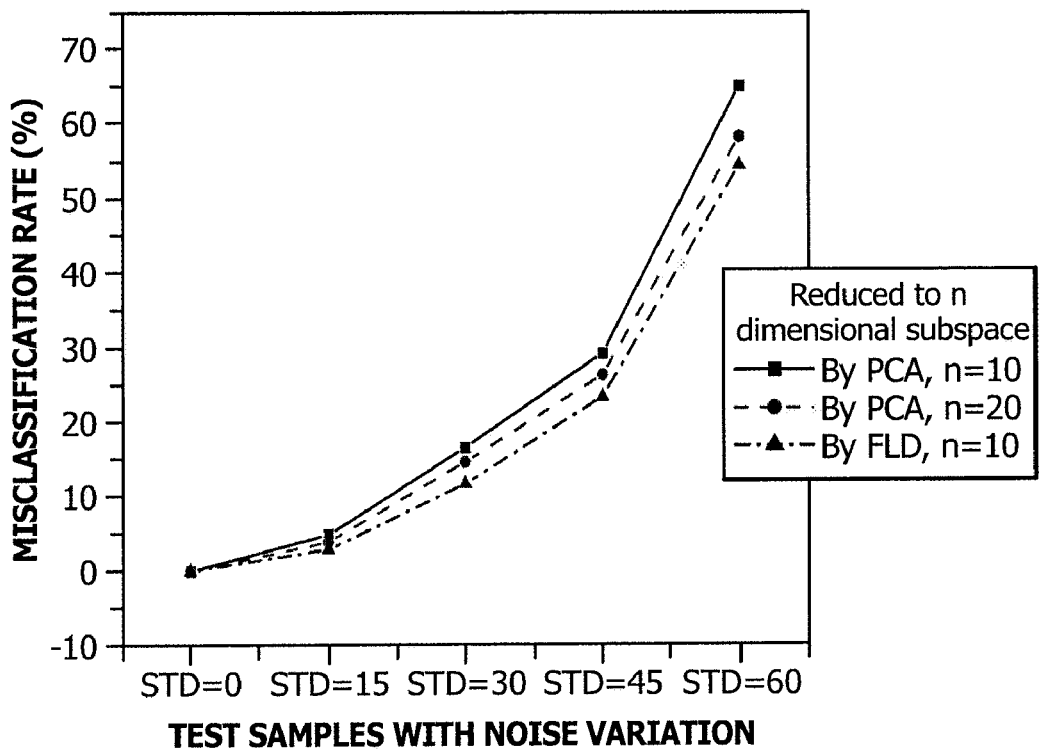
FIGS. 12a-b are graphical representations showing misclassification rates with different noise conditions and preprocessing methods where the ANN is (a) was trained with STD=0 samples and applied to all samples, and in (b) was trained with STD=0, 45 samples and tested on all samples.
Figure 12B:
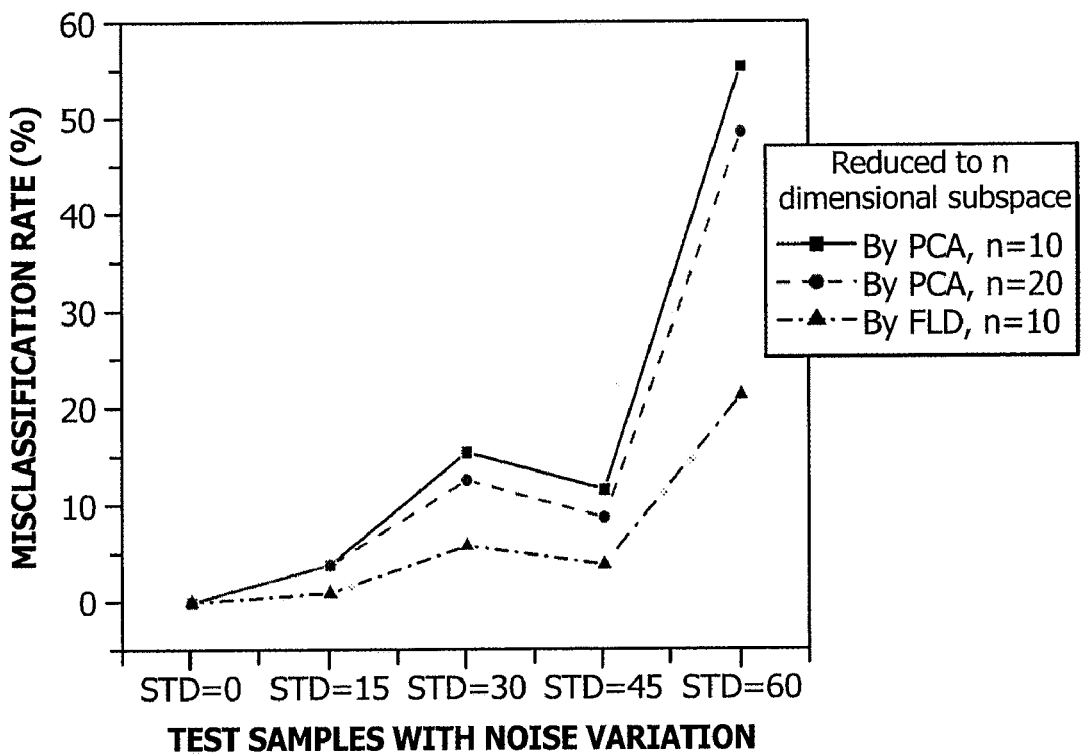

Referring to FIGS. 11a-e, noise used in noise variation experiments was zero-mean Gaussian noise with different standard deviations. An image set with five groups of images, each have different noise levels was created by adding computer generated noise to original images. The original images (standard deviation equals zero) belonged to the first group. Groups 2, 3, 4 and 5 contained images in which the standard deviations equaled 15, 30, 45 and 60 respectively. The two experimental schemes were: first, both PCA and FLD were applied to only Group 1 and then tested on all groups. Second, the training set was expanded to include both Groups 1 and 4. FIGS. 12a-b show the result of the experiments.

It can be seen from the results that both PCA and FLD preprocessing performed well if presented with images in the test set, which were selected, from the group(s) used for training. This is reasonable because the classifiers have learned very similar data during the training. Increasing the number of principal components in PCA preprocessing did improve the performance, but it was still no better than that of FLD. Furthermore, both preprocessing methods performed similarly in Scheme 1 for each of the factors studied, but very differently in Scheme 2, with the error rate of FLD being much less than that of PCA in both interpolation and extrapolation tests. The reason lies in that, for Scheme 1, all images in the training set came exclusively from a single group, in which all microspheres had very homogeneous appearance. Therefore, when we extracted patches from these images and classified them into classes similar to those in FIG. 2, the within-class variations were very small. As expected, FLD was not superior to PCA in this case, since the variation was almost entirely between-class variation. Scheme 2, on the contrary, purposely introduced within-class variation into the training set by using images from different groups. In this case, the FLD method could learn the variation trend from the training set and choose projection directions that were nearly orthogonal to the within-class scatter, projecting away variations in focus, illumination, size and noise; the PCA method could not. Consequently, the generalization ability of the neural network with FLD preprocessing was greatly improved and substantially better than a similar neural network with PCA preprocessing in Scheme 2-type experiments.

Living Cell Experiments

Recognition of living cells in digitized microscope images was also studied. The testing images were divided into three groups denoting three different scenarios. Scenario 1 represents the case where cells are almost completely separate, i.e., not aggregated, and the background is clean. Scenario 2 is more complex where most cells are attached to each other and there are trash and debris in the background. Scenario 3 represents the most complex case where most cells are aggregated together and there is more trash and debris in the background. The three microscope images used in the test are shown in FIGS. 13a-c. These images show considerable out of focus blur, cells in clumps occupying multiple focal planes, as well as size variations.

To obtain a standard for evaluation of our classifiers, three human experts independently evaluated pre-selected microscope images. The experts were asked to identify objects with the normal appearance of a viable cell and to exclude ghosts of cells, i.e., objects having shape and size similar to viable cells but with lower contrast. The three lists generated by the human experts were merged to form one list, called "Human Standard." To be included in the Human Standard list, an object had to be identified as a cell by at least two of the experts.

In experiments with living cells, images were reduced to 10-dimensional subspaces for both PCA and FLD methods. Results obtained the ANN classifiers were compared to the Human Standard by evaluating sensitivity ("SE") and positive predictive value ("PPV"). The SE of a classifier is defined as the percentage of cells in the reference standard, which are identified by the classifier and the PPV is the percentage of classifier detected cells which are also listed in the reference standard.

Figure 14A:
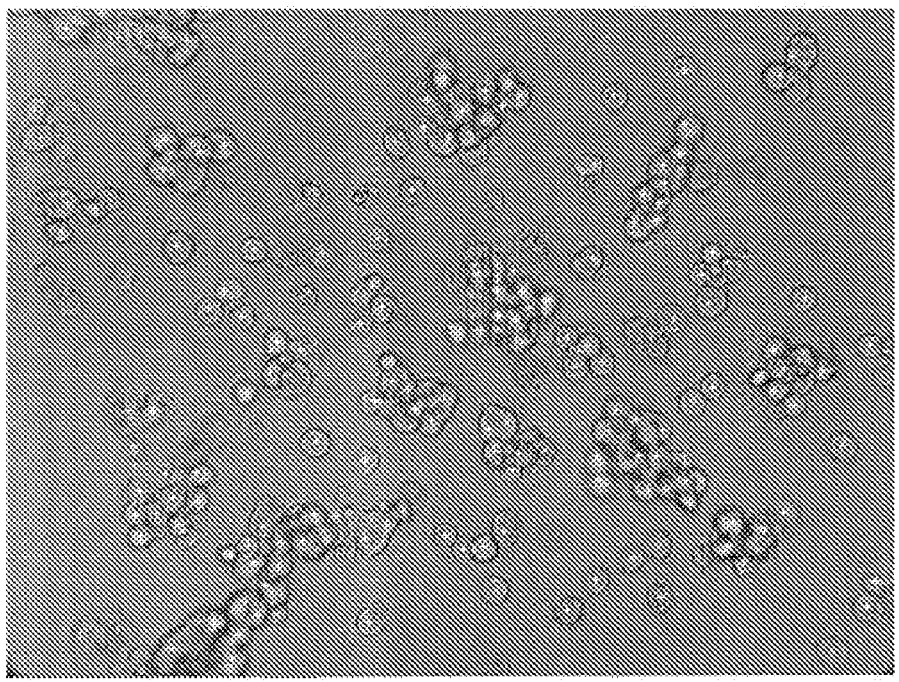
FIGS. 14a-b depict images showing detection results of an ANN classifier with the detected cell positions denoted by white crosses in the images, where identification occurred in (a) using an ANN with PCA preprocessing (Sensitivity: 82.5%, Positive predictive value: 83.02%) and (b) using an ANN with FLD preprocessing (Sensitivity: 94.38%, Positive predictive value: 91.52%).
Figure 14B:
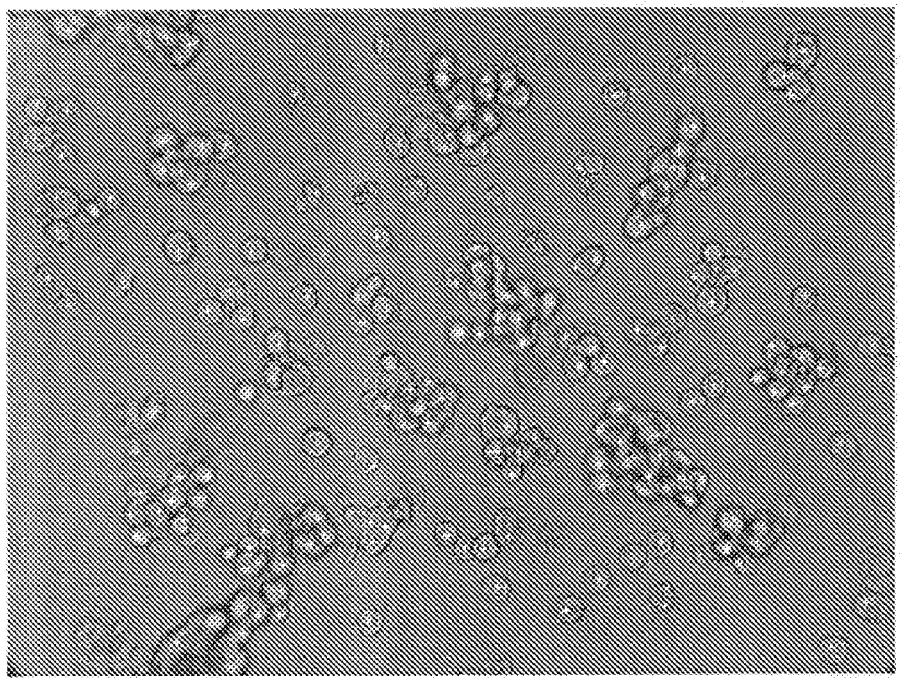
Figure 15:
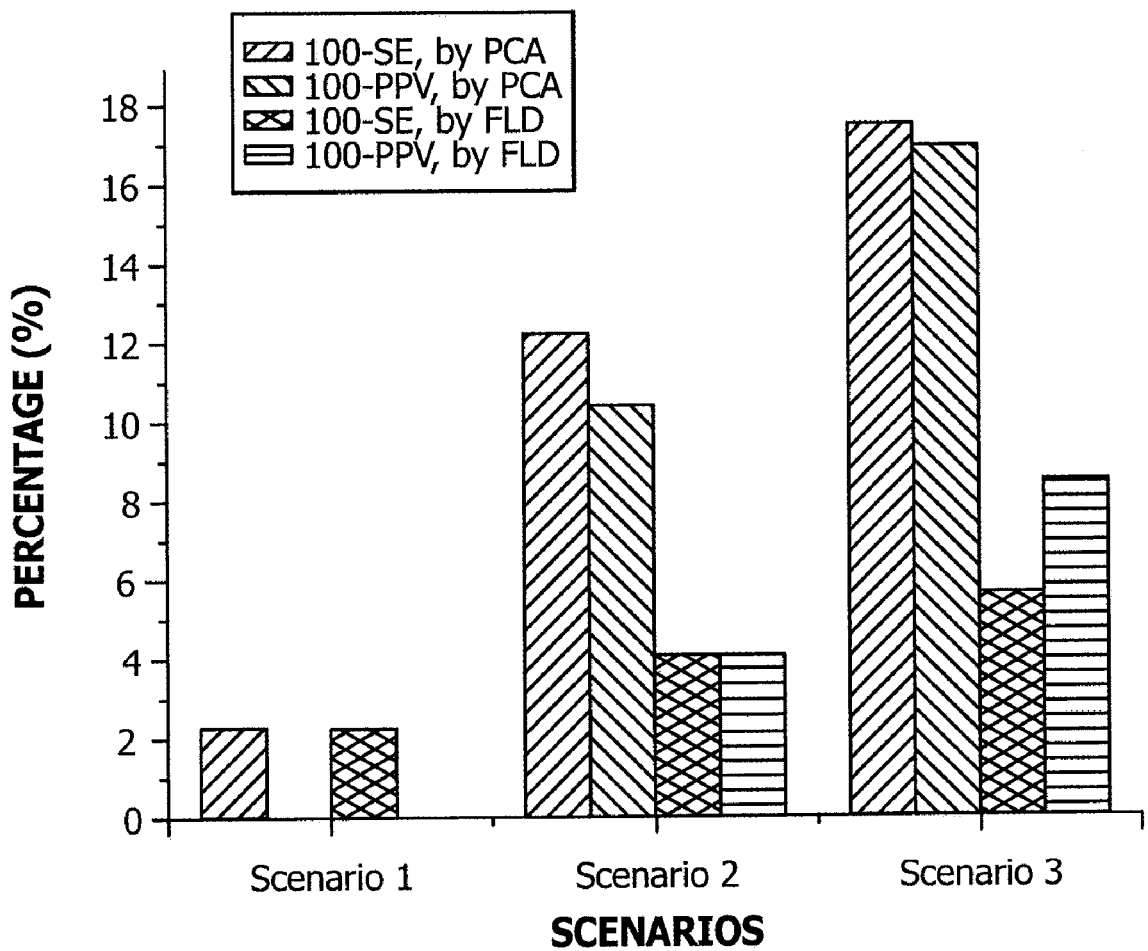
FIG. 15 is a graphical representation showing sensitivity (SE) and positive predictive value (PPV) results for the sample images shown in FIGS. 13a-c using different preprocessing methods.

The cell positions detected by the classifier are denoted by white crosses in the images (see FIGS. 14a-b for Scenario 3 result—Scenarios 1 and 2 are not shown). The detected cells were carefully compared with human standard. SE and PPV results of the classifiers are shown in TABLE 1 below and in FIG. 15.

TABLE 1

|     |     | Scenario 1 | Scenario 2 | Scenario 3 |
| --- | --- | --- | --- | --- |
| PCA | SE  | 97.73% | 87.76% | 82.5% |
|     | PPV | 100%   | 89.58% | 83.02% |
| FLD | SE  | 97.73% | 95.92% | 94.38% |
|     | PPV | 100%   | 95.92% | 91.52% |

The results show that for Scenario 1, both PCA and FLD produced very good results. For example, they both achieved SE values of 97.7% and PPV values of 100%. For Scenario 2, where the image is more complex, the SEs of PCA and FLD dropped to 87.7% and 95.9%, respectively, and PPVs dropped to 89.5% and 95.9%, respectively. These results indicate that the FLD is superior to PCA when the image becomes more complex. This can be seen even more clearly in the very complex case represented by Scenario 3. Here, the SE percentage for FLD is 11.9 greater than that for PCA and the PPV percentage is 8.5 greater.

As noted previously, the results with microspheres suggest that FLD can better generalize from training sets with a single type of confounding factor. The experiments with living cells described in this section clearly show that FLD gives superior generalization even when multiple types of confounding factors are present simultaneously. It should also be noted that a close inspection of results yielded by our algorithm suggests that it can distinguish between cell ghosts and viable cells, similar to a human observer.

The microspheres used in the experiments were 25 μm-diameter, dry-red Fluorescent Polymer Microspheres from Duke Scientific (Cat. No. 36-5). The cells used were K562 chronic myelogenous leukemic cells (ATCC; Cat. No. CCL-243) grown at 37.0° C. in BM+1/2 TE1+TE2+10% fetal calf serum (FCS). For microscope observation, cells and microspheres in culture medium were dispensed into polystyrene 96-well microplates, which have well bottoms that are 1 mm thick. An Olympus Model-CK inverted microscope equipped with a 20× planachromat objective and a SONY DSC-F717 digital camera was used to obtain digitized images. The image processing, ANN training and classification programs were written in MATLAB code and implemented in MATLAB Version 6.5.0.180913a (R13) supplemented with Image Processing Toolbox Version 3.2 and Neural Network Toolbox Version 4.0.2. A standard PC equipped with an Intel Pentium 4/1.6G processor with 256-MB RAM was used.

In order to train and optimize the neural classifier, a set $\Phi$ of 1700 input-output pairs ($\Phi = \{(I_i, O_i)\}$, $i=1, 2, \ldots, 1700$) was created by projecting the learning set $\Omega$ (containing patches of 25×25 pixels) to linear subspaces using both PCA and FLD methods. Accordingly, the set was also composed of two subsets $\Phi = \Phi^{pos} + \Omega^{neg}$. The positive subset $\Omega^{pos} = \{(I_i^{pos}, 1)\}$ consisted of feature vectors $I_i^{pos}$ computed from the image patches in $\Omega^{pos}$, together with the target output classification value $O_i^{pos} = 1$. The other subset $\Omega^{neg} = \{(I_i^{neg}, -1)\}$ consisted of feature vectors $I_i^{neg}$ computed from image patches in $\Omega^{neg}$ and the target output value $O_i^{neg} = -1$ of the classifier. This set was further split into a training set of 1400 samples and a test set of 300 samples. The training set was used to modify the weights. The test set was used to estimate the generalization ability.

With the above system using a 25×25 pixel patch, a 640×480 sized image requires a processing time of 1 to 8 minutes, depending on the number of cells present. This is judged to be acceptable for some applications. Substantial speed improvements can be obtained by replacing the MATLAB environment with dedicated neural network software. Further improvement of speed is readily available with more powerful or specialized hardware, such as cluster computing systems.

One embodiment of the invention uses transmitted light illumination images in conjunction with one or more fluorescence images to automatically generate training sets for training the classifiers. For example, cell viability can be objectively determined using three images of the same microscope field. One image is the transmitted light image which will be analyzed by the pattern recognition algorithm (ANN or SVM). The other two images are images obtained with fluorescent probes, where one probe is specific to viable cells, and the other probe is specific to non-viable cells. A human observer can examine the three images and determine whether a particular cell in the transmitted light image is alive or dead. This process provides a pre-classified sample for use in training and testing. Alternatively, a more automated procedure can be used. Specifically, in one embodiment an image analysis algorithm is used to replace or partially replace the human observer, thereby evaluating the two fluorescence images automatically or semi-automatically and applying information from that evaluation to the transmitted light image. This embodiment therefore provides an automated or semi-automated system for creating the training set. Although this example deals specifically with cell viability, other characteristics identified with fluorescence images can similarly be used to identify and classify objects in a transmitted light image. Further, the concepts described herein can also be employed in the "reverse direction," i.e., images obtained with transmitted light illumination can be used to pre-classify the characteristics of objects in images obtained using fluorescence images. In other words, once the objects in a transmitted light illumination image have been classified and/or localized using the techniques described above, that information can be used to identify, localize or classify information acquired via subsequent fluorescence imaging. For example, such a reverse direction technique can be used to monitor gene expression in real time.

The theoretical and experimental investigations described above have advanced the development of fully automated cell detection algorithms for micromanipulation purposes, thereby facilitating analysis of gene expression in single, viable cells. The analysis and proposed strategies were applied to digital images of cultured cells (from both single cell line and mixture of multiple cell lines) obtained with single or multiple types of transmitted light contrast. The use of transmitted light channels permits all of the fluorescence channels to be used for other purposes.

PCA has been widely used as a feature extraction and representation technique for object recognition due to its ability to capture some of the relationships that are useful to model the object. Alternatively, FLD has been widely accepted to extract features that are better suitable for classification tasks. However, when FLD is used in a binary cell detection problem, where there are only two classes: "Cell" and "Non-cell", one must reduce the dimension of the feature space to 1. A one-dimensional space is inadequate for a complex pattern recognition problem like cell detection.

A novel FLD preprocessing strategy has been described above. The idea is to treat the cell detection as a multiclass problem in the preprocessing stage and come back to a binary problem in the classification stage. It can be done by dividing the "Non-cell" class into multiple subclasses. This "factoring" of the "Non-cell" class into subclasses makes the use of FLD a practical possibility. In addressing the variability of cell size and morphology, as well as microscope parameter variations, such as focus and illumination, the new FLD preprocessing was clearly superior to PCA preprocessing when combined with neural network classifiers. The primary reason is that FLD optimizes the solution by maximizing the ratio of between-class scatter to within-class scatter, while PCA maximizes the effect of total scatter only. The new strategy can be applicable to any pattern recognition tasks where a class of relatively homogeneous objects needs to be distinguished from another class of objects that is highly heterogeneous.

One problem with automatic cell detection is that there are much more negative samples than positive samples in the image. This is especially true for the problem of distinguishing between viable cells (VC) and all other samples (not a viable cell, or NACV). The is a problem for SVMs since the training set is both highly unbalanced and very large in size.

In order to deal with this problem, an effective SVM training procedure, called Compensatory Iterative Sample Selection (CISS), has been described. The algorithm uses an iterative sampling technique, where an SVM is trained at each step with all positive examples and a subset of the negative examples and then retrained by re-sampling the negative training set from negative examples that were misclassified at the previous iteration. The new training procedure has been successfully applied to identify and localize unstained viable cells in bright field images and has been shown to be superior to SVMs with non-iterative training, especially when the ratios are high. The underlying reason for the effectiveness of CISS has also been investigated. Our experimental results suggest that CISS is effective because it iteratively chooses the most representative training samples, i.e., the samples that are close to the boundary and are more difficult to classify. This scheme can make the decision boundary more accurate, especially when applied to difficult scenarios.

It should be noted that the CISS algorithm is not a useful technique only for automatic cell detection. It can be generalized to any pattern recognition problem that involves a large and unbalanced training set. This is a circumstance one frequently encounters in applications of SVMs to diverse problem domains.

To move forward towards the goal of a practical automatic cell detection system, an algorithm that can detect cells in mixtures of multiple cell types and sort them into subtypes has been described above. This algorithm employs ECOC technique to solve the multiclass pattern recognition problem. In the standard ECOC method, only a class label is assigned to each sample. However, in this thesis, it is necessary not only to identify the class of a cell but also to determine its position relative to pixel coordinates, since tracking and manipulation of cells are needed. We therefore extended the standard ECOC method with a pairwise "team" comparison strategy to enable probability estimation. The use of probability estimation provides both cell type identification as well as cell localization relative to pixel coordinates. This approach has been systematically studied under different overlap conditions. The experimental results suggest that, for images that are intrinsically difficult, ECOC can have some advantage over other methods.

Detection of Objects Using Composite Images

As described above, for multiclass object detection, a supervised, multiclass pattern recognition problem can be formulated and solved by extension of the Error Correcting Output Coding (ECOC) method. The use of ECOC introduces redundancy into classifiers (ensemble of classifiers) and increases detection accuracy. The probability estimation provides both cell type identification as well as cell localization relative to pixel coordinates. However, the detection accuracy can be judged to be inadequate for some applications. One method of increasing detection accuracy is the use of multiple images for object detection.

With respect to microscopy, bright field images represent a worst-case scenario and may not provide enough information for classification. To improve multiclass cell detection, redundancy can be introduced into input images. One way to achieve this goal is to perform cell detection in multidimensional images. As microscopy techniques are moving rapidly toward the direction of multidimensionality, images that contain much more discriminatory information can now be obtained with different imaging techniques (channels) and conditions. In the field of transmitted light microscopy, commonly used techniques include phase contrast and Hoffman modulation contrast. Image sets that contain multiple images of the same specimen obtained from different microscopy techniques or different conditions with the same technique are called multidimensional or multivariate images. In many cases, they can provide information well beyond the limits achievable with individual techniques, therefore, cell detection in multidimensional images can be improved over the accuracy achieved with single channels.

One task in object recognition in multidimensional images is to extract essential information contained in the image stack. Since a multidimensional data set can contain some redundant information that is not essential for recognition, however the redundancy that introduces more discriminatory information is useful, it is therefore often helpful to reduce the number of components of the objects studied. This process can help to define a new representation space, onto which the objects can be represented in a way that is more suitable for classification.

Currently existing approaches for automatic analysis of multidimensional cell images are dominated by techniques that linearly combine information from different images. For example, Nattkemper et al. first performed automatic lymphocyte detection on all individual images in a fluorescence image stack and then linearly combined the detection results with heuristic rules. Wuringer et al., achieved automatic co-registration, segmentation, and classification of cell nuclei in a similar fashion. Linear Principal component analysis (PCA) has also been directly applied on fluorescence image stacks to reduce the dimensionality of input data. However, these applications concentrated on image stacks in which different parameters of the same imaging technique were applied to record a set of images. Problems of this category are called intramodular problems. They usually have identical spatial resolutions and similar pixel value scales. In contrast, combining different contrast methods (image stacks) under transmitted light illumination, are referred to as "multi-contrast composite images." Problems of this category are called intermodular problems. It should be pointed out that, by definition, multi-contrast composite images are also multidimensional images.

Compared to intramodular problems, intermodular problems are more difficult to solve. This is because that the imaging techniques used in an intermodular problem are typically based on different physical effects which can generate image stacks with different spatial resolutions and pixel value scales. Consequently, the correlation of the pixel information in the intermodular images is much more complex than that of the intramodular images. In this case, a linear feature extraction may no longer be adequate. This is due to the fact that linear feature extraction decomposes data set into orthogonal components. However, the real sources of information in intermodular images have very little chance to be orthogonal. To capture the basic sources of information, non-linear feature extraction algorithms are needed.

Non-linear statistical analysis techniques have started to be used in the field of automatic multidimensional image analysis. Among these techniques, Kernel PCA is the most popular one. Kernel PCA is a non-linear generalization of the conventional linear PCA using kernel based methods. It has been successfully used in applications ranging from image fusion to multiview feature tracking to object recognition in 2D images and has been shown to extract features with improved efficiency. A multiclass cell detection algorithm in composite images obtained with three contrast methods in transmitted light illumination (bright field, phase contrast and Hoffman modulation contrast) is described below. Here, Kernel PCA is used to extract features from the composite images. Experimental results suggest that: 1) the use of multiple contrast methods provides more discriminatory information about the cells and therefore improves the detection accuracy; and 2) for multi-contrast composite images of cells, Kernel PCA extracts features that are more suitable for classification compared to linear PCA.

As objects to be identified, cells were used. The cell lines used in the experiments were K562 (human chronic myelogenous leukemic cells, ATCC; Cat. No. CCL-243), A20.2J (murine B-cell lymphoma cells, ATCC; CAT. NO. HB-97) and EAT cells (Ehrlich Ascites Tumor cells, ATCC; Cat. No. CCL-77). All cells were grown at 37.0° C. in BM+1/2 TE1+TE2+10% fetal calf serum (FCS). For microscope observation, cells in culture medium were dispensed into polystyrene 96-well microplates, which have glass bottoms that are 0.175 mm thick. Cell viability was determined by nigrosine staining before and after microscope observation and was greater than 95%.

To obtain an accurate and objective training and testing standard, the fluorescent probes for living cells (Cell-Tracker™ CAT. No. C2110, C2925 and C34552, Molecular Probes) were used to label different cell lines. K562 cells were labeled with blue fluorescent probe (C2110) and observed with a standard DAPI filter set (31000v2, Chroma). CR10 cells were labeled with green fluorescent probe (C2925) and observed with a standard FITC filter set (41001, Chroma). EAT cells were labeled with red fluorescent probe (C34552) and observed with a standard Texas Red filter set (41004, Chroma).

An inverted microscope equipped with a 20× Nikon Hoffman modulation contrast objective (Numerical Aperture: 0.45), a 20× Nikon phase contrast objective (Numerical Aperture: 0.45) and an Andor iXon DV 887-BI EMCCD camera was used to obtain digitized images. Bright field images were obtained with the Hoffman modulation contrast objective. For each microscope field, a set of six images was acquired (FIGS. 17a-f). Three images (FIGS. 17a, 17b, 17c) were acquired with three different contrast methods in transmitted light illumination (bright field, phase contrast and Hoffman modulation contrast) and were used for SVM training or testing. Three auxiliary fluorescence images (FIGS. 17d, 17e, 17f) were also acquired to distinguish different cell lines, which were labeled blue, red or green, respectively.

Although only three contrast methods are described above, images for use in multidimensional analysis can be acquired using any contrast method (e.g. differential interference). The methods of the invention can be applied to a set of images acquired with different contrast methods and in any combination. Further, the contrast methods used can also include chemical contrast methods, in addition to optical methods.

Figure 18:
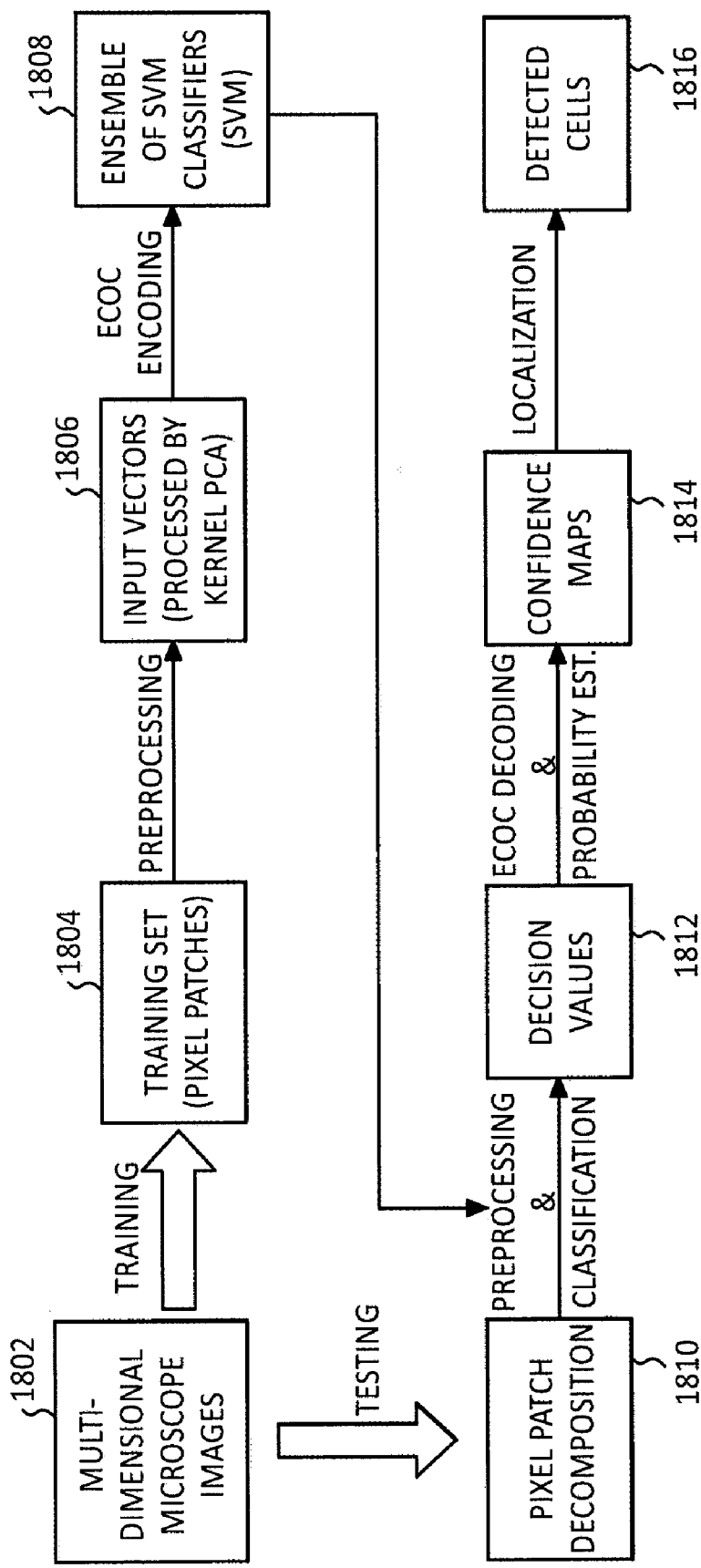
FIG. 18 is a flow diagram showing a multiclass cell detection process using multiple images and ECOC probability estimation.

FIG. 18 is a flow diagram showing a multiclass cell detection process using multiple images and ECOC probability estimation. At 1802, microscope images are obtained for analysis. There are at least two images for each specimen. For example, twenty sets of microscope images were acquired and used in the cell detection experiments described below. In each experiment, two subsets were extracted: one exclusively for training and another exclusively for testing. Ambiguous objects showing more than one fluorescence colors were manually deleted. The deleted objects were a very small percentage of the total number of cells.

In this section, a multiclass cell detection framework for multi-contrast composite images of cultured cells is presented. The system can be implemented using MATLAB and LIBSVM, similar to the embodiments described above for object identification using a single image. At 1804, training is done using pixel patches as the primary input data. The pixel patches are then preprocessed at 1806 using Kernel PCA to nonlinearly reduce the dimensionality of the input data. Input vectors are derived from manually-extracted training patches and are represented as nonlinear combinations of feature vectors derived from Kernel PCA preprocessing. The system also employs multiclass classification and probability estimation for image analysis, which permits not only the identification of the desired cells but also gives their locations relative to the pixel coordinates of the primary image. Essentially, the software is taught to classify pixel patches into different classes. Each class corresponds to a single cell type, except for the larger class containing all undesired objects (e.g. background, fragments of cells, trash, and off-centered cells), denoted as "Non-cell". For cell classes, the localization information of the classified pixel patches in the image is used as cell locations.

At 1808, an ensemble of SVM classifiers with ECOC is trained. At 1810, for each position p in the testing images (excluding positions in the margin around the edges), three pixel patches centered at that position are extracted and represented in the same way as that in training process, one patch from each channel. At 1812, the probability that the input vector derived from these extracted patches belongs to each class is calculated by ECOC probability estimation. At 1814, for each class corresponding to a cell type, this probability is then used as a "confidence value" V[p] ∈[0,1] in a "confidence map" for that cell type. At 1816, localization of the confidence maps is performed. Pixels in each confidence map are the confidence values of their corresponding patches in the original images and form "mountains" with large peaks representing a high probability of presence of the corresponding cell type. A given peak in a confidence map is compared with the corresponding peaks in the other confidence maps. The confidence map with the highest peak at that location gives the assignment of class membership. Localization is provided by the pixel coordinates of the highest peak. It should be pointed out that generating a confidence map for the "Non-cell" class is unnecessary in our case since localization of the non-cell objects is not important for cell detection.

Figure 19A:
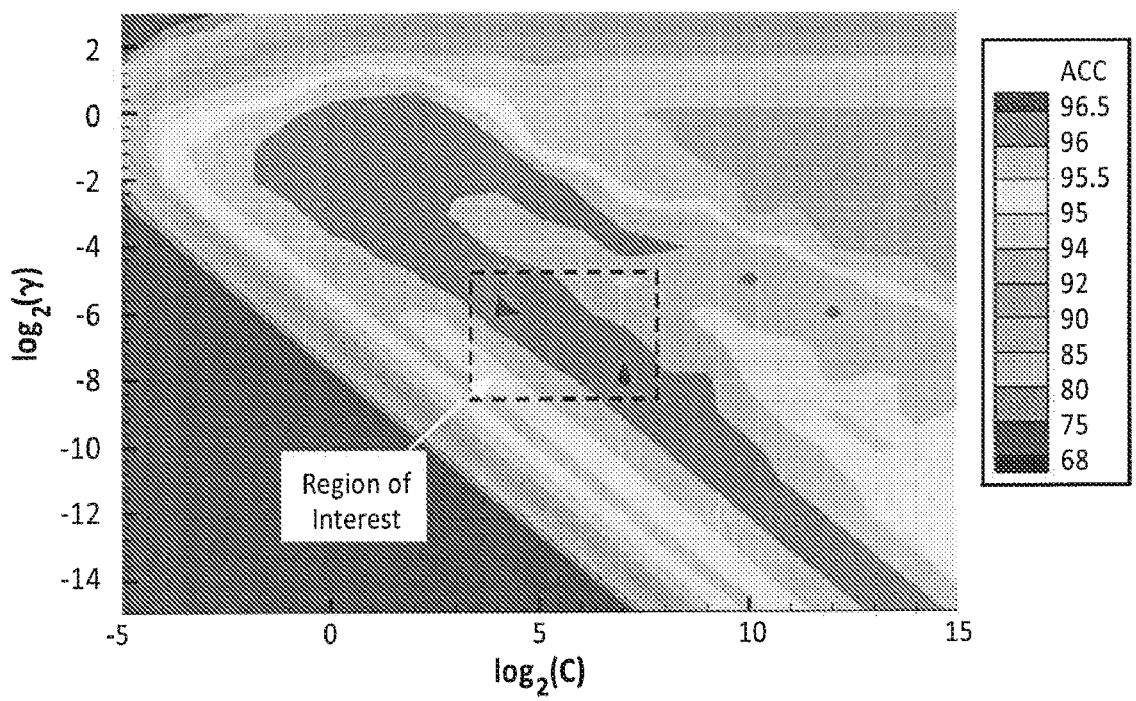
FIG. 19a graphically shows how a coarse grid size is used to localize a region of interest.
Figure 19B:
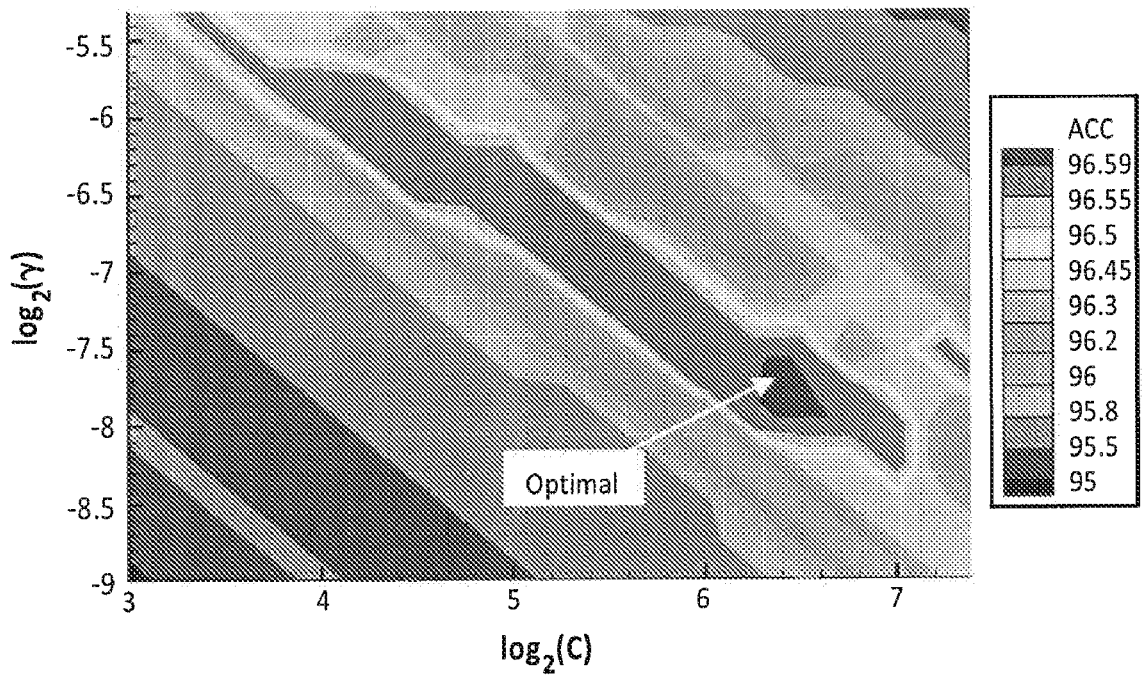
FIG. 19b graphically shows how a fine grid size can be used on the region of interest to locate optimal parameters.

In the ECOC approach, binary classifiers are trained as the base classifiers. The choice of base classifier can be arbitrary. In this work, we used Support Vector Machines (SVM) with the RBF kernel. The SVM classifier in our experiment is implemented by modifying LibSVM. The regularization parameter Q and the kernel parameter $\gamma$ are optimized using a two-step "grid-search" method for each classifier. In the first step, a coarse grid-search with a grid size of 1 was used to localize a Region of Interest (ROI) containing the optimal values (shown in FIG. 19*a*) in the second step (shown in FIG. 19*b*), a fine grid-search over the ROI with a grid size of 0.25 was used to give more precise values for Q and $\gamma$.

Kernel PCA is used in the preprocessing stage to reduce the dimensionality of input data (raw pixel patches). In this section, some fundamental aspects of Kernel PCA are briefly described. A detailed introduction to Kernel PCA can be found in Schölkopf et al., "Nonlinear component analysis as a kernel eigenvalue problem", Neural Computation, 10, 1998, pp. 1299-1319, which is herein incorporated by reference in its entirety. Principal component analysis (PCA) is one of the most popular dimension reduction methods. Given a set of M centered samples:

$$x_k : k = 1, 2, \ldots, M, x_k \in R^N, \sum_{k=1}^{M} x_k = 0,$$

PCA diagonalizes the covariance matrix:

$$C = \frac{1}{M} \sum_{i=1}^{M} x_i \cdot x_i \qquad (6.1)$$

by solving the eigenvalue equation $$\lambda v = Cv \qquad (6.2)$$

for $\lambda \geq 0$ and $v \in R^N \setminus \{0\}$, the eigenvector v corresponding to bigger eigenvalue $\lambda$ captures more variance. Therefore, the set of the first $n \leq N$ eigenvectors or Principal Directions (PDs) carry more variance than any other n orthogonal projections.

In recent years, kernel based methods have been more and more widely accepted as a new revolution in the machine learning area. The concept of kernel based methods is based on the combination of well-known linear algorithms such as PCA with nonlinear kernel functions, which allows more powerful nonlinear solutions. Consider a nonlinear mapping $$\Phi : R^n \to H$$

$$x \mapsto x' = \Phi(x) \qquad (6.3)$$

which maps the examples $x_k \in R^N$ to some feature space H. Assuming that the mapped data are centered in H (if not, they can be easily centered.), one can perform PCA in H. This is equivalent to find the eigenvectors $\lambda$ of the covariance matrix in H $$\tilde{C} = \frac{1}{M} \sum_{i=1}^{M} x'_i \cdot x'_i = \frac{1}{M} \sum_{i=1}^{M} \Phi(x_i) \cdot \Phi(x_i) \qquad (6.4)$$

It can be shown that the eigenvectors v' in H lie in the span of $\Phi(x_1), \ldots, \Phi(x_M)$. Therefore, the above problem is equivalent to the following eigenvalue problem $$M\lambda\alpha = K\alpha \qquad (6.5)$$

where $\alpha$ is a column vector of coefficients $[\alpha_1, \ldots, \alpha_M]^T$, whose elements describe the dual form of the eigenvector by $$v' = \sum_{i=1}^{M} \alpha_i \Phi(x_i) \qquad (6.6)$$

and K is a symmetric matrix, called Gram matrix, with elements $$K_{ij} = x'_i \cdot x'_j = \Phi(x_i) \cdot \Phi(x_j), i,j=1, \ldots, M \qquad (6.7)$$

By normalizing $\alpha^k$ corresponding to the kth eigenvalue $\alpha_k$ of K to ensure $\lambda_k(\alpha^k \cdot \alpha^k) = 1$, principal components in H can be extracted by projecting example x on $v'^k$ $$\tilde{x} = v'^k \cdot x' = v'^k \cdot \Phi(x) = \sum_{k=1}^{M} \alpha_i^k (\Phi(x_i) \cdot \Phi(x)) \qquad (6.8)$$

It should be noted that, in equation (8), all vectors appear in the form of inner product of the mapping ($\Phi(x_i) \cdot \Phi(x)$) instead of the explicit mapping alone. Consequently, Kernel functions can be used to implicitly calculate the mapping. This results in $$\tilde{x} = \sum_{k=1}^{M} \alpha_i^k k(x_i, x) \qquad (6.9)$$

1. where the kernel function $k(x_i, x_j) = \Phi(x_i) \cdot \Phi(x_j)$ returns the result of dot product of two feature vectors in the feature space H.

Figure 20:
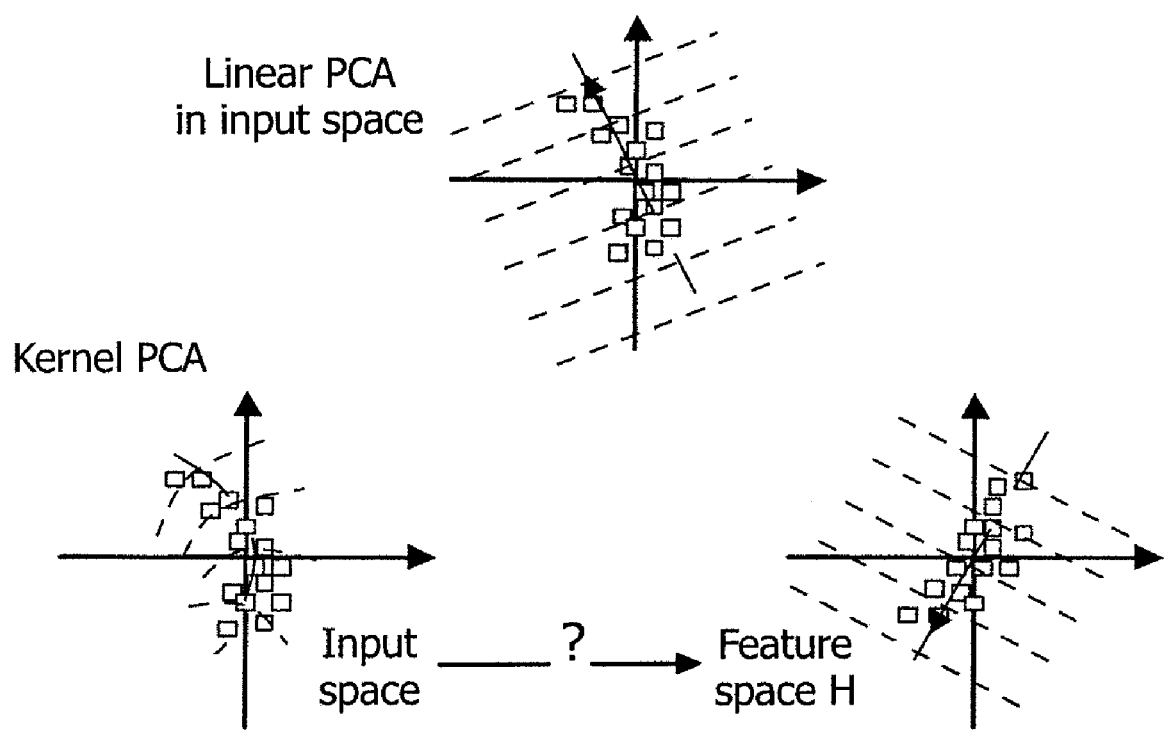
FIG. 20 graphically illustrates the basic principles of Kernel PCA

FIG. 20 illustrates the basic principle of Kernel PCA. With Kernel PCA, one is actually performing linear PCA in some high dimensional feature space H, just as a PCA in input space. Since H is nonlinearly related to input space, the linear relationship (dashed line) that is captured in the feature space H becomes nonlinear in input space (dashed curve). Kernel PCA can therefore obtain more powerful nonlinear solutions while retaining most properties of linear PCA.

As has been mentioned above, to obtain an accurate and objective training and testing standard, fluorescent probes with different, characteristic colors were used in the experiments to stain cells from different cell lines. Ideally, the fluorescent probes should only be detectable under fluorescence and should be completely invisible to the classifiers in images obtained with transmitted light illumination. Although the concentration of the fluorescent probes were carefully controlled to the lowest possible level (experimentally decided), there is still the possibility that the probes could alter the transmitted light images in a way that could be detected by the classifiers. This would of course affect the cell detection accuracy. To check if the use of fluorescent probes affects cell detection ability of the classifier under transmitted light illumination, a series of control experiments have been performed.

The control experiments were designed to proceed as follows:

1) stained and unstained cells of the same type were first mixed together and the images were taken.

2) a 3-class classifier was trained to classify objects in the following categories: a) stained cells; b) unstained cells and c) non-cells.

3) if the fluorescent probes do not affect cell detection, the distinction between stained and unstained cells will be impossible. Since the distinction between cell (categories a & b) and non-cell objects (category c) is much easier than that between stained (category a) and unstained cells (category b), the detection accuracy of both stained and unstained cells should be close to 50%.

4) as a metric of randomness, P-values for the problem of distinguishing between stained and unstained cells were also calculated. The P-value is defined as the probability of getting something more extreme than the result, when there is no effect in the population. If the fluorescent probes do not affect cell detection, P-values should be close to 1.

5) Repeat the experiment for all three cell types (A20.2j, EAT and K562) and for all transmitted light channels (bright field, Hoffman modulation contrast and phase contrast).

Figure 21A:
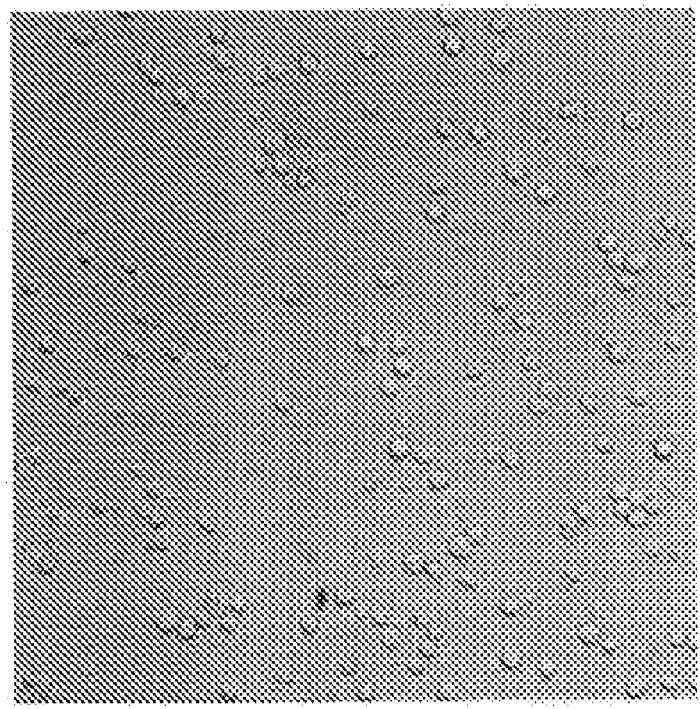
FIG. 21a depicts a sample bright field image used for control experiments.
Figure 21B:
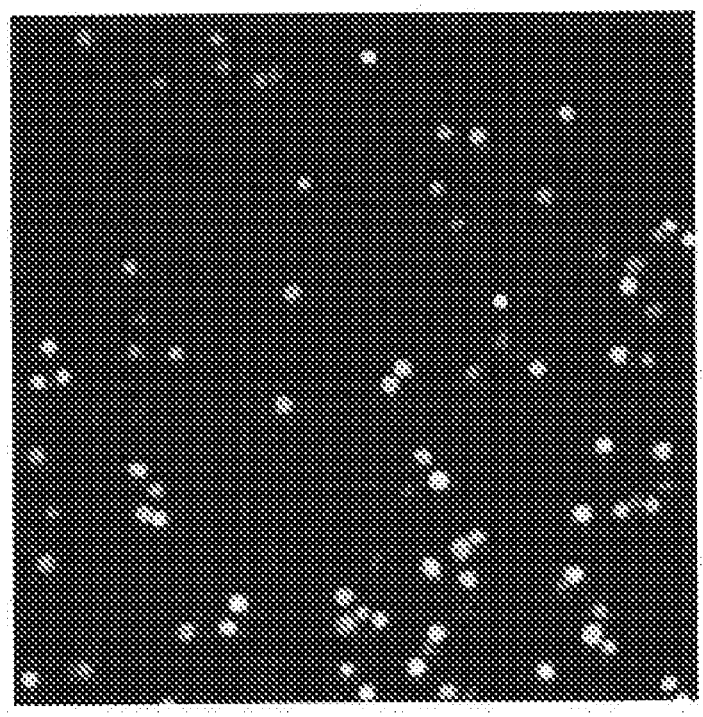
Figure 22:
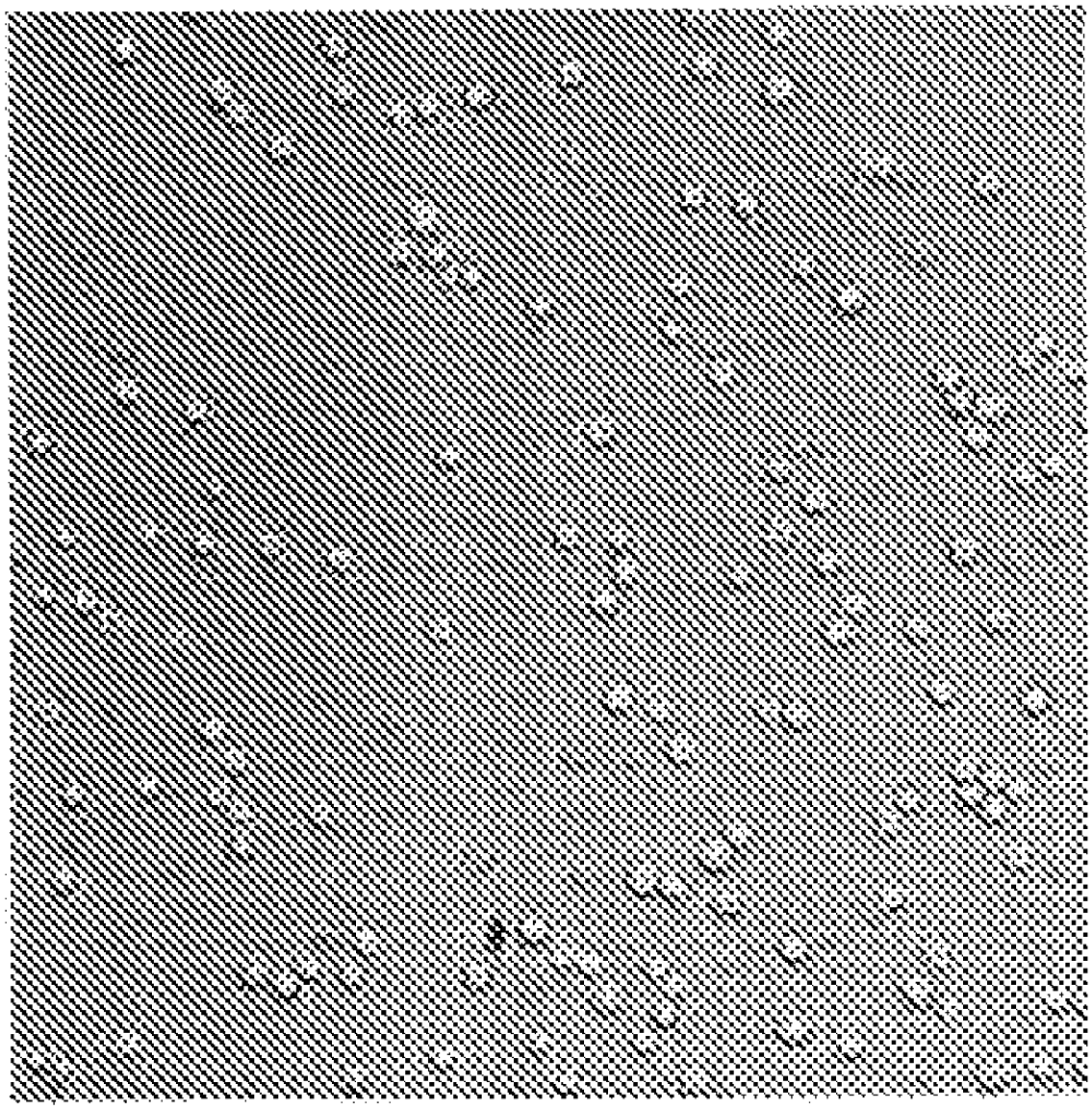

FIG. 21a depicts a sample bright field image used for control experiments. It shows a bright field image of mixture of stained and unstained A20.2J cells. Its corresponding fluorescence image is shown in FIG. 21b. FIG. 22 shows the detection of cells in the specimen of FIGS. 21a and 21b. The detection result of FIG. 21a is shown in FIG. 22, in which the stained and unstained cells detected are denoted by squares and crosses respectively.

Figure 23:
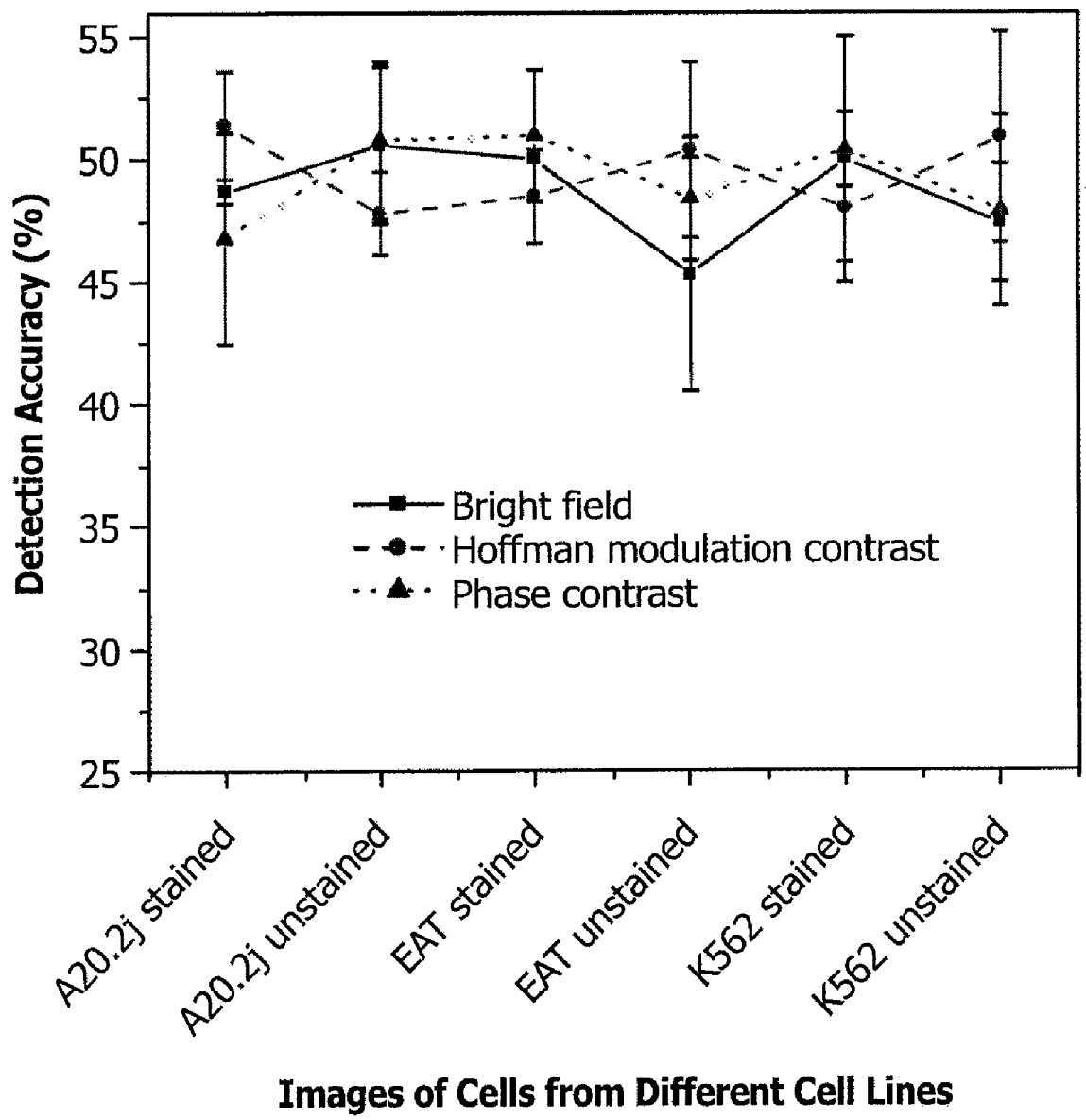
FIG. 23 graphically shows the detection accuracy of stained and unstained cells from different cell lines under different imaging channels.
Figure 24:
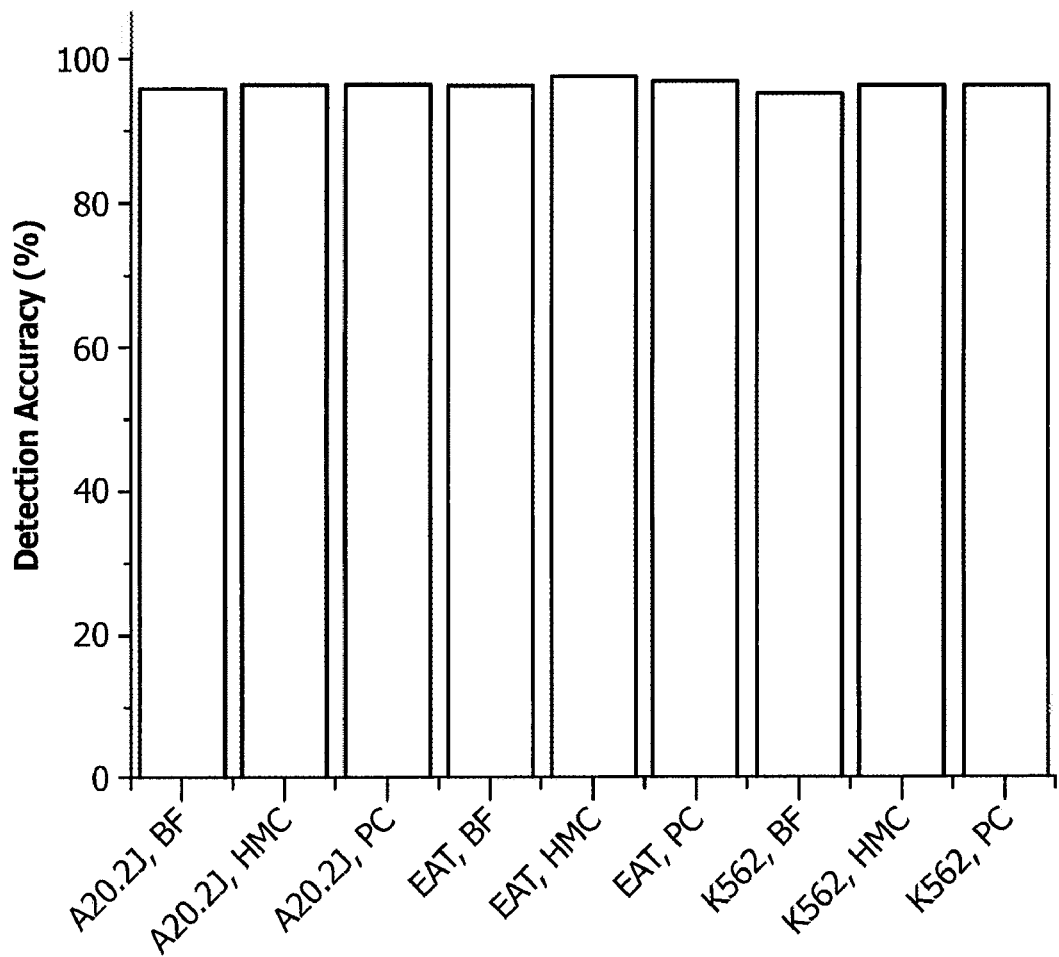
FIG. 24 graphically shows the detection accuracy of cell objects (stained and unstained) from different cell lines under different imaging channels.
Figure 25:
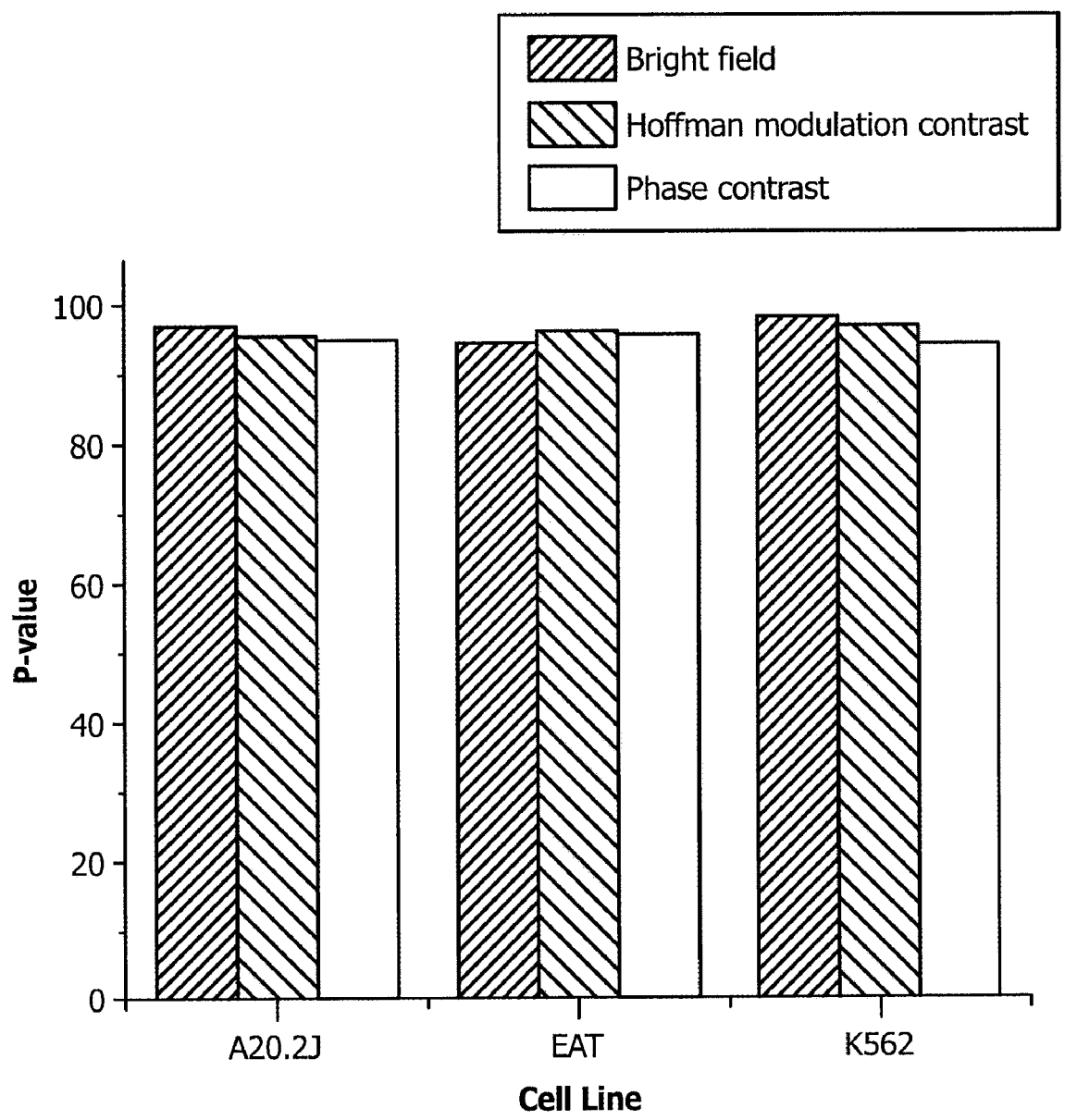
FIG. 25 graphically shows P-values for distinguishing between stained and unstained cells from different cell lines under different imaging channels.

A total of 9 control experiments have been done to cover all possible combinations of three cell types and three transmitted light channels. The detection accuracies of stained (category a) and unstained cells (category b) are summarized in FIG. 23. One can see from the figure that, in all cases, the detection accuracies of both stained and unstained cells are very close to 50%. Considering the fact that the detection accuracies are very high (>95%, shown in FIG. 24) for the entire cell objects (stained & unstained), it indicates a rather random classification between stained and unstained cells. To show the confidence of randomness in above experiments, the P-values for distinguishing between stained and unstained cells from different cell lines under different imaging channels are plotted in FIG. 25. As expected, all P-values are very close to 1. The results of the control experiments suggest that the use of fluorescent probes may not affect cell detection accuracy in any cell type and any transmitted light channel.

To quantitatively evaluate multiclass cell detection in multi-contrast composite images, a cell mixture was prepared by mixing cells from three different cell lines (A20.2J, EAT and K562). The composite images consist of images obtained with three contrast methods in transmitted light illumination: bright field, Hoffman modulation contrast and phase contrast. The overall framework of this approach has been described above with respect to FIG. 18. In what follows, the detailed experiment is described in steps. The experimental result is also quantitatively analyzed.

Since individual cells typically occupy only a small percentage of total image area, it is advantageous to decompose images using pixel patches that are just large enough to contain the largest cells in the image. In actual experiments, images obtained with different contrast methods were first manually co-registered. Then, for a possible location in the co-registered microscope images (except in the 15-pixel margin around the edges), three 29×29 pixel patches centered at that location were extracted. These pixel patches can be viewed as a 29×29×3 dimensional input vector (see FIG. 26). The experiments indicate that performance is not very sensitive to small variations in patch size, e.g. a patch size of 31×31 produced similar results (data not shown). Since many locations in the image are uniform background, a "mask" was created to exclude these patches. Essentially, the "mask" eliminated all pixel patches whose average pixel intensities were below a user-chosen threshold.

A training set was created with the aid of an interactive program that displays the digitized microscope images and allows a user to select the locations of cell centers with a mouse cursor after manual comparison of transmitted light and fluorescence images. For each cell type, the pixel patches extracted from the selected cell locations were used as input vectors of that class. The input vectors in the "Non-cell" class were then generated automatically by extracting all the pixel patches whose centers were $r \geq 7$ pixels away from any of the manually selected cell locations. The value of r was empirically chosen in relation to the sizes of cells and pixel patches.

Figure 26:
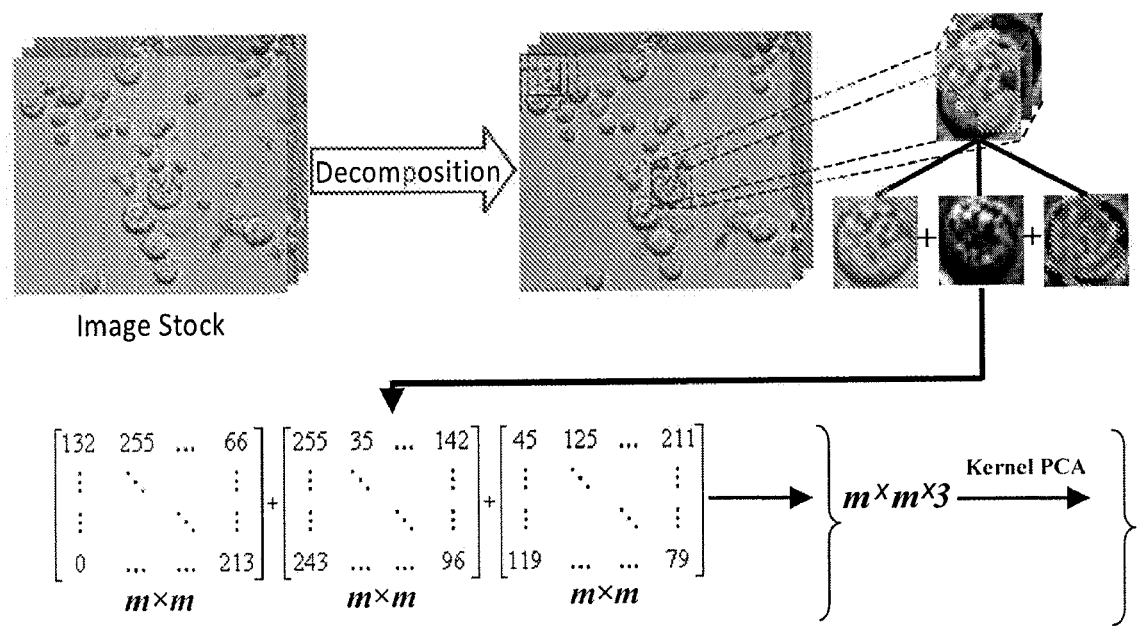
FIG. 26 illustrates pixel patch extraction and Kernel PCA preprocessing for cell detection in multi-contrast composite images.

The primary input vectors generated above are 29*29*3=2523 dimensional. To define a new representation space that is more suitable for classification, Kernel PCA preprocessing was used to reduce dimensionality to n=10 for all input vectors (FIG. 26). The dimensionality of 10 is experimentally chosen (data not shown). We followed the method described in Schölkopf et al., 1998, and used a polynomial kernel function:

$$k(x_i, x_j) = (x_i \cdot x_j)^d \qquad (6.10)$$

which is parameterized by the degree of polynomial "d". This parameter is chosen by testing the range 1 through 6 using a manually extracted testing set of 1000 samples (250 for each class). To simplify the optimization process, we also followed Schölkopf et al.'s strategy and used linear SVM classifiers. The experimental results show that the classification accuracy can improve as the degree goes higher. However, increasing from the degree 5 to 6 only gives very limited improvement (0.1%). We therefore chose d=5 for our actual cell detection experiments.

After all input vectors are preprocessed, each attribute of the Kernel PCA-preprocessed vectors was linearly scaled to the range [−1, +1]. An advantage of scaling is to avoid computational difficulties and to avoid the dominance of attributes with greater numeric ranges over those with smaller numeric ranges. Finally, the classes were labeled with ordinal numbers.

ECOC was implemented with a sparse matrix that was selected from 10000 randomly generated 4×10 matrices. To select the optimum matrix in the set of 10000, we calculated the minimum Hamming distance between all pairs of the rows for each matrix. The matrix with the biggest minimum distance was chosen. For each binary SVM classifier, the parameters are independently optimized following the aforementioned two-step grid search procedure. During the process of binary classifier training, the Compensatory Iterative Sample Selection (CISS) algorithm (described above) was employed to address the imbalance problem caused by the large "Non-cell" sample set. This algorithm maintains a fixed-size "working set", in which the training samples are kept balanced by iteratively choosing the most representative training samples for the SVM. These samples are close to the boundary and can therefore be more difficult to classify. This methodology can make the decision boundary more accurate, especially when applied to difficult scenarios.

In order to examine the effect of Kernel PCA preprocessing on images with different levels of complexity, three different scenarios were created. In Scenario 1, only images obtained with bright field channel are used. Since there is no difference in spatial resolutions and pixel value scales in a single channel, this scenario represents a very simple case. Scenario 2 is more complex since it uses the combination of bright field and Hoffman modulation contrast images. Scenario 3 represents the most complex case where images obtained with all three contrast methods are combined for cell detection. For each scenario, three image groups representing different levels of cell density and overlapping conditions were tested. Images from Group 1 have very low cell density and very little cell overlap. The cell density in Group 2 is moderate and represents an ideal situation for automatic cell micromanipulation. Cell density in Group 3 is very high, making images from this group very difficult for automatic detection.

An ensemble of SVM classifiers was trained and tested on each image group in each scenario (totally 9 cases). For each ensemble, testing samples were from the same image group as the training samples. However, none of the samples used for training were used for testing.

Figure 27A:
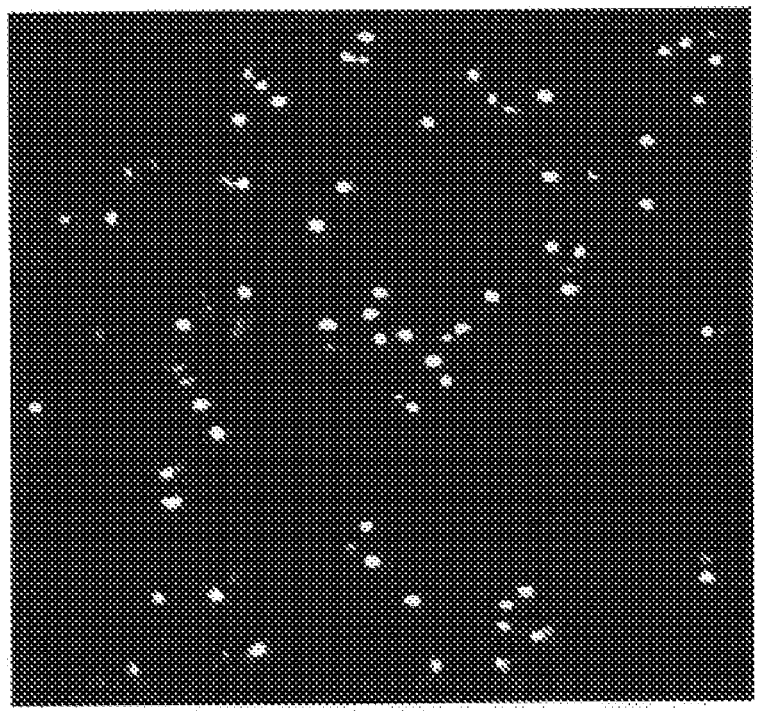
FIGS. 27a-c show confidence maps for the images of FIG. 17a-f using Scenario 3-scheme and preprocessed by Kernel PCA, for each of (a) A20.2J cell (b) EAT cells, and (c) K562 cells.
Figure 27B:
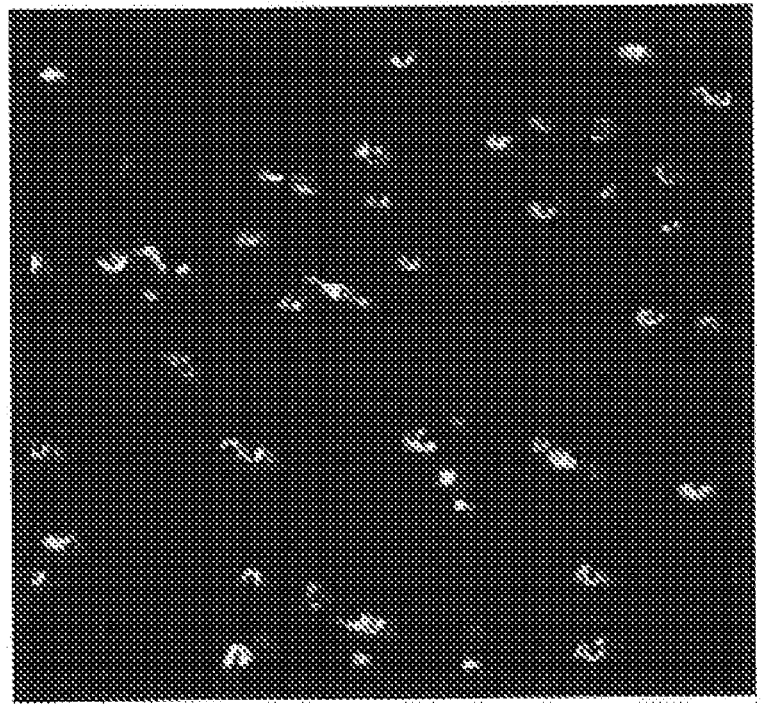
Figure 27C:
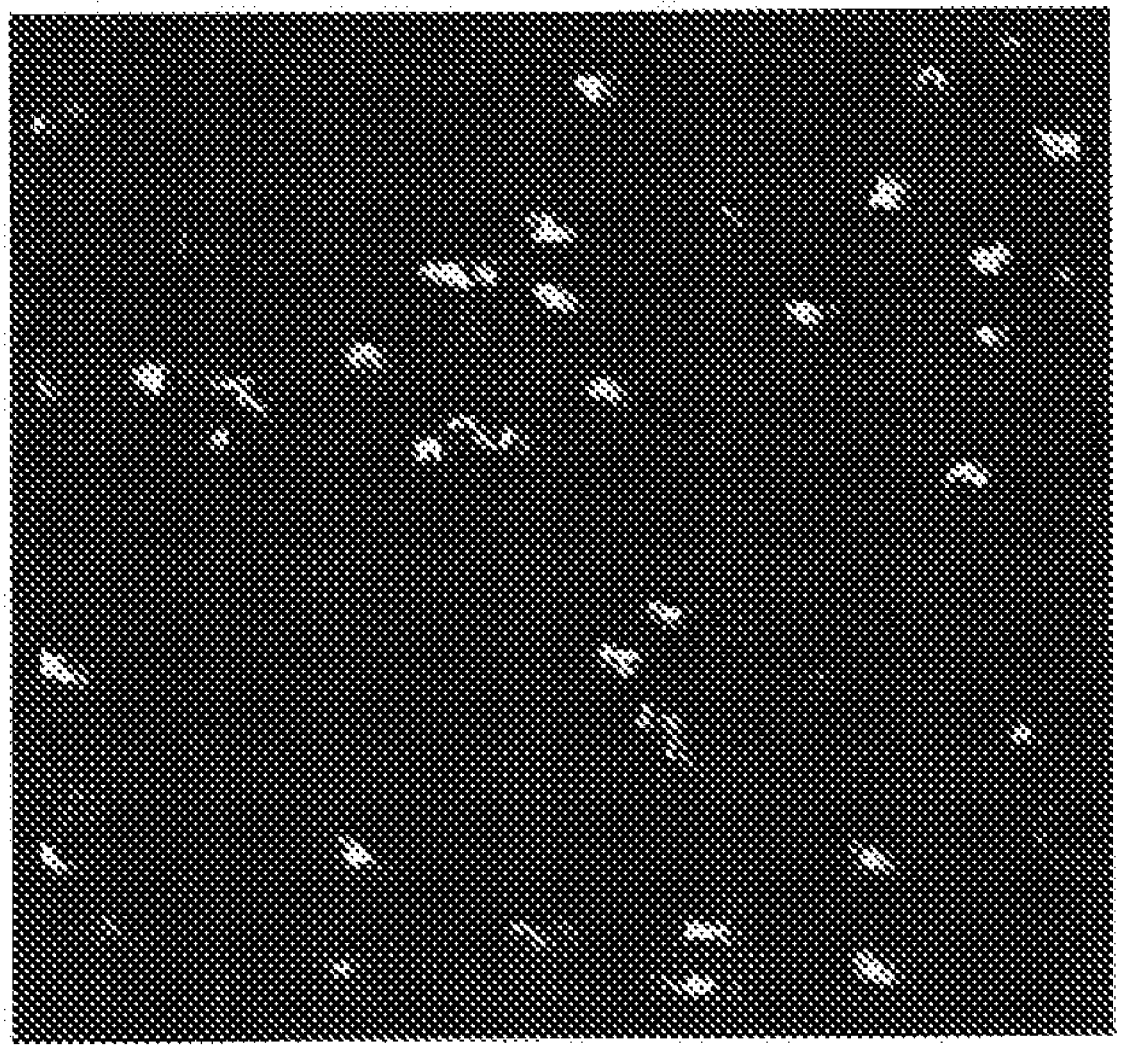
Figure 28:
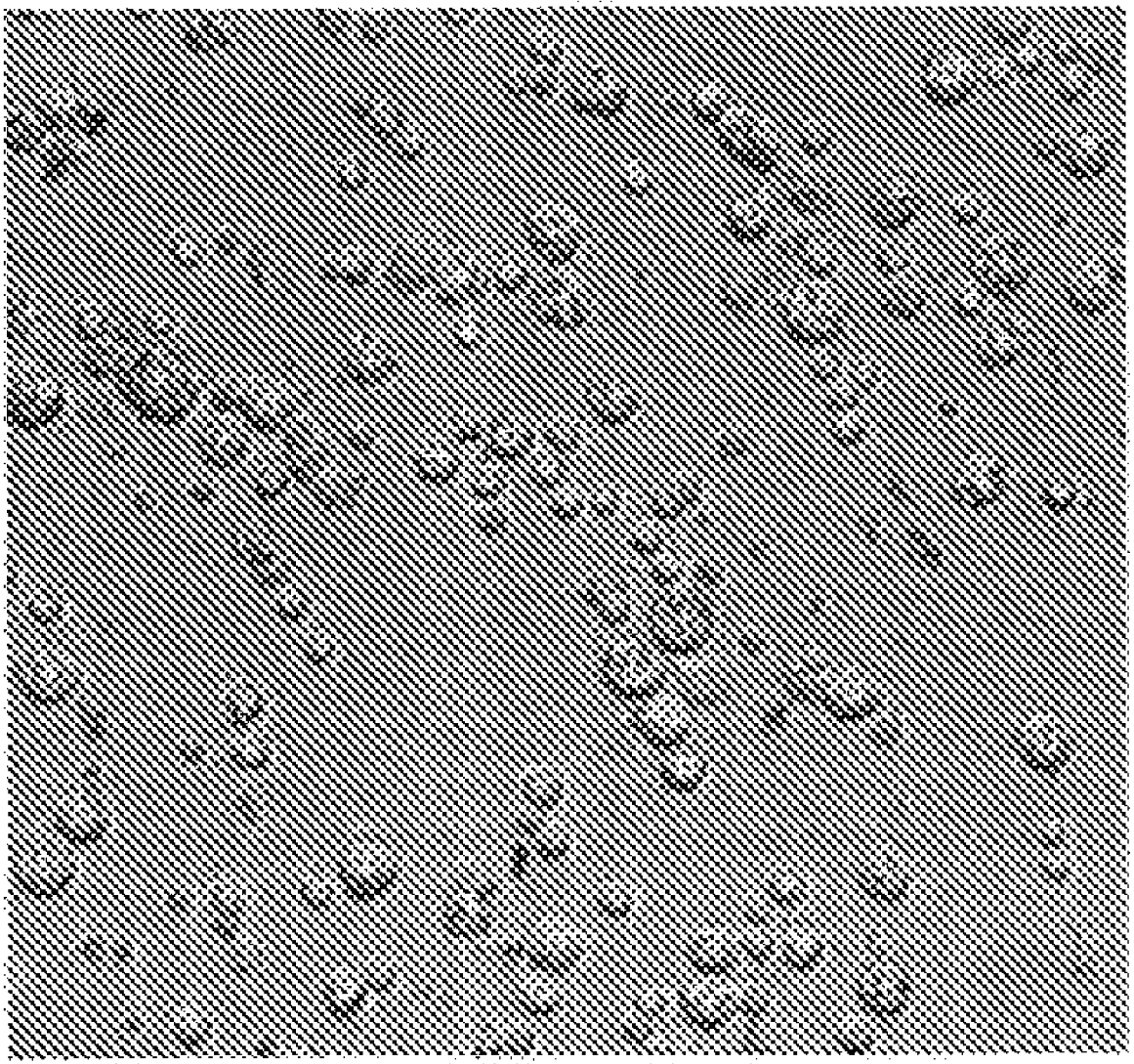
FIG. 28 shows the detection result of processing the images of FIG. 17a-f using Scenario 3-scheme and preprocessed by PCA.
Figure 29:
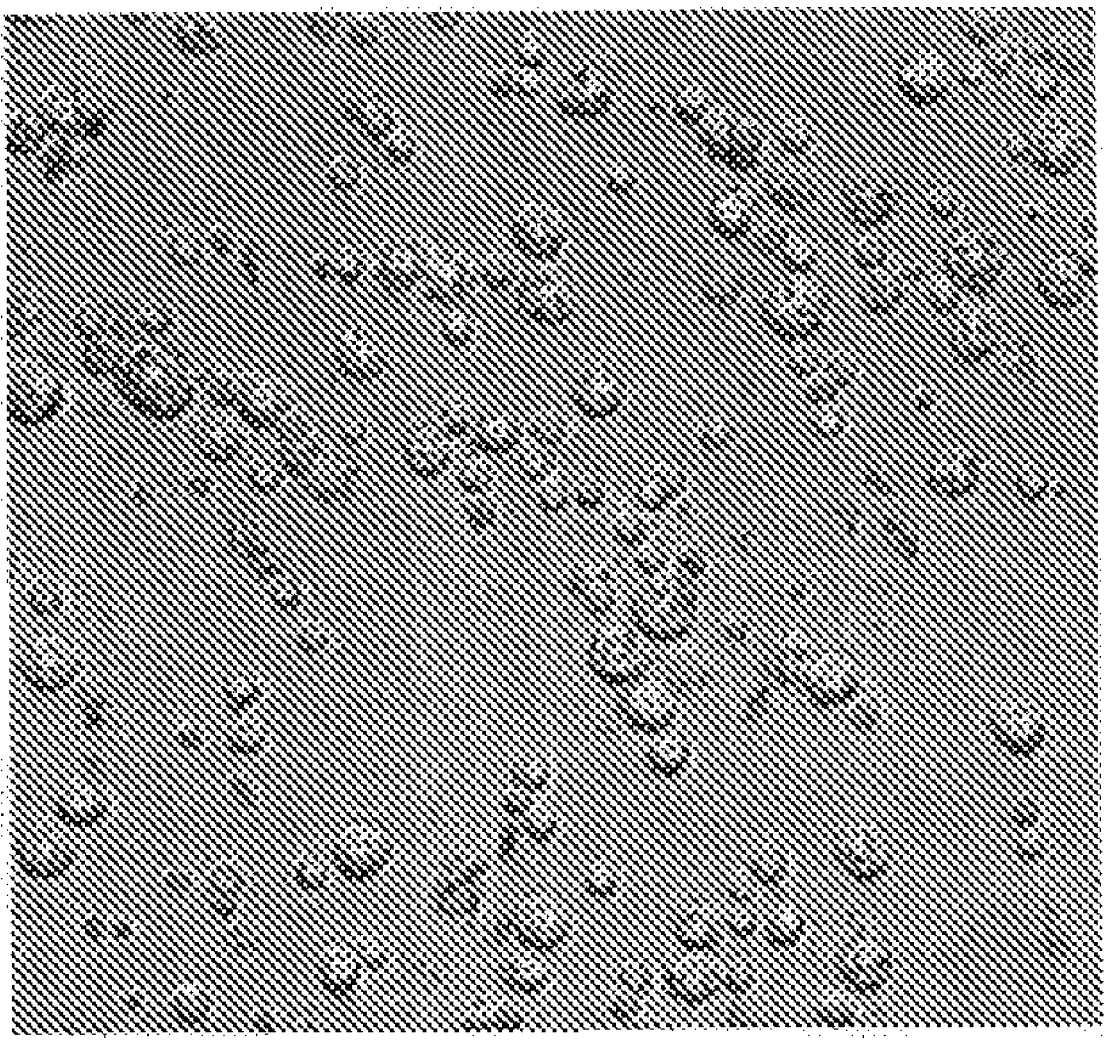
FIG. 29 shows the detection result of processing the images of FIG. 17a-f using Scenario 3-scheme and preprocessed by Kernel PCA.

The classifier ensembles were applied to pixel patches obtained by automatic pixel patch decomposition of entire microscope images described above. FIGS. 27*a-c* shows the confidence maps for images shown in FIGS. 17*a-f* (Scenario 3-scheme, Kernel PCA preprocessing). The range of the confidence value ([0,1]) in the confidence maps has been linearly scaled to [0,255] for grayscale representation. The detection results of the same images with PCA and Kernel PCA preprocessing are shown in FIGS. 28 and 29 respectively. The detected cell positions are denoted by different symbols (diamond, square and cross, one for each class) in the image.

Figure 30A:
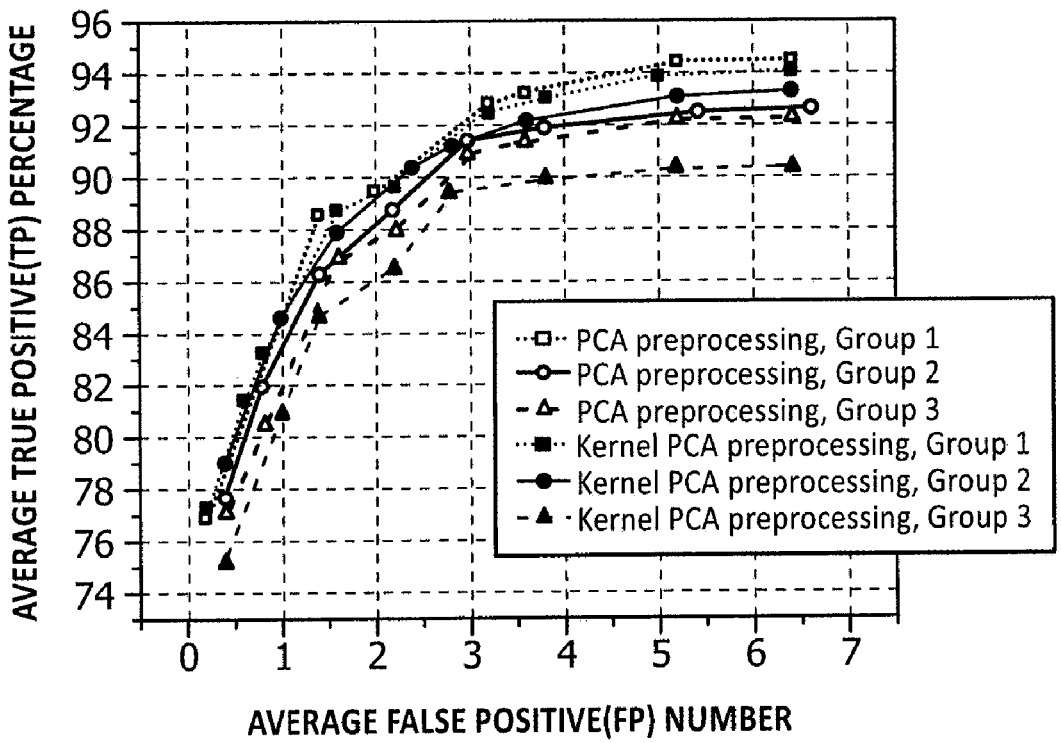
FIG. 30a shows FROC plots of different preprocessing methods when applied to different image groups from Scenario 1: 1) PCA preprocessing; 2) Kernel PCA preprocessing.
Figure 30B:
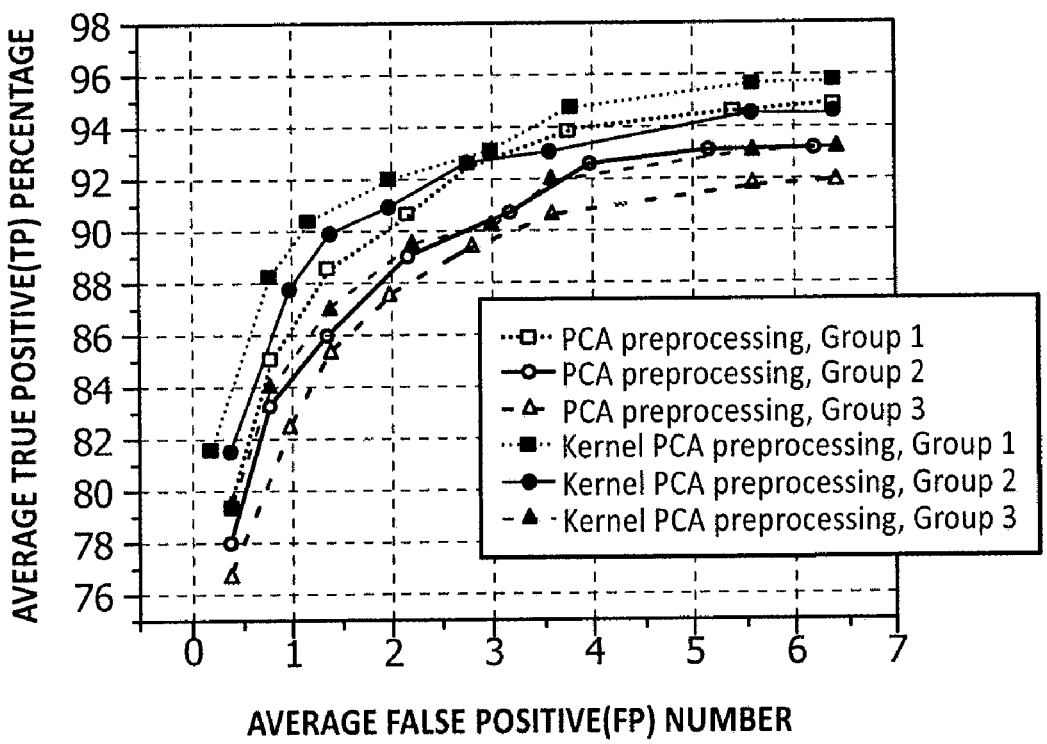
FIG. 30b shows FROC plots of different preprocessing methods when applied to different image groups from Scenario 2: 1) PCA preprocessing; 2) Kernel PCA preprocessing.
Figure 30C:
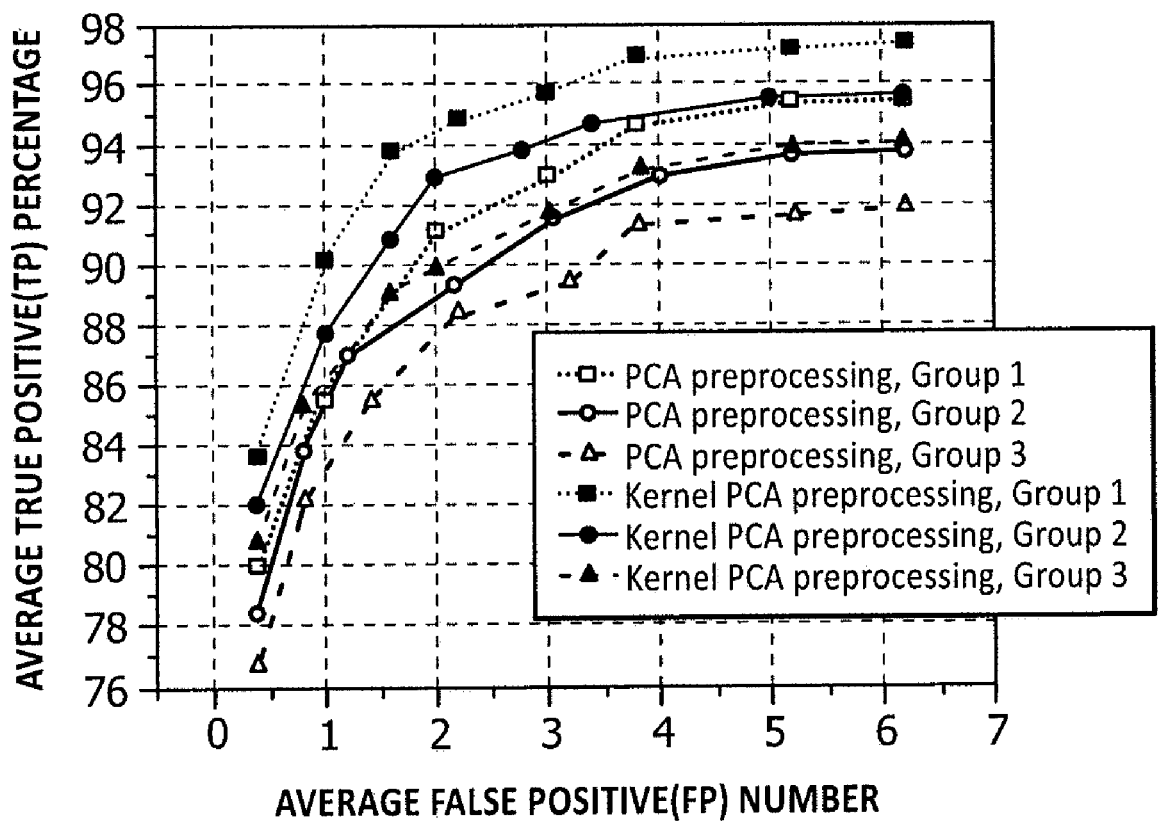
FIG. 30c shows FROC plots of different preprocessing methods when applied to different image groups from Scenario 3: 1) PCA preprocessing; 2) Kernel PCA preprocessing. A1

Statistical cell detection results for whole microscope images in Scenarios 1, 2 and 3 are summarized in FIGS. 30*a*, 30*b* and 30*c*, respectively. For each group, five testing image sets were used. A "Free-response Receiver Operating Characteristics" method (FROC) was employed (Chakraborty, 1989), with the average false positive (FP) number of all cell types in each image and the average sensitivity (true positive percentage, i.e., the percentage of cells that are identified correctly) of all cell types as performance indexes. As described above, the cell positions are identified as "peaks" of the "mountains" in the confidence maps. This requires a user-defined threshold for the definition of "peak". The FROC curve plots the relationship of false positives and sensitivity as a function of the threshold (not explicitly represented in the plot). In a practical application, a suitable threshold can then be selected to achieve the required behavior. Generally speaking, the bigger the area under the curve, the better the result is. The results are shown in the form of systematical comparison between Kernel PCA and PCA preprocessing.

Firstly, the results show that detection accuracy increases when switching from Scenario 1 to Scenarios 2 & 3 for both PCA and Kernel PCA preprocessing. This is reasonable since the use of additional contrast methods can introduce more discriminatory information into the system by observing cells from different perspectives. Secondly, in Scenario 1, both methods appear to produce similar detection accuracies, with Kernel PCA preprocessing only slightly better than PCA preprocessing. This holds true for all three image groups. For Scenario 2, where two channels are combined for detection, Kernel PCA preprocessing starts to show more advantage. A much greater advantage of Kernel PCA can be seen when all three channels are combined in Scenario 3. For example, when applied to image Group 2 in Scenario 3, if the average false positive acceptance number in each image is set at 1, Kernel PCA preprocessing achieves a sensitivity of 87.7%, which is about 3.6 percentage points greater than that of PCA preprocessing (To facilitate capturing this trend, Group 2 testing results in each Scenario are plotted in thick lines). The reason lies in that, in Scenario 1, since only a single channel is used, the correlation of the pixel information in the images is relatively simple. Kernel PCA has no advantages over PCA preprocessing in this case. However, as new channels are added, the correlation of the pixel information in the images becomes more and more complex in Scenario 2 & 3. Kernel PCA is therefore more and more advantageous because it can capture complex, nonlinear correlations in the high dimensional image space.

With regard to the processing speed, when the current method is used with a 29×29 pixel patch, a 492×453 image requires a processing time of 5-15 minutes, depending on the number of objects present in the image.

A framework for multiclass cell detection in multi-contrast composite images has been described. The use of multiple contrast methods improves the detection accuracy, possibly due to its ability to provide information well beyond the limits achievable with individual methods and introduce more discriminatory information into the system. Our experimental results also suggest that Kernel PCA preprocessing is superior to traditional linear PCA preprocessing. This can be due to the fact that Kernel PCA can capture high-order, nonlinear correlations in the high dimensional image space. The speed and accuracy of our multiclass cell detection framework suggest that it can be useful in some systems that require automatic subtyping and localization of cells in mixtures of multiple cell types.

Embodiments of the invention can be used not only with still images, but with videos. This is useful in systems, such as a fully automated robotic system. In those type of systems cell micromanipulation requires that the viable cells need to be localized in real time. Other embodiments of the invention can use alternative feature representations. This can provide more discriminative information, useful for more complex classification tasks, such as multi-class classification of fluorescence patterns.

Figure 16:
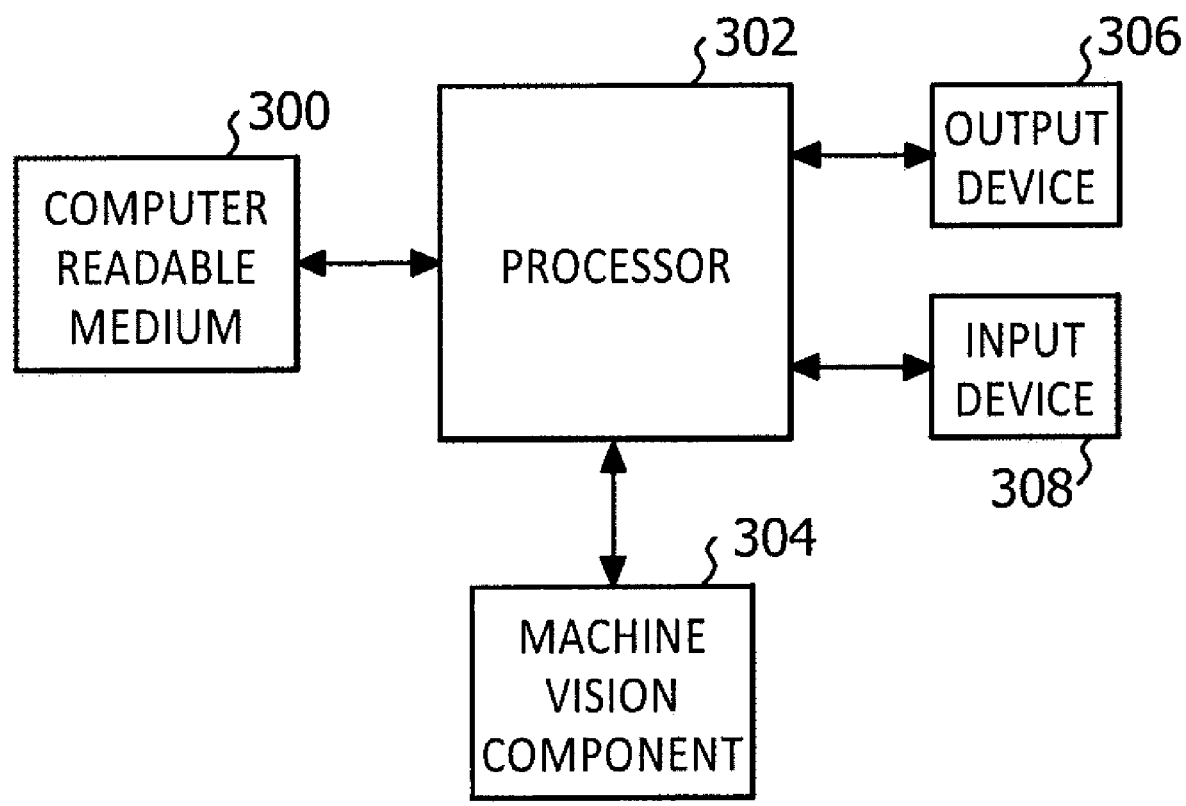
FIG. 16 is a block diagram depicting one embodiment of the present invention. This embodiment is a computer-based system for identifying and/or localizing objects.
Figure 17A:
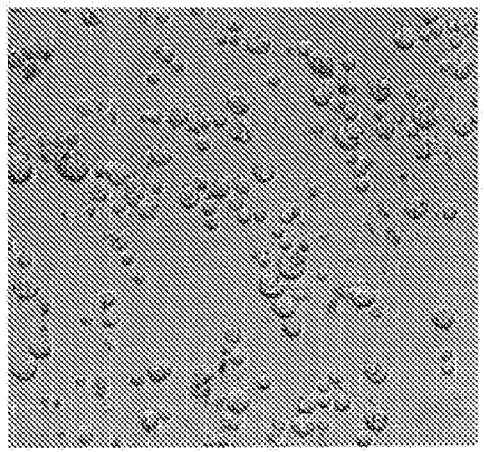
FIG. 17a depicts a sample image of cells taken with bright field imaging
Figure 17B:
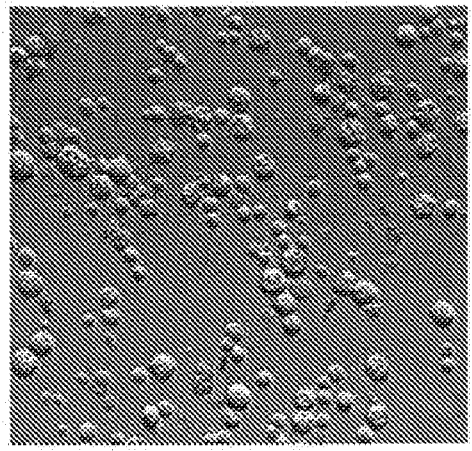
FIG. 17b depicts a sample image of cells taken with Hoffman Modulation Contrast.
Figure 17C:
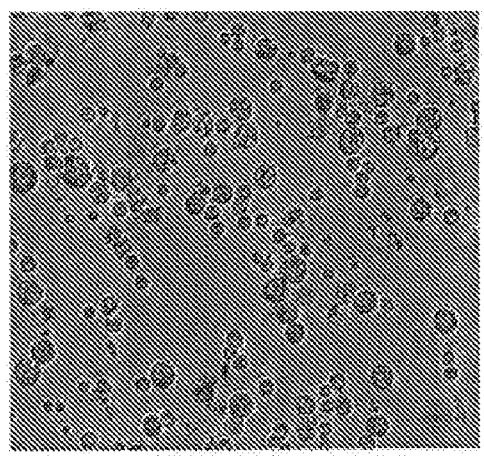
FIG. 17c depicts a sample image of cells taken with phase contrast imaging.
Figure 17D:
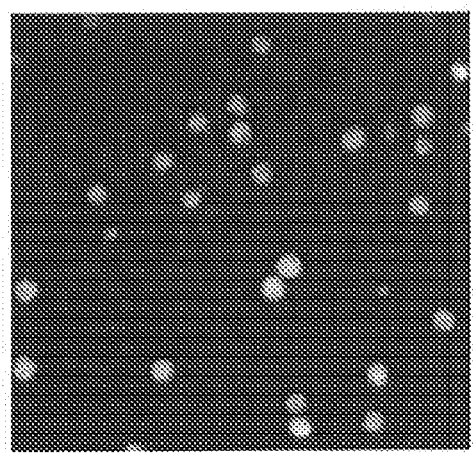
FIG. 17d depicts a sample image of K562 cells labeled with blue fluorescence.
Figure 17E:
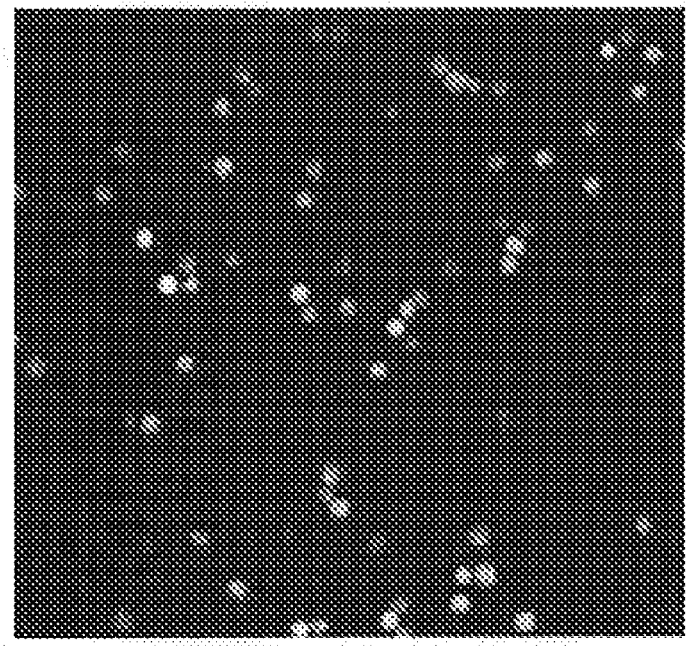
FIG. 17e depicts a sample image of A20.2J cells labeled with green fluorescence.
Figure 17F:
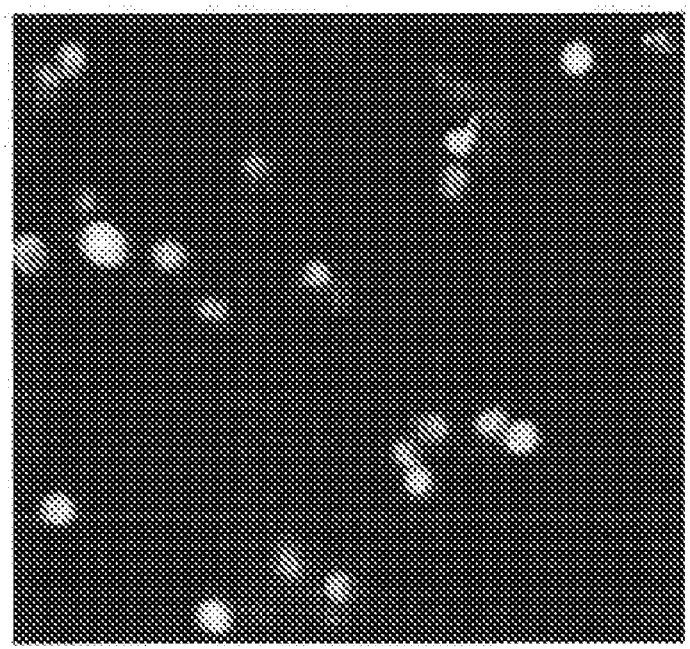
FIG. 17f depicts a sample image of EAT cells labeled with red fluorescence channel.

Each of the embodiments describe herein can be implemented by instructions stored on a computer readable medium and executed on a processor, as depicted in FIG. 16. The computer readable medium 300 can be any medium known in the art for storing instructions, such as a magnetic disk drive, an optical disk drive, magnetic tape, FLASH memory or PROM, among others. In some embodiments, the processor 302 can include a personal computer, a workstation, or any other device known in the art with processing capabilities. The processor 302 reads instructions stored on the computer readable medium 300 and executes those instructions to perform any or all of the functions of the embodiments described herein. In some embodiments, the processor 302 is connected to a machine vision component 304 that generates a digital image as described herein and provides that image to the processor 302. In some embodiments, the processor is connected to an output device 306 such as a CRT or flat panel display that provides results information generated by the processor 302 to the user. In some embodiments, the processor is connected to an input device 308 such as a keyboard, a mouse or other input device known in the art for allowing the user to provide data and control to the processor.

The invention can be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of identifying one or more objects, wherein each of the one or more objects belongs to a first class or to a second class, the first class being heterogeneous and having C subclasses, the second class being less heterogenous than the first class, comprising:
    deriving a plurality of vectors each being mapped to one of the one or more objects, wherein each of the plurality of vectors is an element of an N-dimensional space;
    preprocessing each of the plurality of vectors using a Fisher Linear Discriminant, wherein the preprocessing reduces the dimensionality of each of the plurality of vectors to M dimensions, wherein M is less than or equal to C; and,
    classifying the preprocessed vectors by (i) grouping the preprocessed vectors belonging to any of the C subclasses of the first class into a first set of vectors, and (ii) grouping the preprocessed vectors belonging to the second class into a second set of vectors.

2. The method of claim 1, wherein each of the plurality of vectors includes information mapped from a digital image.

3. The method of claim 2, wherein the information mapped from a digital image includes a pixel patch.

4. The method of claim 1, wherein the preprocessed vectors are classified with at least one of a support vector machine and an artificial neural network.

5. The method of claim 4, further including training the support vector machine with a compensatory iterative sample selection technique.

6. The method of claim 5, wherein the compensatory iterative sample selection technique comprises:
    (a) selecting a first working set of pre-classified objects from a set of training objects;
    (b) training the support vector machine with the first working set;
    (c) testing the support vector machine with pre-classified objects from the set of training objects not included in the first working set so as to produce a set of correctly classified objects and a set of incorrectly classified objects;
    (d) selecting a replacement set of pre-classified objects from the set of incorrectly classified objects, and replacing a subset of the working set with the replacement set;
    (e) repeating steps (b), (c) and (d) until the set of incorrectly classified objects does not decrease in size for subsequent iterations of steps (b), (c) and (d).

7. A method of identifying one or more objects in a digital image, wherein each of the one or more objects belongs to a first class or to a second class, the first class being heterogeneous and having C subclasses, and the second class being less heterogeneous than the first class, comprising:
    deriving a plurality of pixel patches from the digital image, each being mapped to one of the one or more objects, wherein each of the plurality of pixel patches is an element of an N-dimensional space;
    preprocessing each of the plurality of pixel patches using a Fisher Linear Discriminant, wherein the preprocessing reduces the dimensionality of each of the pixel patches to M dimensions, wherein M is less than or equal to C; and,
    classifying the preprocessed pixel patches by (i) grouping the preprocessed pixel patches belonging to any of the C subclasses of the first class into a first set of pixel patches, and (ii) grouping the preprocessed pixel patches belonging to the second class into a second set of pixel patches.

8. The method of claim 7, wherein the preprocessed pixel patches are classified with a support vector machine.

9. The method of claim 8, further including training the support vector machine with a compensatory iterative sample selection technique.

10. The method of claim 9, wherein the compensatory iterative sample selection technique comprises:
    (a) selecting a first working set of pre-classified objects from a set of training objects;
    (b) training the support vector machine with the first working set;
    (c) testing the support vector machine with pre-classified objects from the set of training objects not included in the first working set so as to produce a set of correctly classified objects and a set of incorrectly classified objects;
    (d) selecting a replacement set of pre-classified objects from the set of incorrectly classified objects, and replacing a subset of the working set with the replacement set;
    (e) repeating steps (b), (c) and (d) until the set of incorrectly classified objects does not decrease in size for subsequent iterations of steps (b), (c) and (d).

11. The method of claim 7, further including localizing an object in the digital image by identifying a pixel patch having an object that is centered within the pixel patch.

12. The method of claim 7, wherein the first class homogeneous class includes cells, and the second heterogeneous class includes non-cells.

13. A method of identifying and localizing one or more objects, wherein each of the one or more objects belongs to either a first class or a second class, comprising:
    deriving a plurality of vectors each being mapped to one of the one or more objects, wherein each of the plurality of vectors is an element of an N-dimensional space;
    training a support vector machine with a compensatory iterative sample selection technique; and,
    processing the plurality of vectors with the support vector machine, so as to classify each of the plurality of vectors into either the first class or the second class.

14. The method of claim 13, wherein each of the plurality of vectors includes information mapped from a digital image.

15. The method of claim 14, wherein the information mapped from a digital image includes a pixel patch.

16. The method of claim 13, wherein the compensatory iterative sample selection technique comprises:
    (a) selecting a first working set of pre-classified objects from a set of training objects;
    (b) training the support vector machine with the first working set;
    (c) testing the support vector machine with pre-classified objects from the set of training objects not included in the first working set so as to produce a set of correctly classified objects and a set of incorrectly classified objects;

(d) selecting a replacement set of pre-classified objects from the set of incorrectly classified objects, and replacing a subset of the working set with the replacement set;

(e) repeating steps (b), (c) and (d) until the set of incorrectly classified objects does not decrease in size for subsequent iterations of steps (b), (c) and (d).

17. The method of claim 13, wherein the objects are in a digital image.

18. The method of claim 17, wherein the objects are cells.

19. A method of identifying and localizing one or more objects in a digital image, wherein each of the one or more objects belongs to one of three or more classes, comprising:

deriving a plurality of pixel patches from the digital image, each of the plurality of pixel patches being mapped to one of the one or more objects, wherein each of the plurality of pixel patches is an element of an N-dimensional space;

training an ensemble of binary classifiers using an Error Correcting Output Coding technique; and, for each object, calculating a probability that the pixel patch associated with the object belongs to a particular one of the three or more classes, using the Error Correcting Output Coding probability estimation technique;

generating a confidence map for each class using the probability calculated for the pixel patch as a confidence value within the confidence map;

comparing peaks in the confidence map for the class with corresponding peaks in confidence maps for other classes, and using a highest peak to assign class membership; and, determining localization of the object corresponding to the highest peak by determining pixel coordinates of the highest peak.

20. A computer readable medium including stored instructions adapted for execution on a processor, comprising:

instructions for deriving a plurality of vectors each being mapped to one of the one or more objects, wherein each of the plurality of vectors is an element of an N-dimensional space;

instructions for preprocessing each of the plurality of vectors using a Fisher Linear Discriminant, wherein the preprocessing reduces the dimensionality of each of the plurality of vectors to M dimensions, wherein M is less than or equal to C; and, instructions for classifying the preprocessed vectors by (i) grouping the preprocessed vectors belonging to any of the C subclasses of the first class into a first set of vectors, and (ii) grouping the preprocessed vectors belonging to the second class into a second set of vectors.

21. A computer readable medium including stored instructions adapted for execution on a processor, comprising:

instructions for deriving a plurality of pixel patches from the digital image, each being mapped to one of the one or more objects, wherein each of the plurality of pixel patches is an element of an N-dimensional space;

instructions for preprocessing each of the plurality of pixel patches using a Fisher Linear Discriminant, wherein the preprocessing reduces the dimensionality of each of the pixel patches to M dimensions, wherein M is less than or equal to C; and, instructions for classifying the preprocessed pixel patches by (i) grouping the preprocessed pixel patches belonging to any of the C subclasses of the first class into a first set of pixel patches, and (ii) grouping the preprocessed pixel patches belonging to the second class into a second set of pixel patches.

22. A computer readable medium including stored instructions adapted for execution on a processor, comprising:

instructions for deriving a plurality of pixel patches from the digital image, each of the plurality of pixel patches being mapped to one of the one or more objects, wherein each of the plurality of pixel patches is an element of an N-dimensional space;

instructions for training an ensemble of binary classifiers with a compensatory iterative sample selection technique, using an Error Correcting Output Coding technique;

instructions for calculating for each object, a probability that the pixel patch belongs to a particular one of the three or more classes, using the Error Correcting Output Coding probability estimation technique;

instructions for generating a confidence map for each class using the probability calculated for the pixel patch as a confidence value within the confidence map;

instructions for comparing peaks in the confidence map for the class with corresponding peaks in confidence maps for other classes, and using a highest peak to assign class membership; and, instructions for determining localization of the object corresponding to the highest peak by determining pixel coordinates of the highest peak.

23. A method of classifying one or more cells in a specimen, wherein each of the one or more cells belongs to one of two or more classes, comprising:

deriving a plurality of vectors from a plurality of pixel patches, including at least pixel patches from a digital image of the specimen that is of a first contrast type, and pixel patches from a digital image of the specimen that is of a second contrast type distinct from the first contrast type;

preprocessing the plurality of vectors using a non-linear feature extraction method, wherein the preprocessing reduces the dimensionality of the vectors;

generating a plurality of confidence maps, based on the plurality of vectors, wherein each of the plurality of confidence maps corresponds to a particular one of the two or more classes, and wherein each confidence value in that confidence map corresponds to a probability that a vector belongs to that class;

identifying a cell at a location of a peak in a confidence map; and assigning the cell to the particular one of the two or more classes corresponding to the highest peak among the plurality of confidence maps at the location.

24. The method of claim 23 wherein the non-linear feature extraction method is Kernel Principal Component Analysis.

25. The method of claim 23 wherein the first contrast type is at least one of bright field, phase contrast, and Hoffman modulation contrast.

26. The method of claim 23 wherein the second contrast type is at least one of bright field, phase contrast, and Hoffman modulation contrast.

27. The method of claim 23 wherein the probability that a vector belongs to a class is generated using Error Correcting Output Code probability estimation.

28. The method of claim 23 further comprising the step of:

determining localization of the cell corresponding to the highest peak by determining pixel coordinates of the highest peak.

29. A computer readable medium including stored instructions adapted for execution on a processor, comprising:

instructions for deriving a plurality of vectors from a plurality of pixel patches, including at least pixel patches from a digital image of the specimen that is of a first contrast type, and pixel patches from a digital image of the specimen that is of a second contrast type distinct from the first contrast type;

instructions for preprocessing the plurality of vectors using a non-linear feature extraction method, wherein the preprocessing reduces the dimensionality of the vectors;

instructions for generating a plurality of confidence maps, based on the plurality of vectors, wherein each of the plurality of confidence maps corresponds to a particular one of the two or more classes, and wherein each confidence value in that confidence map corresponds to a probability that a vector belongs to that class;

instructions for identifying a cell at a location of a peak in a confidence map; and instructions for assigning the cell to the particular one of the two or more classes corresponding to the highest peak among the plurality of confidence maps at the location.

30. A system of identifying one or more objects, wherein each of the one or more objects belongs to a first class or to a second class, the first class being heterogeneous and having C subclasses, the second class being less heterogenous than the first class, comprising:

means for deriving a plurality of vectors each being mapped to one of the one or more objects, wherein each of the plurality of vectors is an element of an N-dimensional space;

means for preprocessing each of the plurality of vectors using a Fisher Linear Discriminant, wherein the preprocessing reduces the dimensionality of each of the plurality of vectors to M dimensions, wherein M is less than or equal to C; and, means for classifying the preprocessed vectors by (i) grouping the preprocessed vectors belonging to any of the C subclasses of the first class into a first set of vectors, and (ii) grouping the preprocessed vectors belonging to the second class into a second set of vectors.

31. The system of claim 30 wherein each of the plurality of vectors includes information mapped from a digital image.

32. The system of claim 31, wherein the information mapped from a digital image includes a pixel patch.

33. The system of claim 30, wherein the preprocessed vectors are classified with at least one of a support vector machine and an artificial neural network.

34. The system of claim 33, further including means for training the support vector machine with a compensatory iterative sample selection technique.

35. The system of claim 34, wherein the compensatory iterative sample selection technique comprises:

(a) means for selecting a first working set of pre-classified objects from a set of training objects;
(b) means for training the support vector machine with the first working set;
(c) means for testing the support vector machine with pre-classified objects from the set of training objects not included in the first working set so as to produce a set of correctly classified objects and a set of incorrectly classified objects;
(d) means for selecting a replacement set of pre-classified objects from the set of incorrectly classified objects, and replacing a subset of the working set with the replacement set;
(e) means for repeating the operations of (b), (c) and (d) until the set of incorrectly classified objects does not decrease in size for subsequent iterations of the operations of (b), (c) and (d).

36. A system of identifying one or more objects in a digital image, wherein each of the one or more objects belongs to a first class or to a second class, the first class being heterogeneous and having C subclasses, and the second class being less heterogeneous than the first class, comprising:

means for deriving a plurality of pixel patches from the digital image, each being mapped to one of the one or more objects, wherein each of the plurality of pixel patches is an element of an N-dimensional space;

means for preprocessing each of the plurality of pixel patches using a Fisher Linear Discriminant, wherein the preprocessing reduces the dimensionality of each of the pixel patches to M dimensions, wherein M is less than or equal to C; and, means for classifying the preprocessed pixel patches by (i) grouping the preprocessed pixel patches belonging to any of the C subclasses of the first class into a first set of pixel patches, and (ii) grouping the preprocessed pixel patches belonging to the second class into a second set of pixel patches.

37. The system of claim 36, wherein the preprocessed pixel patches are classified with at least one of a support vector machine and an artificial neural network.

38. The system of claim 37, further including means for training the support vector machine with a compensatory iterative sample selection technique.

39. The system of claim 38, wherein the compensatory iterative sample selection technique comprises:

(a) means for selecting a first working set of pre-classified objects from a set of training objects;
(b) means for training the support vector machine with the first working set;
(c) means for testing the support vector machine with pre-classified objects from the set of training objects not included in the first working set so as to produce a set of correctly classified objects and a set of incorrectly classified objects;
(d) means for selecting a replacement set of pre-classified objects from the set of incorrectly classified objects, and replacing a subset of the working set with the replacement set;
(e) means for repeating the operations of (b), (c) and (d) until the set of incorrectly classified objects does not decrease in size for subsequent iterations of operations of (b), (c) and (d).

40. A system of classifying one or more cells in a specimen, wherein each of the one or more cells belongs to one of two or more classes, comprising:

means for deriving a plurality of vectors from a plurality of pixel patches, including at least pixel patches from a digital image of the specimen that is of a first contrast type, and pixel patches from a digital image of the specimen that is of a second contrast type distinct from the first contrast type;

means for preprocessing the plurality of vectors using a non-linear feature extraction method, wherein the preprocessing reduces the dimensionality of the vectors;

means for generating a plurality of confidence maps, based on the plurality of vectors, wherein each of the plurality of confidence maps corresponds to a particular one of the two or more classes, and wherein each confidence value in that confidence map corresponds to a probability that a vector belongs to that class;

means for identifying a cell at a location of a peak in a confidence map; and means for assigning the cell to the particular one of the two or more classes corresponding to the highest peak among the plurality of confidence maps at the location.

* * * * *

UNITED STATES PATENT AND TRADEMARK OFFICE
CERTIFICATE OF CORRECTION

| | |
|---|---|
| PATENT NO. | : 7,958,063 B2 |
| APPLICATION NO. | : 11/789571 |
| DATED | : June 7, 2011 |
| INVENTOR(S) | : Xi Long et al. |

Page 1 of 1

It is certified that error appears in the above-identified patent and that said Letters Patent is hereby corrected as shown below:

On column 1, lines 26-29:

Change "The present invention was made with United States government support under Grant No. R21 CA89841 awarded by the National Institute of Health. The United States government may have certain rights in this invention." to --This invention was made with government support under Grant No. R21 CA89841 awarded by the National Institute of Health. The government has certain rights in the invention.--

Signed and Sealed this
Twelfth Day of February, 2013

Teresa Stanek Rea
*Acting Director of the United States Patent and Trademark Office*